(12) United States Patent
Adhikari et al.

(10) Patent No.: US 9,410,080 B2
(45) Date of Patent: Aug. 9, 2016

(54) POLYMER-BASED ORGANIC ELECTROLUMINESCENT DEVICE

(75) Inventors: Raju Adhikari, Glen Waverley (AU); Almar Postma, Clayton (AU); Kazunori Ueno, Burwood (AU); Kazuya Arima, Clayton (AU); Juo-Hao Li, Kaohsiung (TW)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 623 days.

(21) Appl. No.: 13/695,688

(22) PCT Filed: May 5, 2011

(86) PCT No.: PCT/AU2011/000520
§ 371 (c)(1),
(2), (4) Date: Jan. 24, 2013

(87) PCT Pub. No.: WO2011/137492
PCT Pub. Date: Nov. 10, 2011

(65) Prior Publication Data
US 2013/0112957 A1    May 9, 2013

(30) Foreign Application Priority Data

May 5, 2010 (AU) ................................ 2010901927
May 7, 2010 (AU) ................................ 2010901959

(51) Int. Cl.
*B32B 19/00* (2006.01)
*C09K 11/06* (2006.01)
(Continued)

(52) U.S. Cl.
CPC ............... *C09K 11/06* (2013.01); *C09B 69/101* (2013.01); *C09B 69/109* (2013.01); *H05B 33/10* (2013.01);
(Continued)

(58) Field of Classification Search
CPC .............. C09K 11/06; C09K 2211/00; C09K 2211/1011; C09K 2211/1029; C09K 2211/1433; C09K 2211/1425; C09K 2211/185; C09B 69/101; C09B 69/109; H05B 33/10; Y10S 428/917; H01L 51/5012
USPC .......... 428/690, 917; 313/504, 505, 506, 501; 257/40; 252/301.35
See application file for complete search history.

(56) References Cited

U.S. PATENT DOCUMENTS 5,247,190 A    9/1993 Friend et al.
5,514,878 A    5/1996 Holmes et al.
(Continued)

FOREIGN PATENT DOCUMENTS

JP    2007-214465 A    8/2007
WO    WO 98/01478 A1    1/1998
(Continued)

OTHER PUBLICATIONS

Burroughes et al., "Light-emitting diodes based on conjugated polymers," *Nature*, 347:539-541 (Oct. 11, 1990).
(Continued)

*Primary Examiner* — Ruiyun Zhang
(74) *Attorney, Agent, or Firm* — Merchant & Gould P.C.

(57) ABSTRACT

An electroluminescence device having an emission layer comprising a single organic compound layer between a cathode and an anode. The single layer may comprise an emitter component on a single polymer chain of covalently linked (co)-polymer sections Y1, optionally in combination with Y2, and/or Y3, or different polymer chains Y1, optionally in combination with Y2, and/or Y3 blended together. Each of the (co)-polymer contains a spacer unit and a carrier transporting component and optionally an emitter moiety.

27 Claims, 4 Drawing Sheets

(51) Int. Cl.
    *H05B 33/10* (2006.01)
    *C09B 69/10* (2006.01)
(52) U.S. Cl.
    CPC . *C09K 2211/1011* (2013.01); *C09K 2211/1029* (2013.01); *C09K 2211/1092* (2013.01); *C09K 2211/1425* (2013.01); *C09K 2211/1433* (2013.01); *C09K 2211/185* (2013.01); *Y10S 428/917* (2013.01)

(56) References Cited

U.S. PATENT DOCUMENTS

| | | | |
|---|---|---|---|
| 5,672,678 | A | 9/1997 | Holmes |
| 6,007,928 | A | 12/1999 | Sakakibara et al. |
| 6,830,828 | B2 | 12/2004 | Thompson et al. |
| 6,899,963 | B1 | 5/2005 | Zheng et al. |
| 7,250,226 | B2 | 7/2007 | Tokito et al. |
| 2007/0060777 | A1 | 3/2007 | Moriwaki et al. |

FOREIGN PATENT DOCUMENTS

| | | |
|---|---|---|
| WO | WO 2006/135076 A1 | 12/2006 |
| WO | WO 2008/036123 A2 | 3/2008 |

OTHER PUBLICATIONS

Hawker et al., "New Polymer Synthesis by Nitroxide Mediated Living Radical Polymerizations," *Chem Rev*, 101:3661-3688 (2001).
Liu et al., "Thermally Cross-Linkable Hole-Transporting Materials for Improving Hole Injection in Multilayer Blue-Emitting Phosphorescent Polymer Light-Emitting Diodes," *Macromolecules*, 41:9570-9580 (2008).
Ma et al., "New Thermally Cross-Linkable Polymer and Its Application as a Hole-Transporting Layer for Solution Processed Multilayer Organic Light Emitting Diodes," *Chem Mater*, 19:4827-4832 (2007).
Matyjaszewski et al., "Atom Transfer Radical Polymerization," *Chem Rev*, 101:2921-2990 (2001).
Yeh et al., "Vinyl polymer containing 1,4-distyrylbenzene chromophores: Synthesis, optical, electrochemical properties and its blend with PVK and Ir(ppy)$_3$," *Synthetic Metals*, 158:411-16 (2008).
International Search Report for corresponding International Patent Application No. PCT/AU2011/000520 (mailed Jun. 24, 2011).
Tang et al., "Organic electroluminescent diodes", *Appl. Phys. Lett*, 51: 913-915 (1987).
Deng et al., "Living Radical Polymerization of Bipolar Transport Materials for Highly Efficient Light Emitting Diodes", *Chem. Mater.*, 18: 386-395 (2006).
Poulsen et al., "Site Isolation in Phosphorescent Bichromophoric Block Copolymers Designed for White Electroluminescence", *Advanced Materials*, 22(1): 77-82 (Jan. 5, 2010).
Kimyonok et al., "Norbornene-Based Copolymers with Iridium Complexes and Bis(carbazolyl)fluorine Groups in Their Side-Chains and Their Use in Light-Emitting Diodes", *Chem. Mater.*, 19: 5602-5608 (2007).
Ma et al., "Multifunctional Crosslinkable Iridium Complexes as Hole Transporting/Electron Blocking and Emitting Materials for Solution-Processed Multilayer Organic Light-Emitting Diodes", *Advanced Functional Materials*, (19): 1024-1031 (2009).

POLYMER-BASED ORGANIC ELECTROLUMINESCENT DEVICE

This application is a U.S. National Stage Application under 35 U.S.C. §371 of International Patent Application No. PCT/AU2011/000520 filed 5 May 2011, which claims the benefit of priority to Australian Patent Application No. 2010901927 filed 5 May 2010 and Australian Patent Application No. 2010901959 filed 7 May 2010, the disclosures of all or which are incorporated by reference herein in their entireties. The International Application was published in English on 10 Nov. 2011 as WO 2011/137492. To the extent appropriate, a claim of priority is made to each of the above disclosed applications.

FIELD OF THE INVENTION

The present invention relates to organic electroluminescent devices.

BACKGROUND OF THE INVENTION

In a typical organic electroluminescence device (OLED), a pair of electrodes (an anode and a cathode) sandwich one or more layers comprising of a hole injection material, an emission material (with either fluorescent or phosphorescent material), and an electron transporting material. These materials are organic. Into the organic layer(s), holes and electrons are injected from the anode and the cathode, respectively. Thus, excitons form within the emission material, and when the excitons fall to the ground state the organic layer, and hence the organic luminescence device, emits light.

According to the first study by Eastman Kodak Co. ("Appl. Phys. Lett", vol. 51, pp. 913 (1987)), an organic electroluminescence device, that comprised a layer of an aluminium quinolinol complex (as a combined electron transporting and luminescent material) and a layer of a triphenylamine derivative (as a hole transporting material), resulted in luminescence of about 1,000 cd/m$^2$ under an applied voltage of 10 V. Further studies by Baldo et al. revealed a promising OLED using phosphorescent material as a dopant. The quantum yield of the phosphorescent OLED was significantly higher (U.S. Pat. No. 6,830,828). These systems may be referred to as small molecule OLEDs (SMOLEDs).

In addition to the above-mentioned OLEDs, a polymer based organic electroluminescent device (PLED) using a conjugated polymeric material, has been reported by a Cambridge University group (Nature, vol. 347, pp. 539 (1990), U.S. Pat. Nos. 5,247,190; 5,514,878 and 5,672,678). PLEDs have an advantage in terms of device fabrication as a printing methodology may be adopted for soluble polymer materials. Solution deposition of polymer material is a useful method to reduce the manufacturing cost for displays and light sources.

However, the problem associated with PLEDs is that the quantum efficiency and device lifetime are poor relative to SMOLEDs.

Polymer materials are usually synthesized by polymerisation of monomers of one or of several kinds and the resulting polymer materials tend to have a broad molecular weight distribution. PLEDs based on such polymers are difficult to manufacture due to solubility and reproducibility issues, which significantly affect the device operation lifetime, and have poor quantum efficiency. Also, quality control is difficult with PLEDs as the uniformity of the thin polymeric films, and the electronic properties of the materials, vary significantly depending on the particular method employed in forming the films and specific conditions used in the treating of the films.

Accordingly, novel organic polymeric luminescent materials in the production of PLEDs are needed, which are suitable for solution processing and which have narrow molecular weight distributions, good solubility, high thermal stability, high quantum efficiency, and good film uniformity.

Reference to any prior art in this specification is not, and should not be taken as, an acknowledgment or any form of suggestion that this prior art forms part of the common 15, general knowledge in Australia or any other jurisdiction or that this prior art could reasonably be expected to be ascertained, understood and regarded as relevant by a person skilled in the art.

SUMMARY OF THE INVENTION

The present invention provides light emitting polymer materials which posses narrow molecular weight distribution, high quantum efficiency and good surface uniformity of the film formed by solution deposition processing. It is also desirable that the present invention provides a PLED device with sufficient durability and higher efficiency, which is applicable to large area display and a variety of light sources and manufacturable by solution processing methods.

According to the present invention there is provided a device comprising a pair of electrodes comprising an anode and a cathode, and one or more layers of organic compound disposed between the electrodes, wherein at least one layer comprises a polymer of the general formula (1);

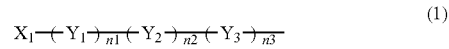

(1)

wherein the polymer comprises $X_1, Y_1, Y_2,$ and $Y_3$ in which
$X_1$ is an emitting component, $Y_1$ is a first polymeric component, $Y_2$ is a second polymeric component, and $Y_3$ is a third polymeric component;

n1, n2, n3 are valency units;

$X_1$ is either univalent, bivalent, trivalent, or tetravalent, with n1 an integer from 1 to 4 and depending on the valence number of $X_1$;

n2, n3 is an integer from 0 to 4; and n1 is equal to or greater than n2, which in turn is equal to or greater than n3.

n1, n2, n3 are valency units and not monomeric repeat units. For example, if n1 is 3 there are 3 $Y_1$ units on $X_1$.

The polymer is a non-conjugated (co)-polymer. The active monomer units are pendant to the polymer backbone and conjugated through π-π bonding interaction. The backbone repeat unit is however not conjugated.

The polymer is prepared by living radical polymerisation.

In a preferred form of the polymer of formula (1), polymeric component $Y_1$, the second polymeric component $Y_2$, and the third polymeric component $Y_3$ are of formula (2a), (2b), and (2c), respectively:

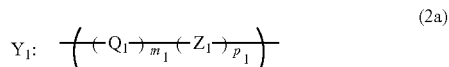

(2a)

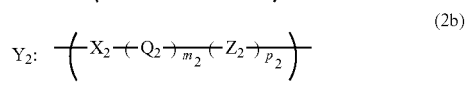

(2b)

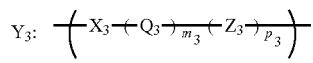

(2c)

wherein
- $Y_1$ comprises spacer $Q_1$ and carrier transporting component $Z_1$, spacer $Q_1$ being connected with $X_1$;
- $Y_2$ comprises an emitting moiety $X_2$, spacer $Q_2$ and carrier transporting component $Z_2$, $X_2$ being connected with $Z_1$;
- $Y_3$ comprises an emitting moiety $X_3$, spacer $Q_3$ and carrier transporting component $Z_3$, with $X_3$ being connected with $Z_2$;
- $X_2$ and $X_3$ may be the same emitting component or different; and
- $m_1, p_1, m_2, p_2, m_3, p_3$ are positive integer monomeric repeat units.

$m_1, P_1, m_2, p_2, m_3, p_3$ are preferably from 1 to 100, and more preferably from 5 to 20.

Another aspect of the invention may provide a polymer particularly for use in a PLED device for the general formula (1) above.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS/FIGURES

FIG. 8 is the UV-Vis absorption and PL spectra of polymer 184a.

FIG. 9 is the UV-Vis absorption and PL spectra of 186a.

DETAILED DESCRIPTION OF THE EMBODIMENTS

Figure 1:
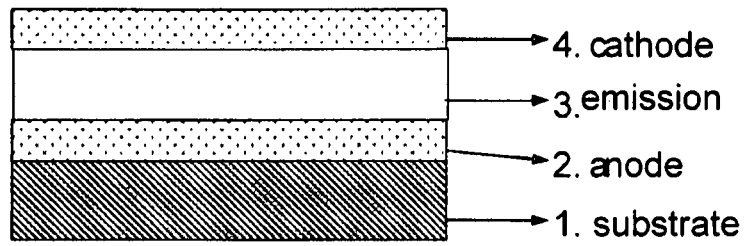
FIG. 1 is a schematic cross section of a first embodiment of the organic electroluminescent device of the present invention showing a single organic layer.

Living radical polymerisation (LRP) is a process known to the skilled person. In brief, LRP is a process which proceeds by a mechanism whereby most chains continue to grow throughout the polymerisation without termination and where further addition of monomer results in continued polymerisation. The molecular weight is controlled by the stoichiometry of the reaction components, and narrow molecular weight distribution polymers can be produced. LRP methods used are of the following three main types: Reversible Addition Fragmentation chain Transfer (RAFT) polymerisation [as, for example, in WO9801478], Atom Transfer Radical Polymerisation (ATRP) [as, for example, in *Chem. Rev.* 2001, 101, 2921-2990] and Nitroxide Mediate Radical Polymerisation (NMRP) [as, for example, in *Chem. Rev.* 2001, 101, 3661-3688].

The polymer (1) of the invention may comprise (1a), (1b), (1c), a combination of (1a) and (1b), a combination of (1a) and (1c), or all of (1a), (1b) and (1c), wherein (1a), (1b) and (1c) are as follows:

(1a)

(1b)

(1c)

The desired emission colour output from the device can be selected based on the selection of (1a), (1b) and/or (1c) as above. The desired emission colour may be selected from 400 nm to 800 nm including white colour emission.

Further, the polymer may include at least one additive selected to optimise the desired polymer properties including the hole mobility, emission colour and quantum efficiency in the device. For example, the additive(s) may be small molecule(s), oligomer(s) or polymer molecule. In more detail, the additive(s) may be selected from small molecules of hole transporting compound, electron transporting compound and emission compound of fluorescence or phosphorescence or both. Oligomer molecule(s) may be selected from small molecules of hole transporting compound, electron transporting compound and emission compound of fluorescence or phosphorescence or both Polymer molecule may be selected from hole transporting polymer and emission polymer of fluorescent or phosphorescent emission or both selected from conjugated or non-conjugated polymer.

The light emitting component $X_1$ is polymerised into the polymer of formula (1) using LRP. To achieve this, an $X_1$ precursor, which is a LRP agent bonded via a linker A to an emitting component, is used. After polymerisation, the end-capping LRP agent may be either retained or removed from the $X_1$ precursor to form $X_1$. That is, $X_1$ can either be the same as the $X_1$ precursor (LRP agent retained) or different to the $X_1$ precursor (LRP agent removed).

The LRP agent is selected from the group consisting of RAFT polymerisation, ATRP and NMRP agents.

The emitting component $X_1$ is selected from the group consisting of substituted or unsubstituted organic fluorescent materials, substituted or unsubstituted phosphorescent organic metal complexes, or substituted or unsubstituted phosphorescent organic complexes, wherein the phosphorescent organic metal complex is provided as a complex of organic ligand and a metal selected from a transition metal group or rare earth metal group. The emission colour of $X_1$ may be selected from 400 nm to 800 nm.

The LRP moiety can be directly linked to the emitting component or through a linker, A. The linker A may be for instance, heteroalkyl, silyl, siloxane, alkyl group Some examples of the precursors to the emitting component $X_1$ using linker are shown below. RAFT precursors are shown below as compounds 1 to 27 and 1-27a, In these structures, the 'Z', which is different to $Z_1$, $Z_2$, and $Z_3$, is the activating group, on the RAFT agent, that modifies the addition and fragmentation rates. Z may be, for instance, Ar—, AlkS—, Alk-, PyrrolN—, PyrrolidoneN—, ArO—, AlkO—, (Alk)(Ar)N—, or (Alk)$_2$N—.

ATRP precursors are shown as compounds 28 to 51 and 28a to 51a, and NMRP precursors are shown as compounds 52 to 75 and 52a to 75a. In both ATRP and NMRP, the initiators examples are not limited to the structures as described in the examples and may include other initiator structures based on those reported in the literature [*Chem Rev* 2001, 101 2921, *Chem. Rev.* 2001, 101, 3661].

1

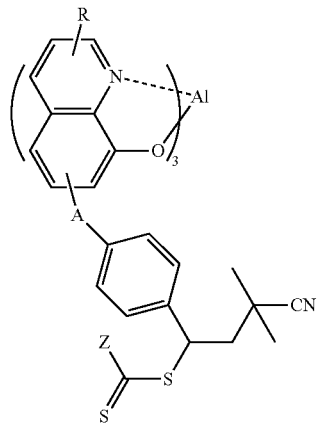

2

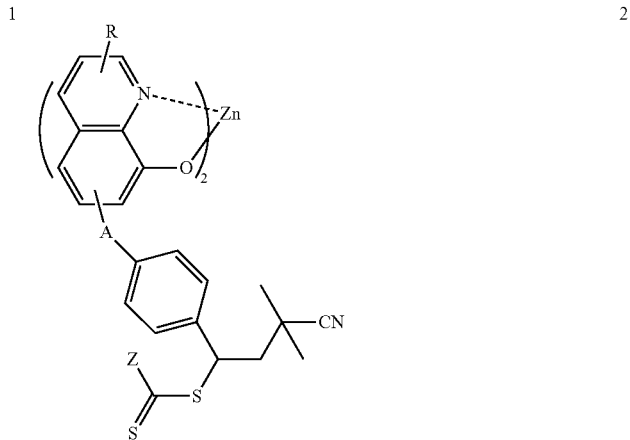

3

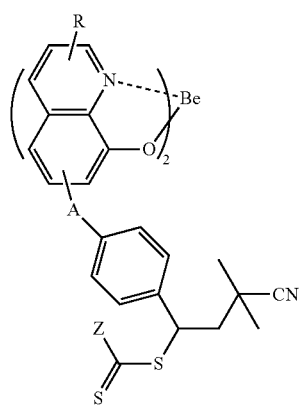

4

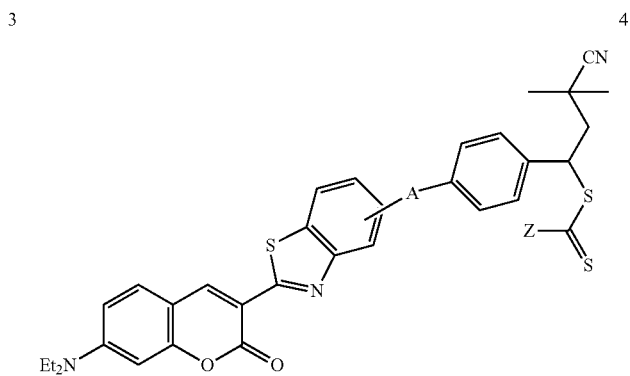

5

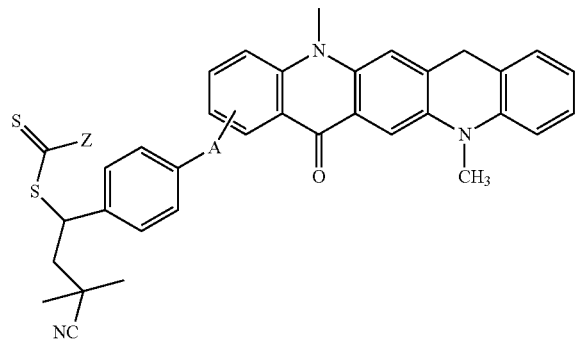

6

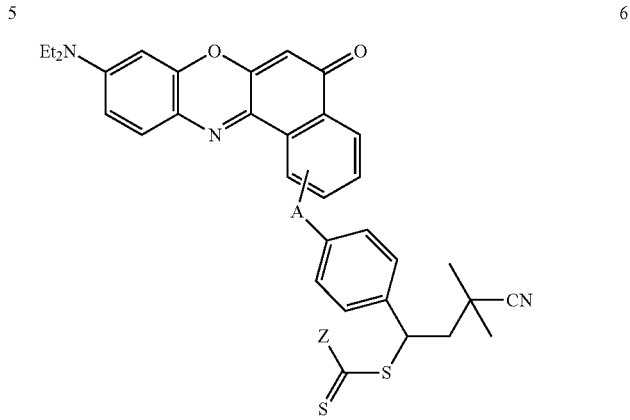

-continued
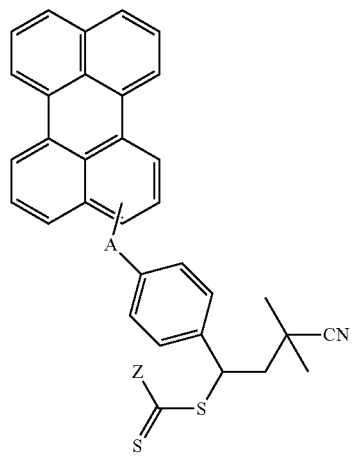
7
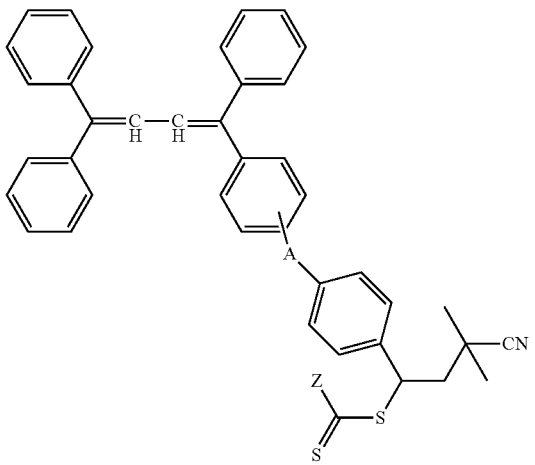
8
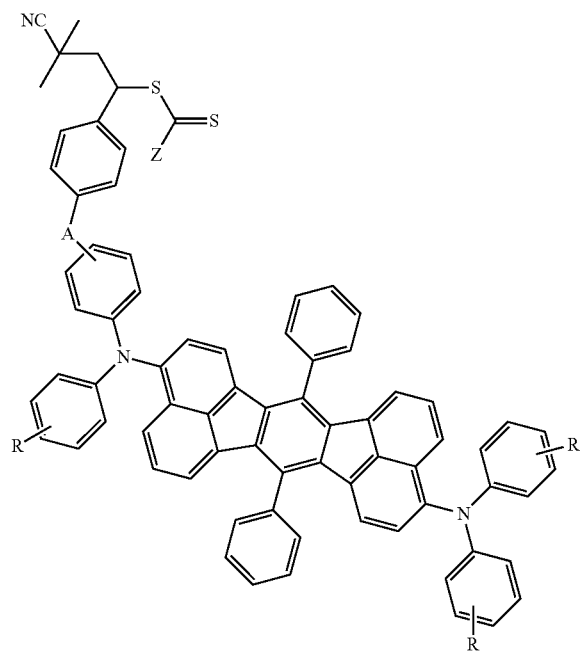
9
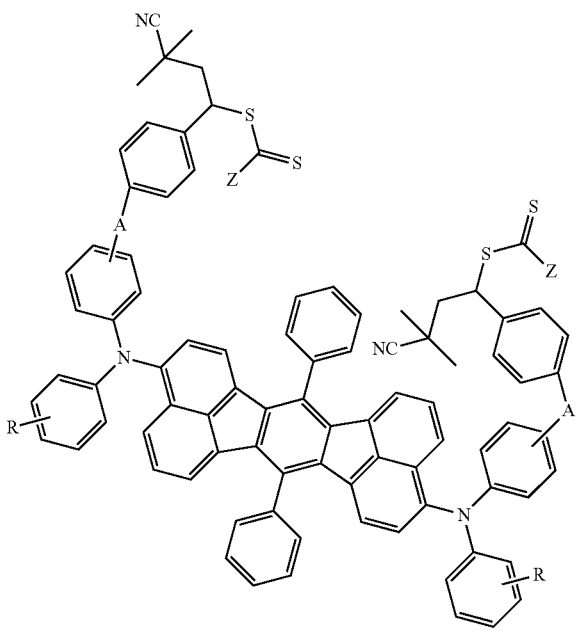
10
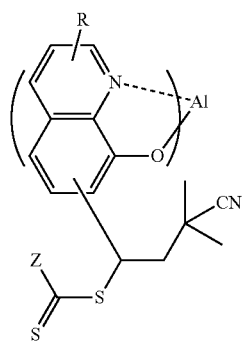
1a
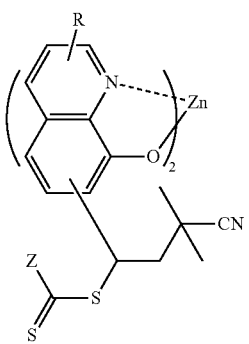
2a -continued
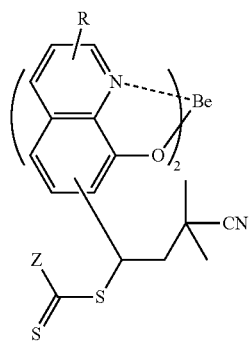
3a
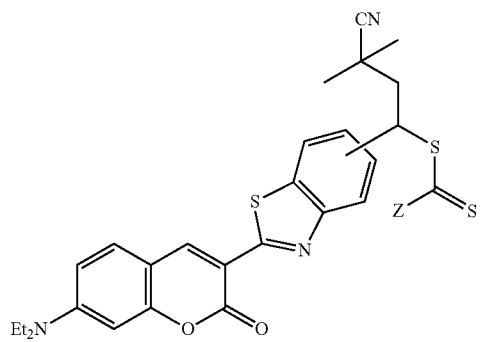
4a
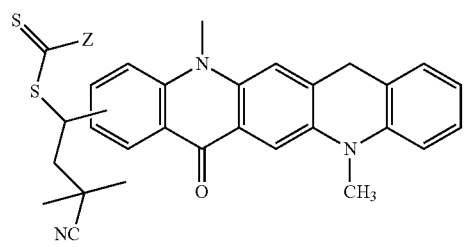
5a
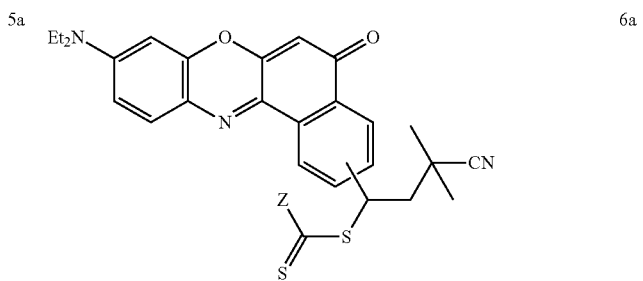
6a
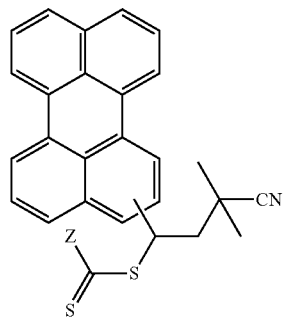
7a
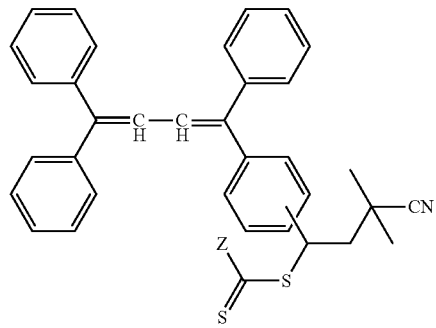
8a
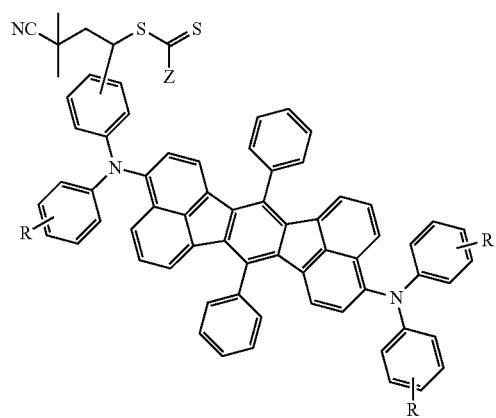
9a
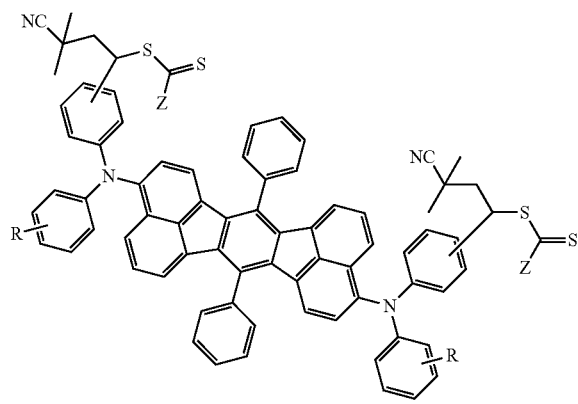
10a

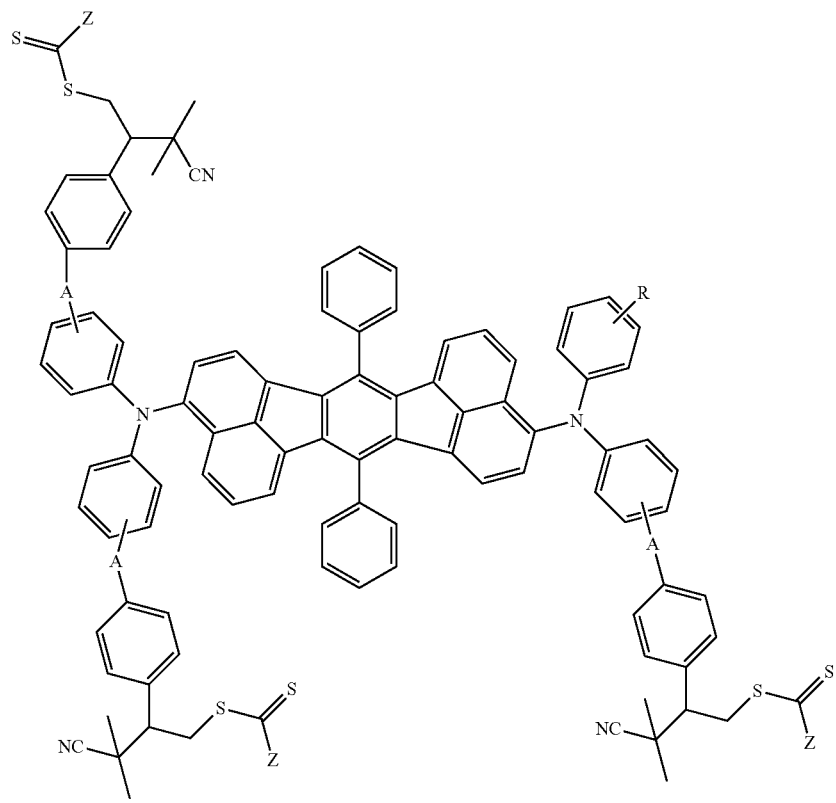
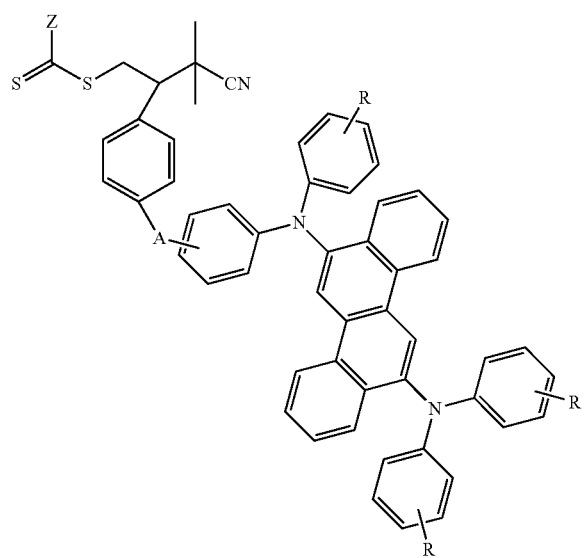

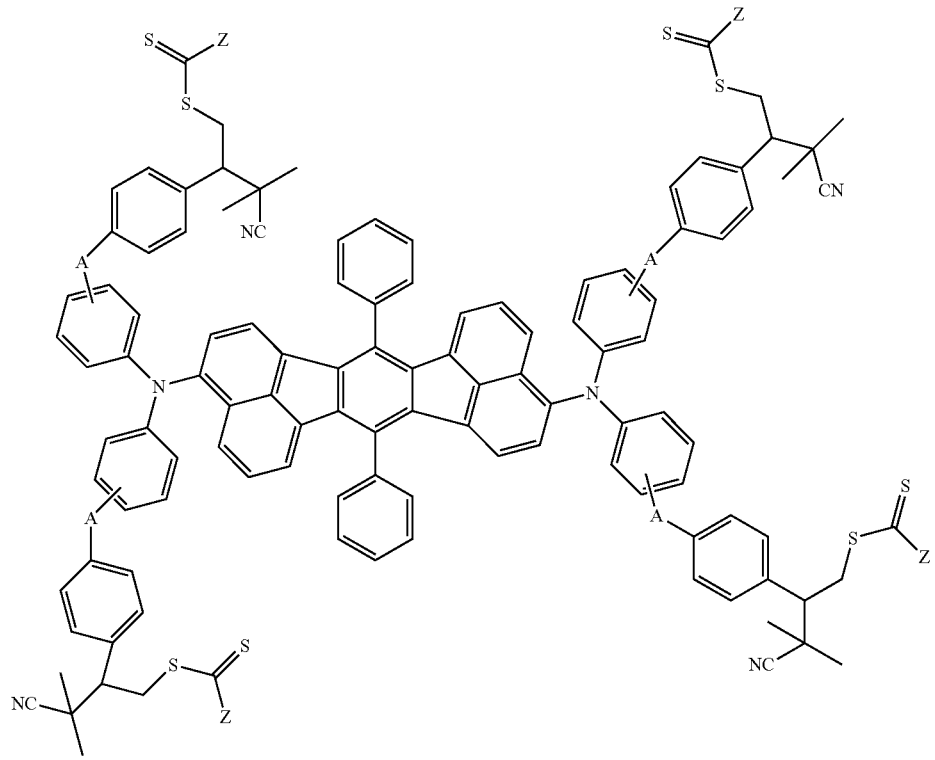
12
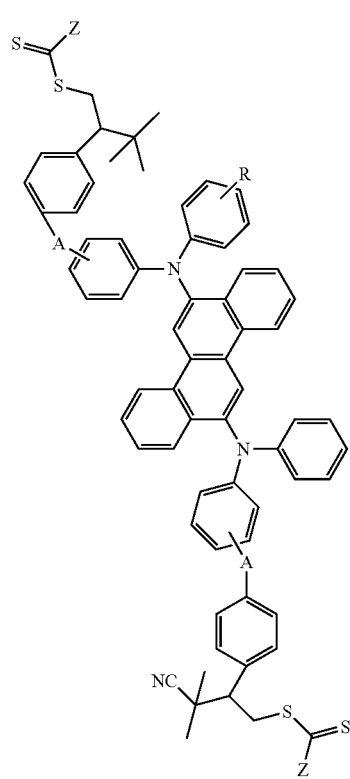
14

-continued
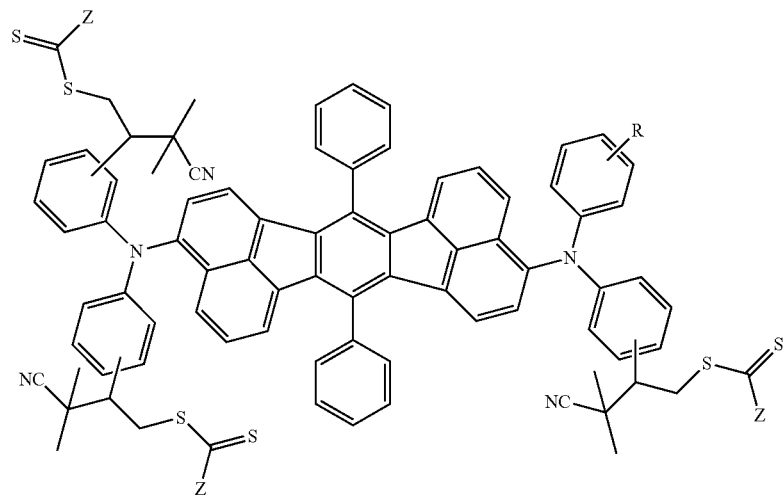
11a
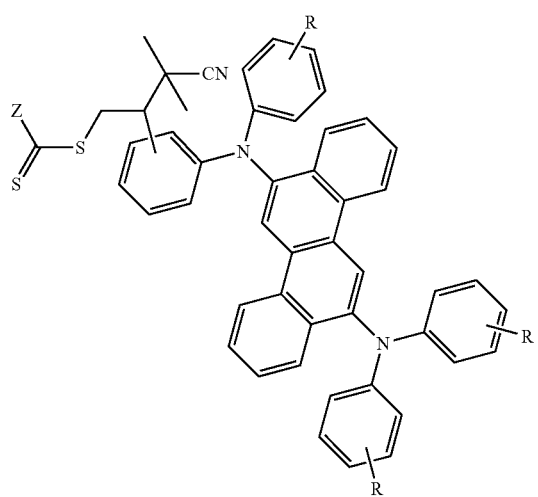
13a
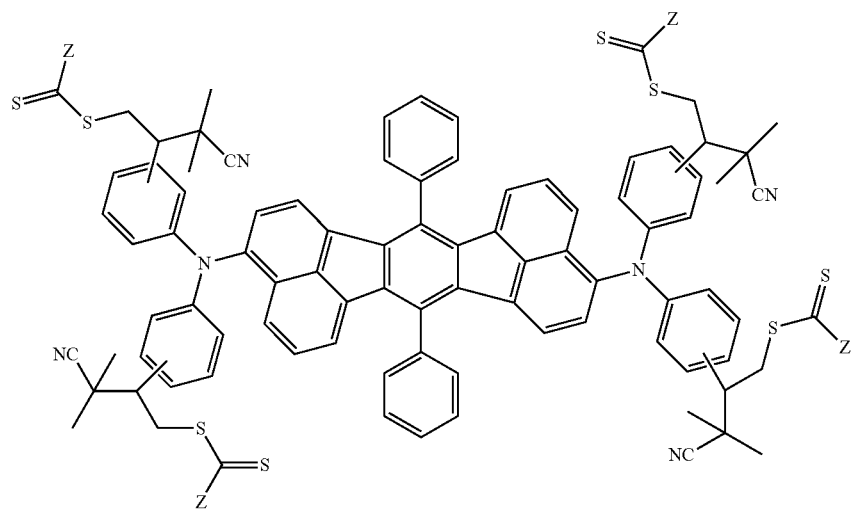
12a

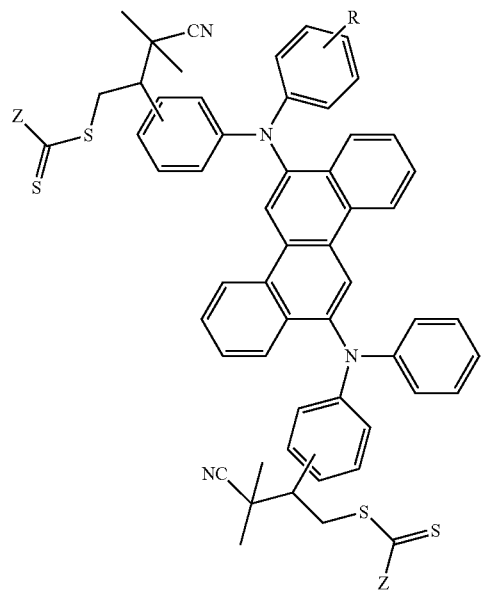
14a
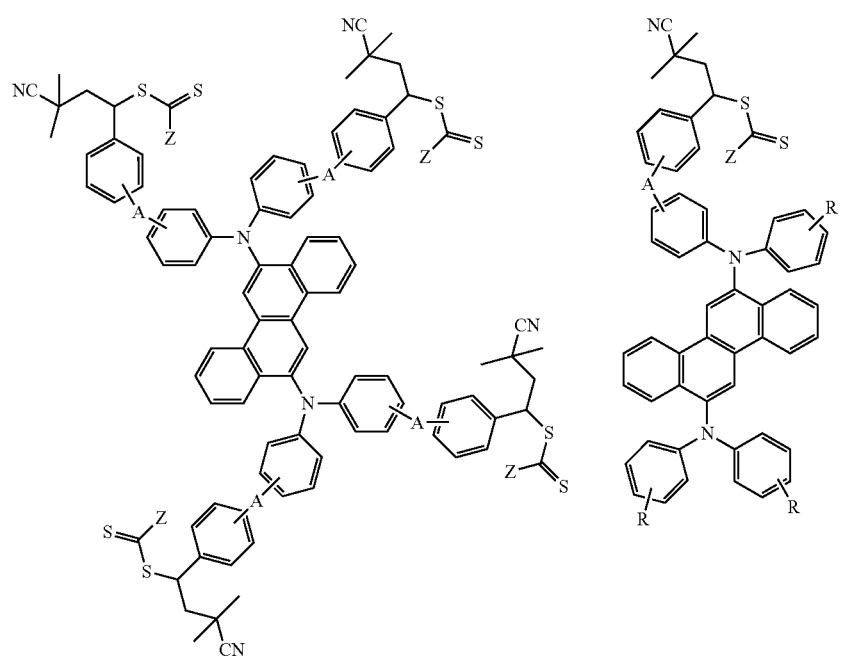
15
16

-continued
17
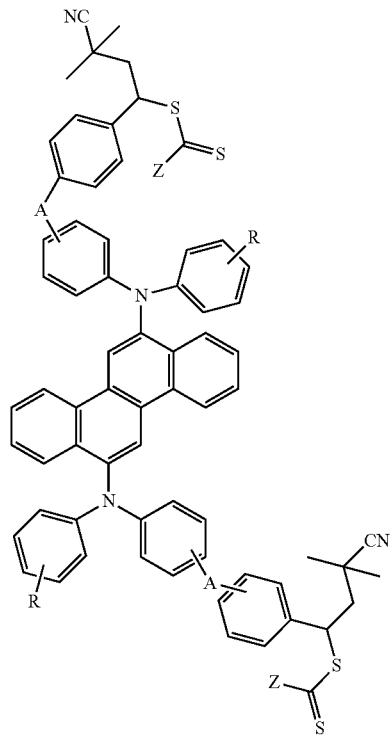
18
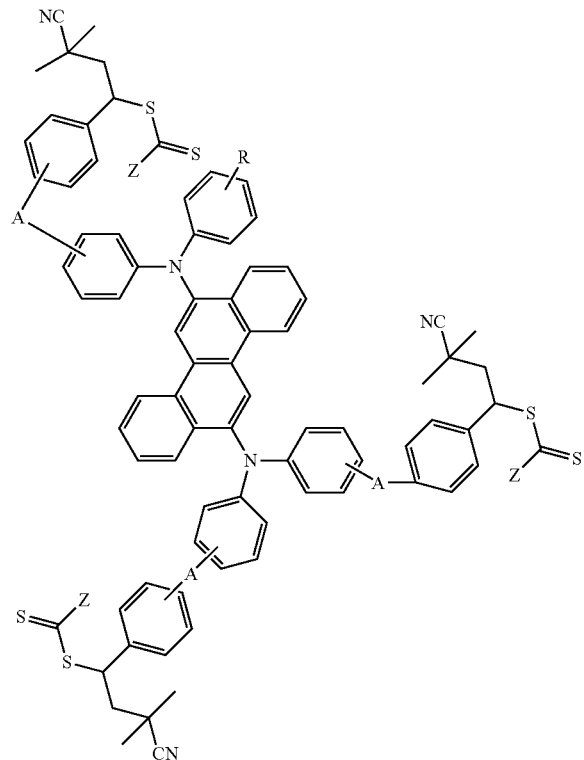
15a
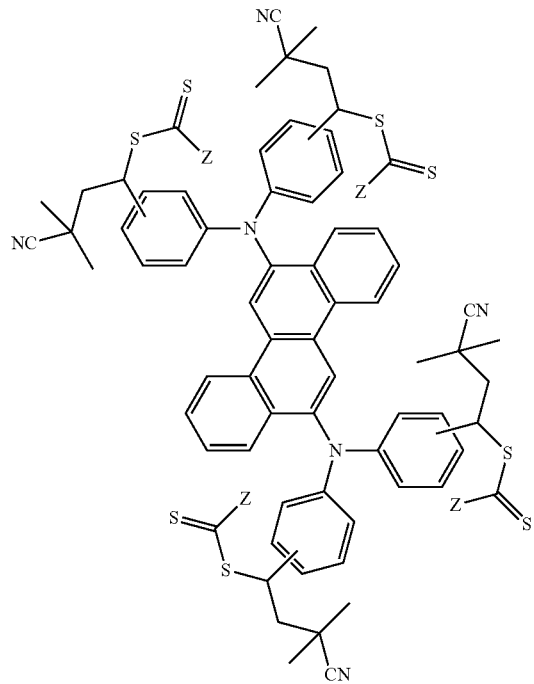
16a
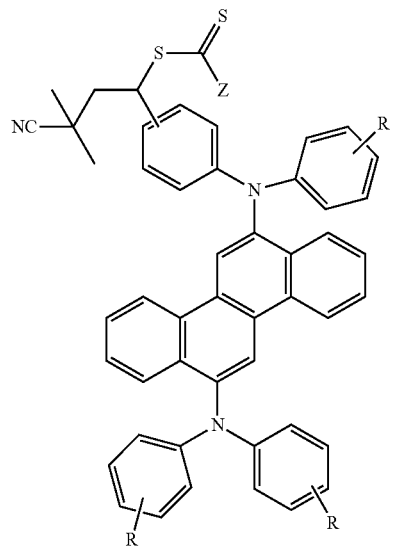

-continued
17a
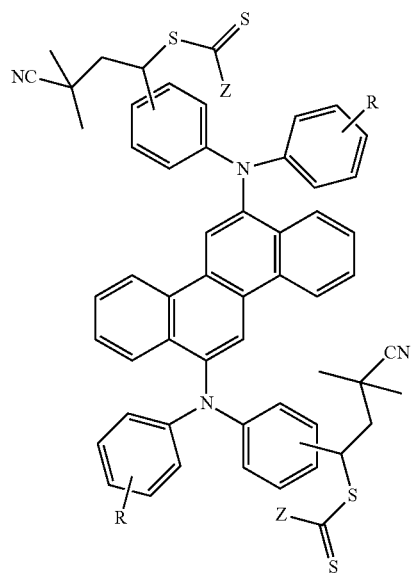
18a
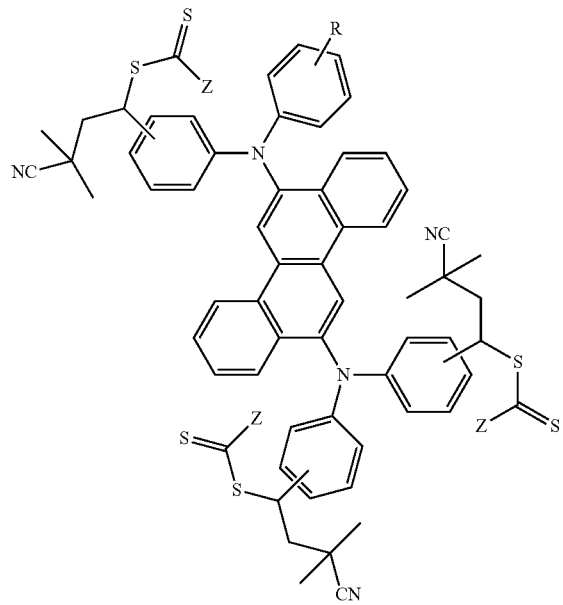
19
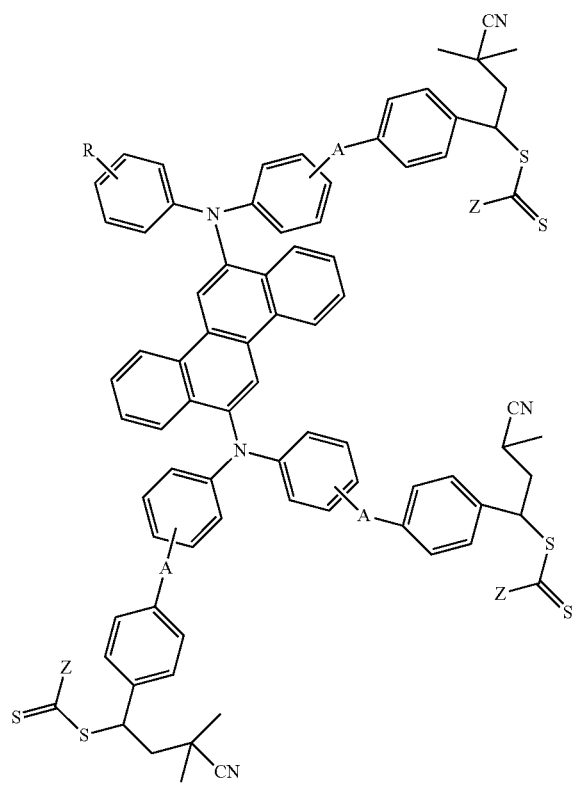
20
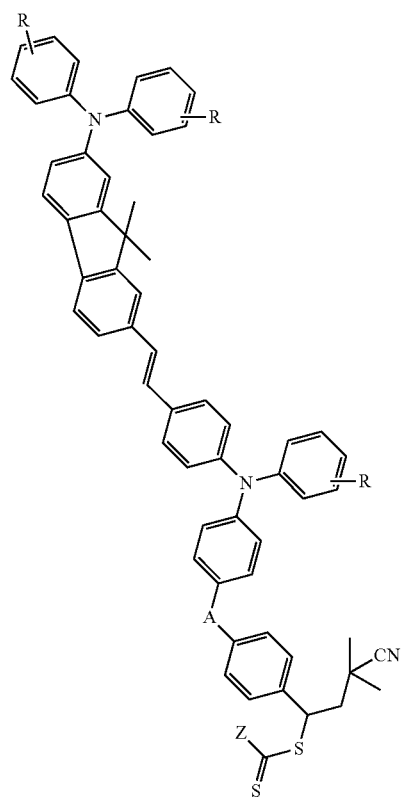

-continued
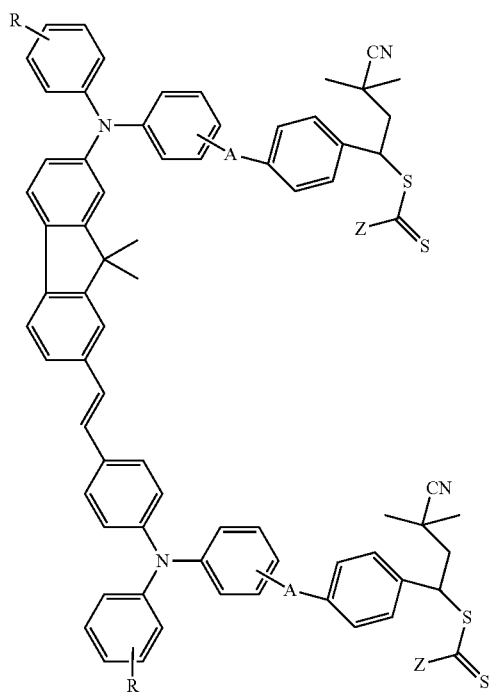
23
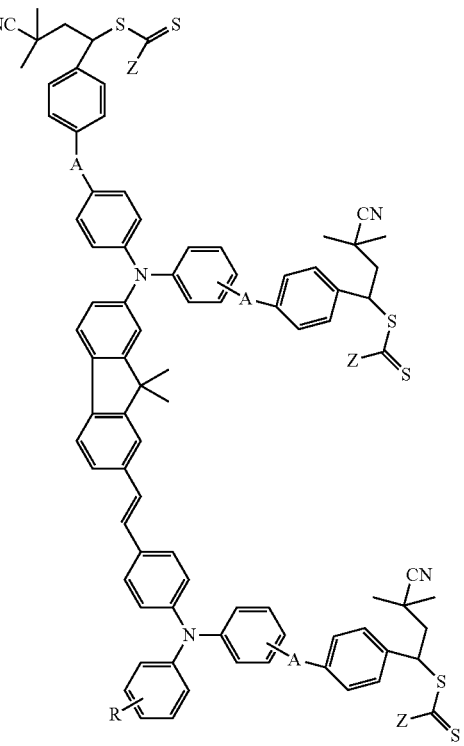
21
22
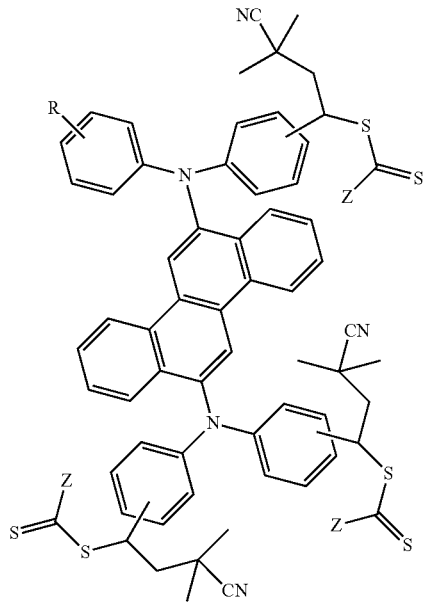
19a
20a

-continued
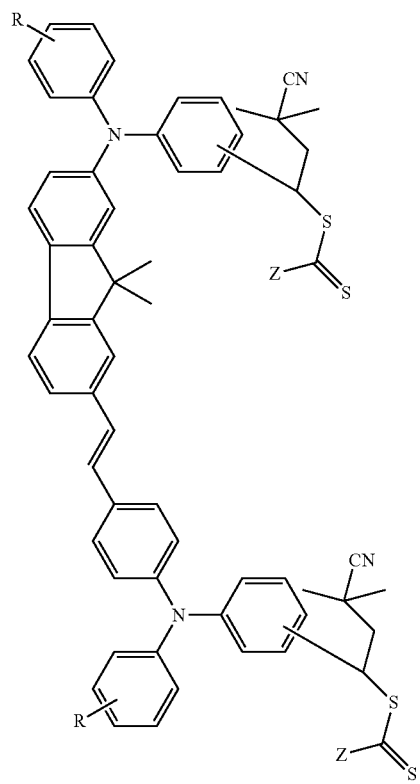
21a
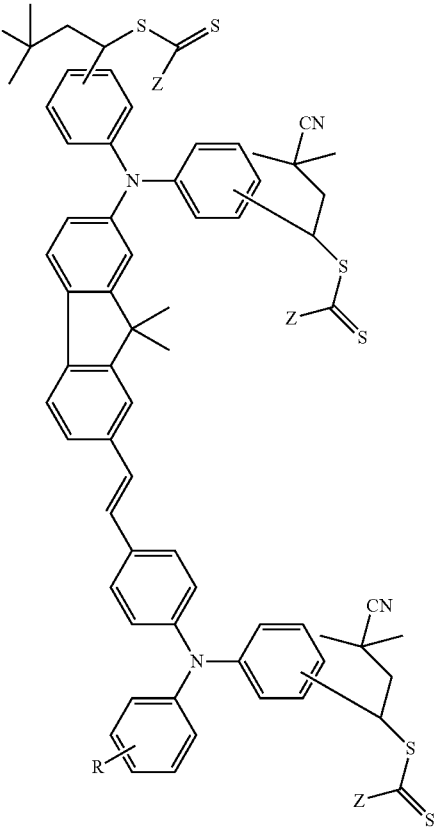
22a
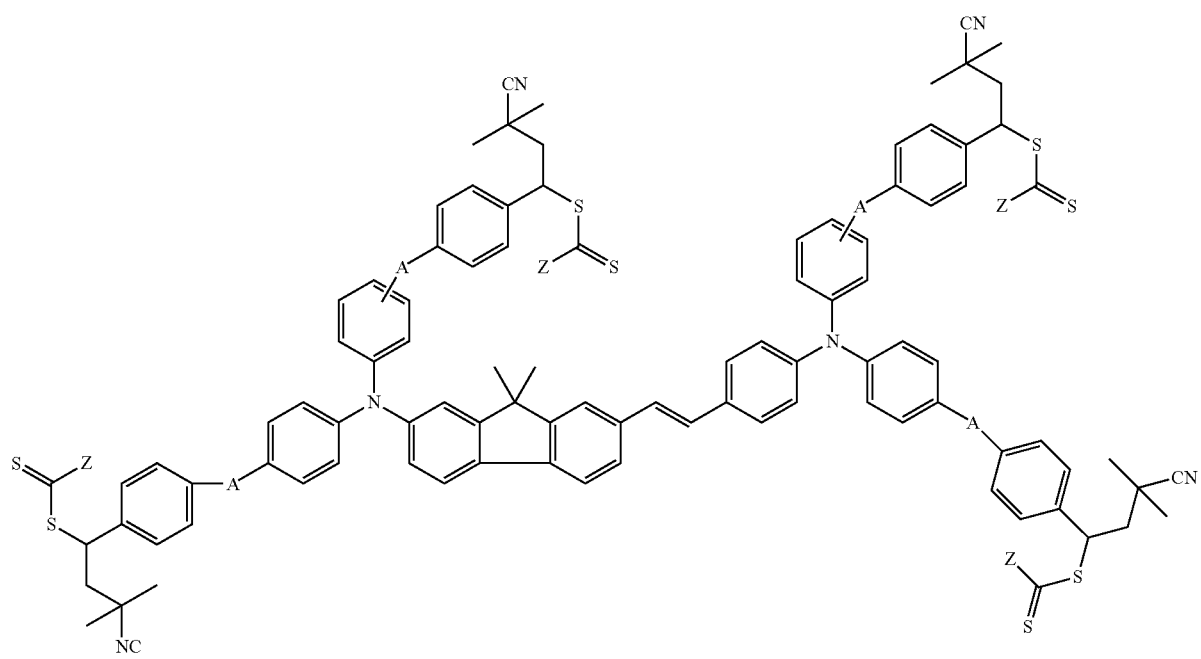
23

-continued
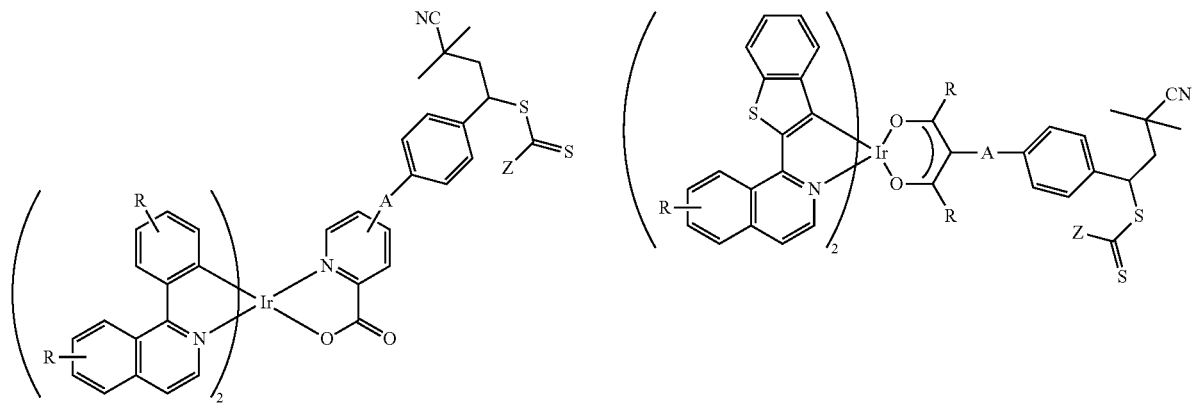
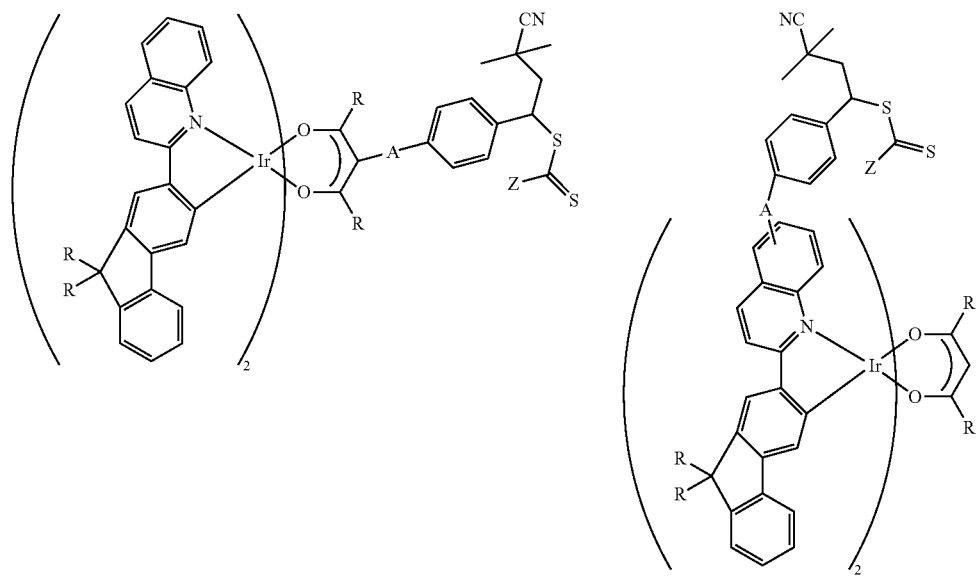
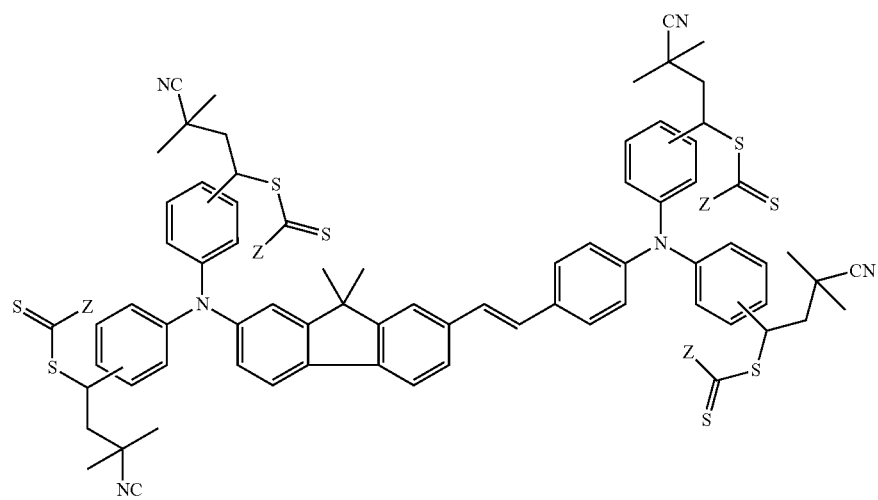

-continued
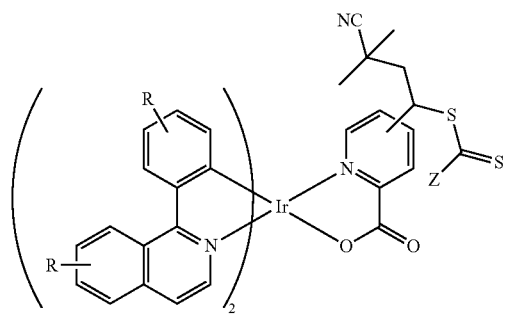
24a
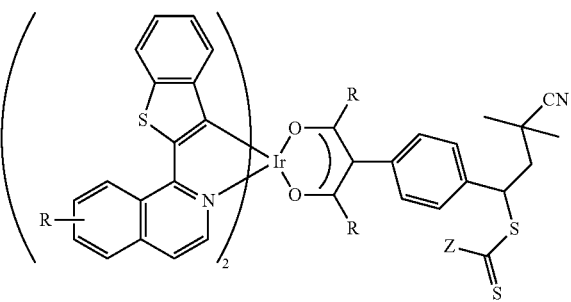
25a
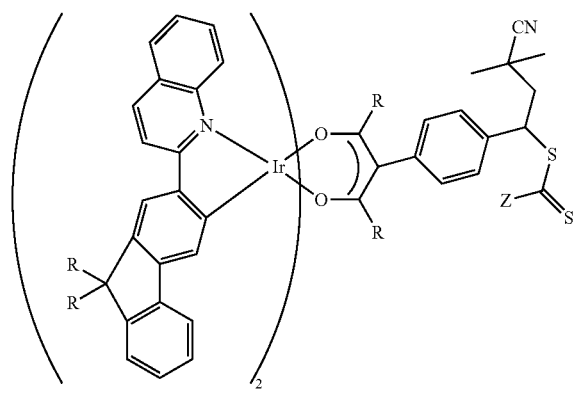
26a
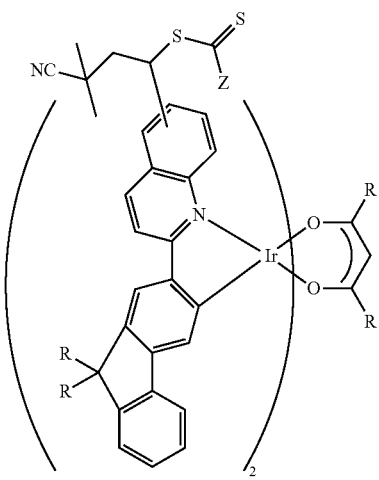
27a
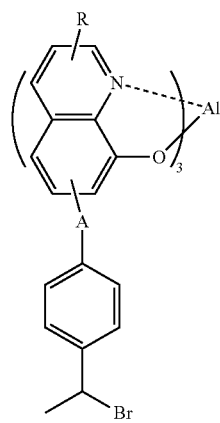
28
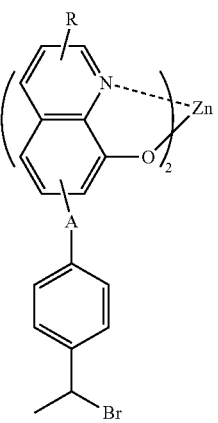
29

-continued
30
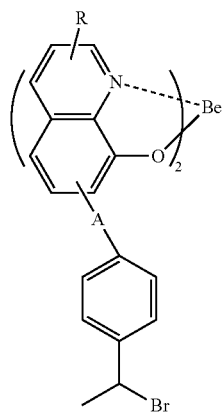
31
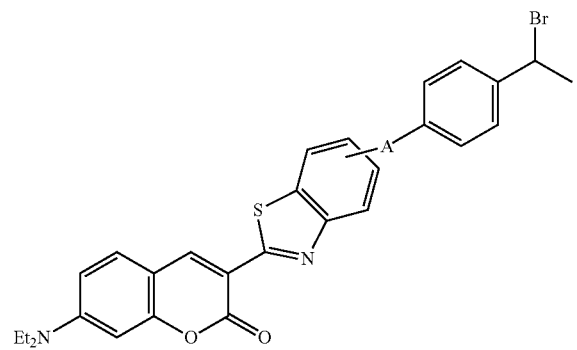
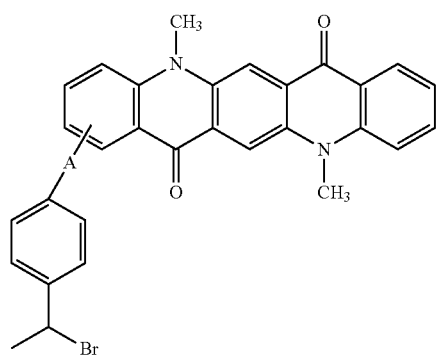
32
33
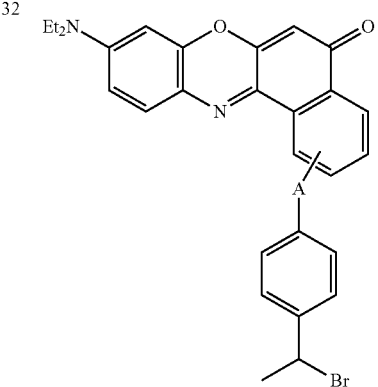
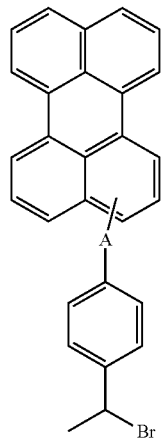
34
35
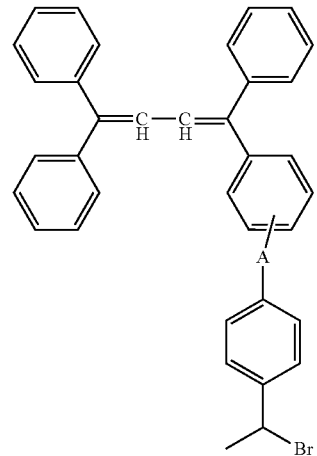
28a
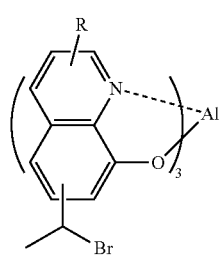
29a
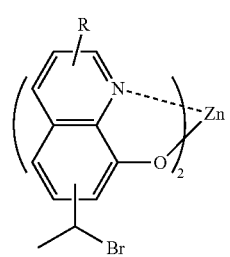

-continued
30a
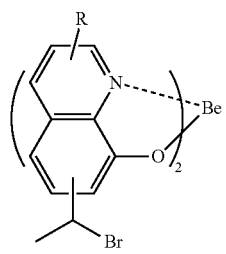
31a
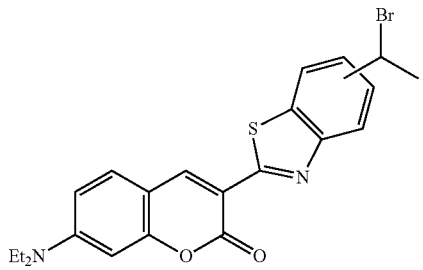
32a
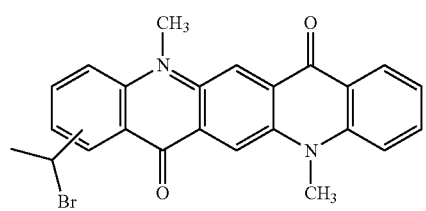
33a
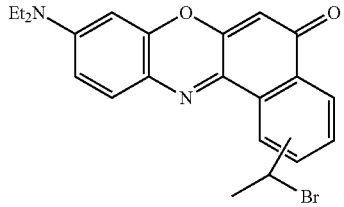
34a
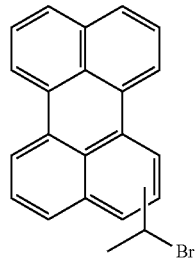
35a
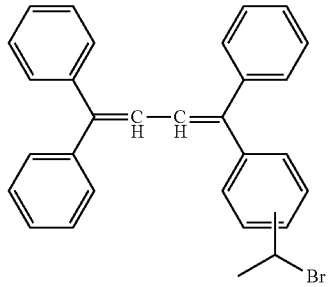
36
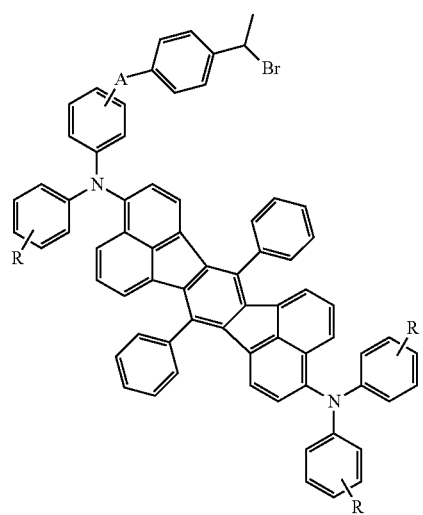
37
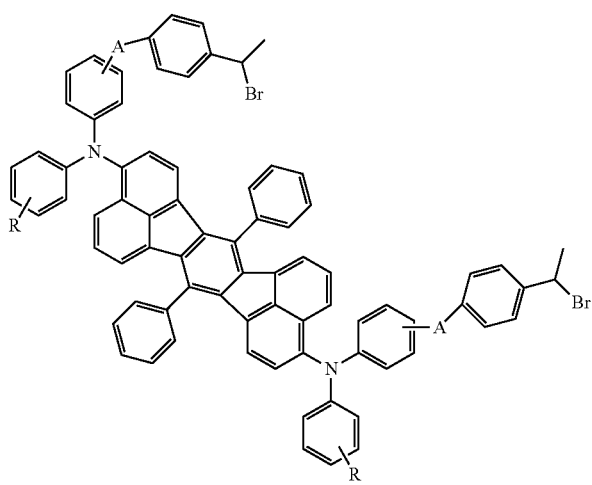

-continued
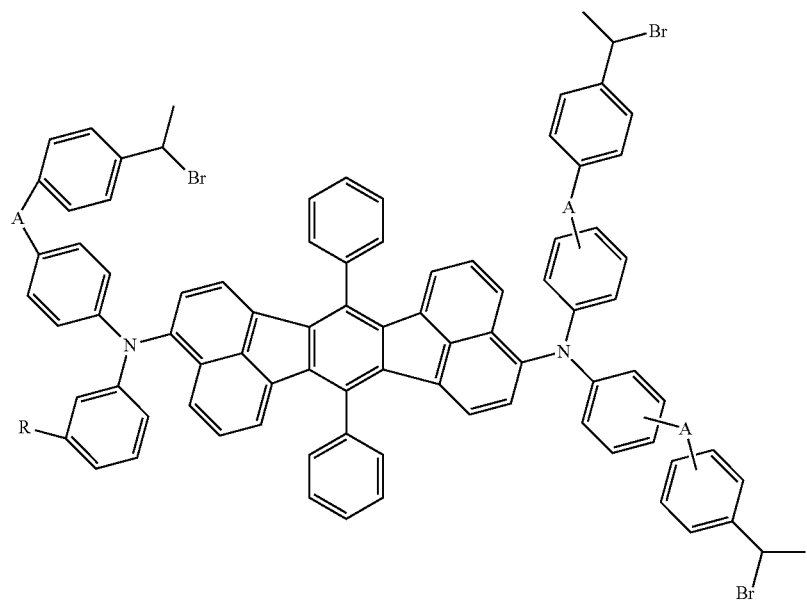
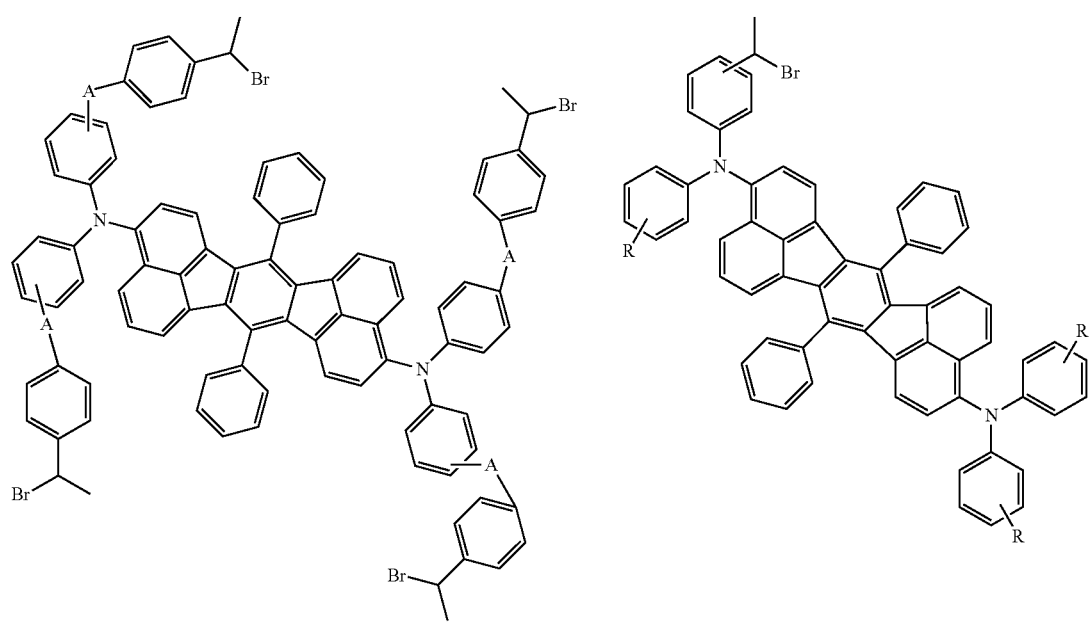

-continued
37a 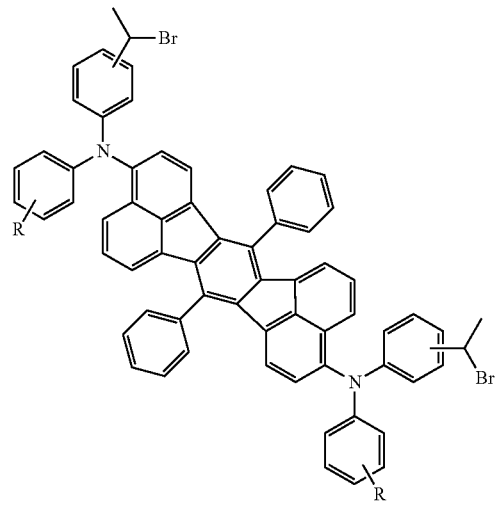
38a 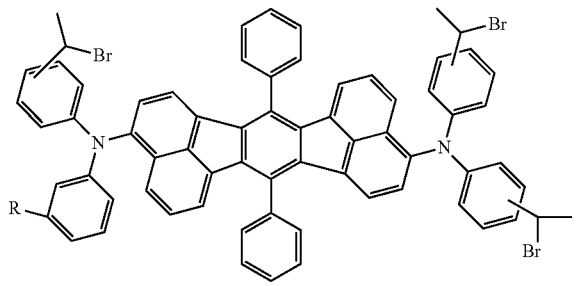
39a 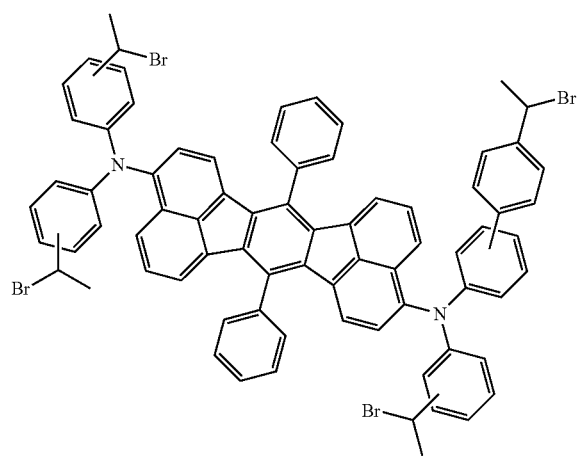
40 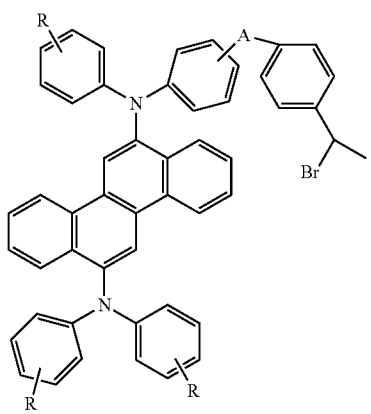
41 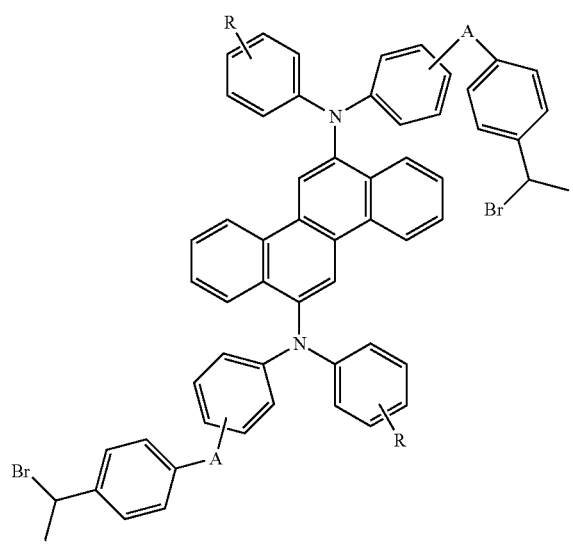
42 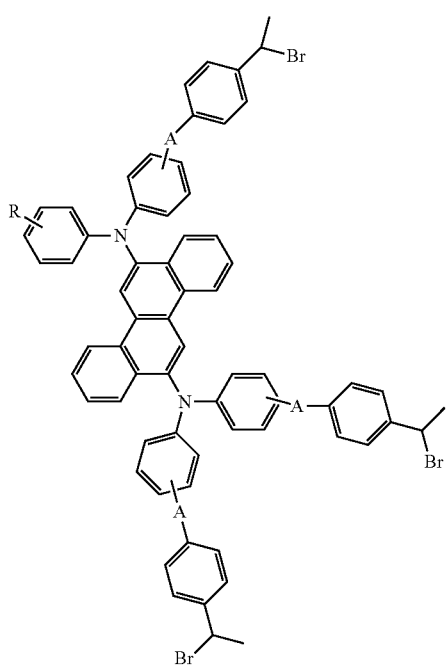

43
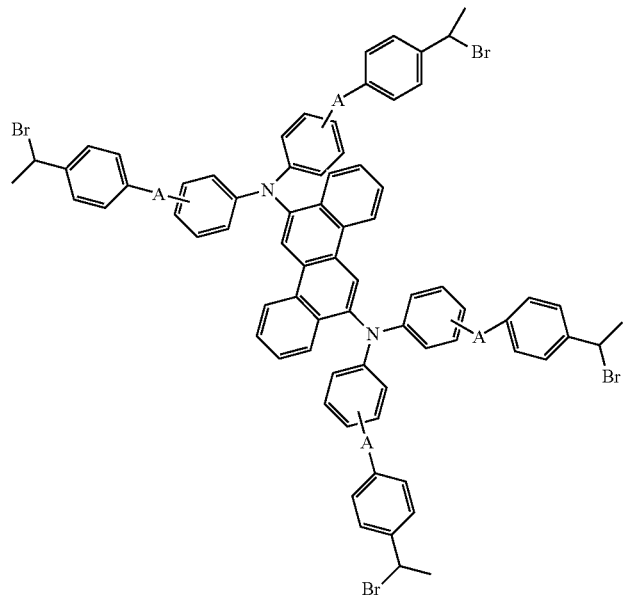
40a
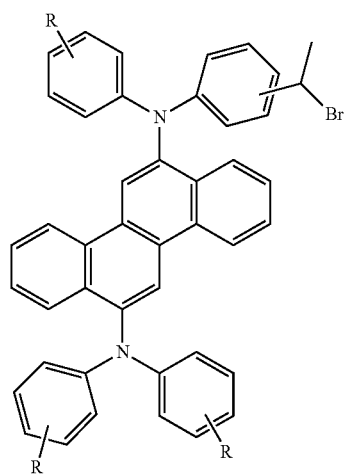
41a
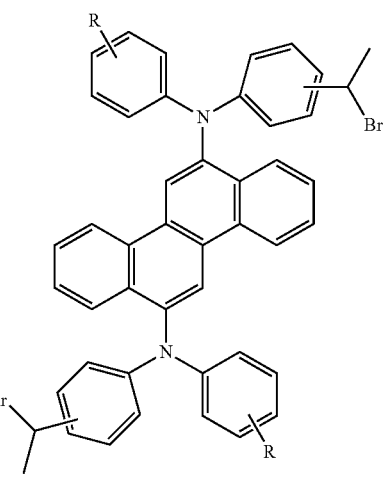
42a
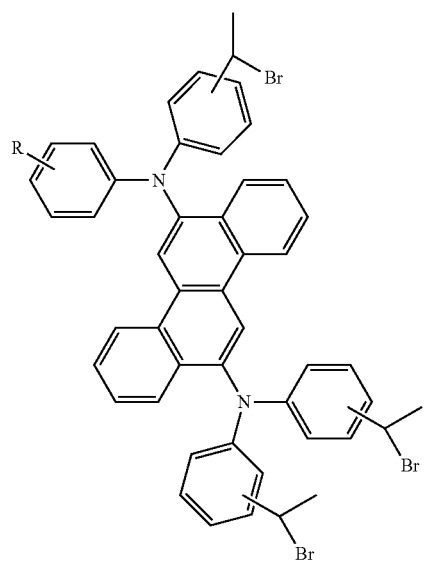
43a
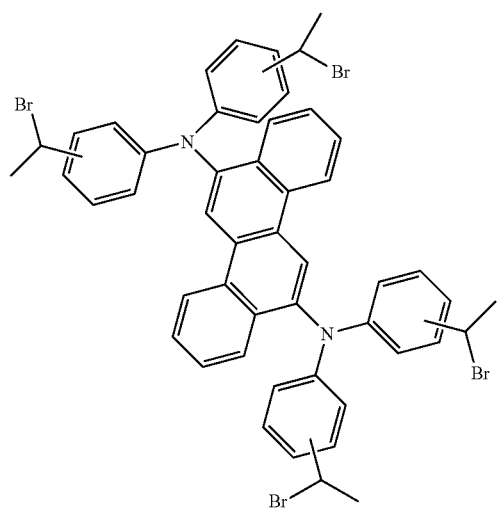

-continued
44
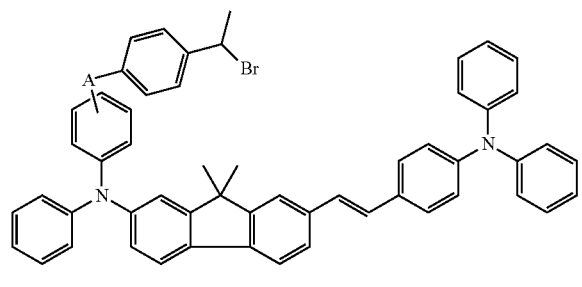
45
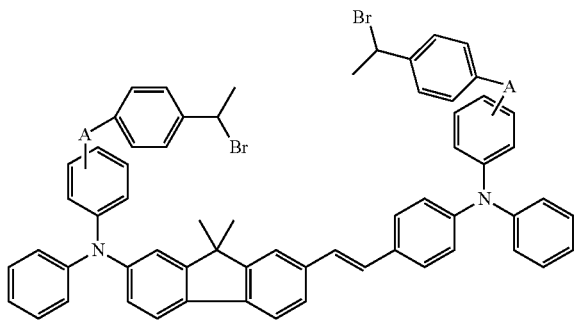
46
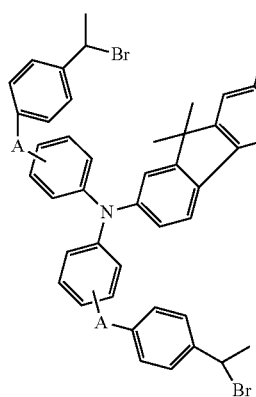
47
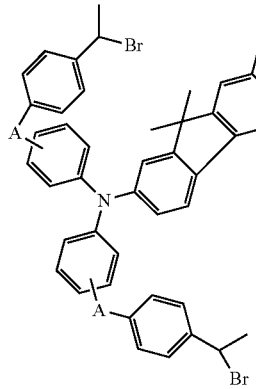
44a
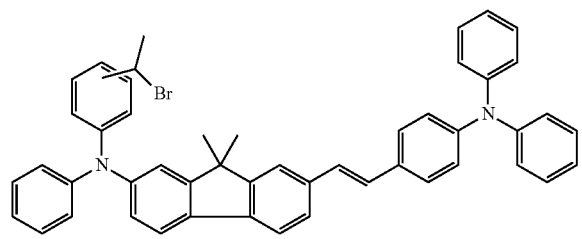
45a
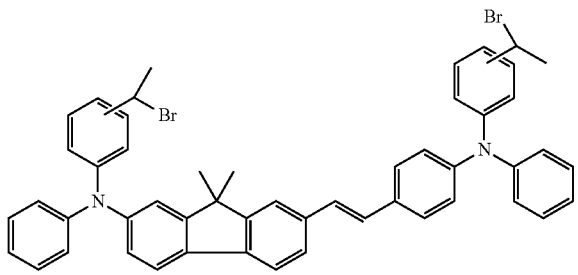

-continued
46a
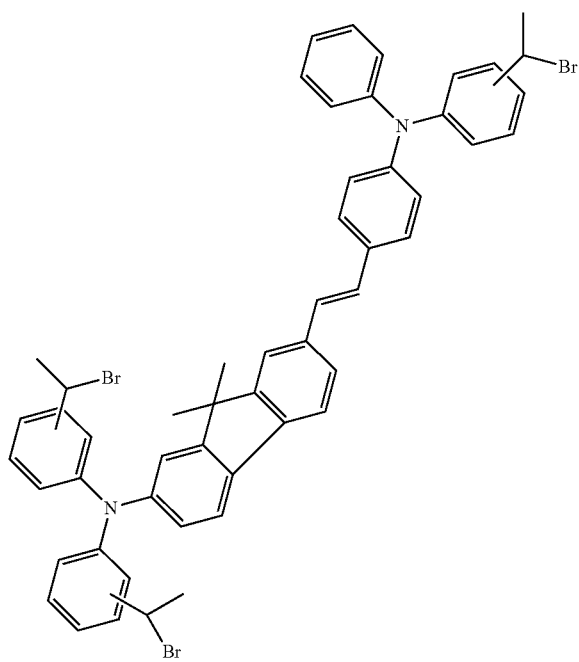
47a
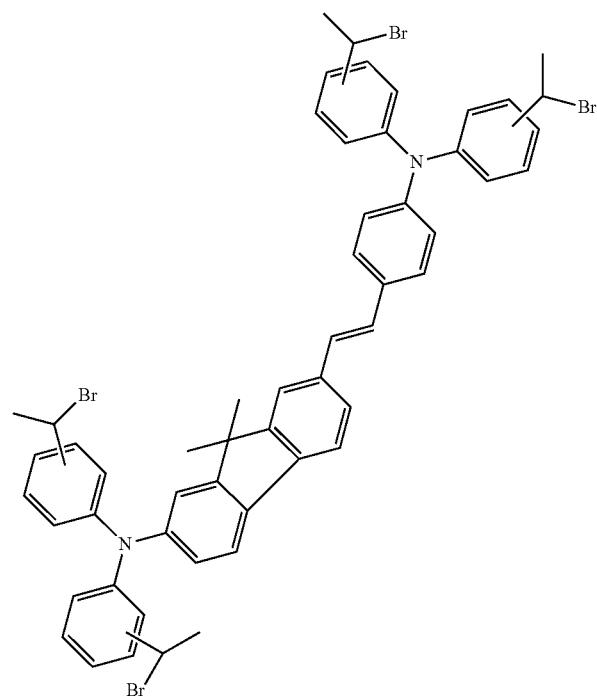
48
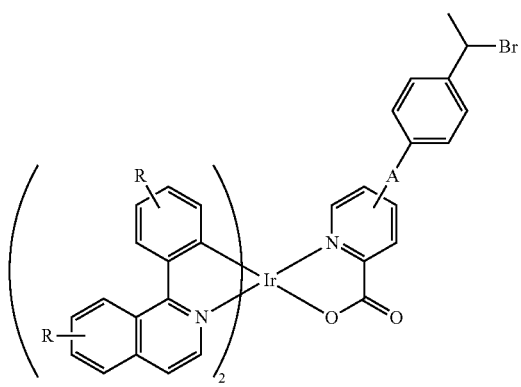
49
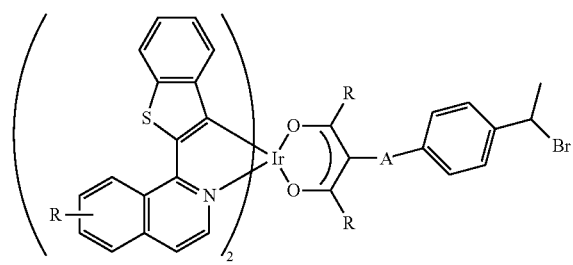
50
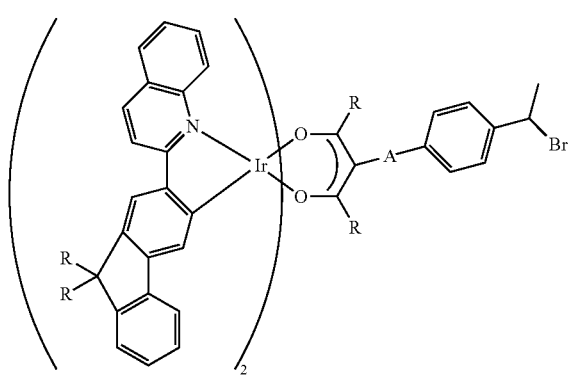
51
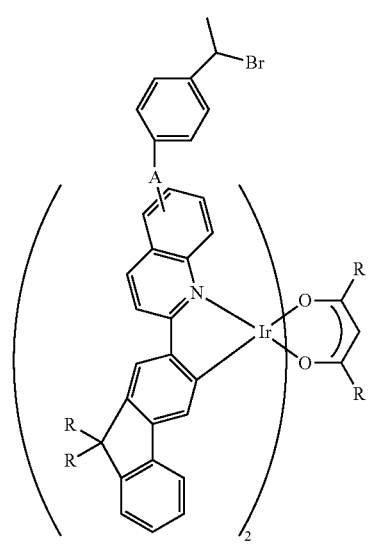

-continued
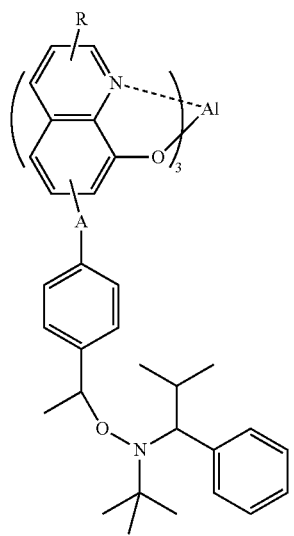
52
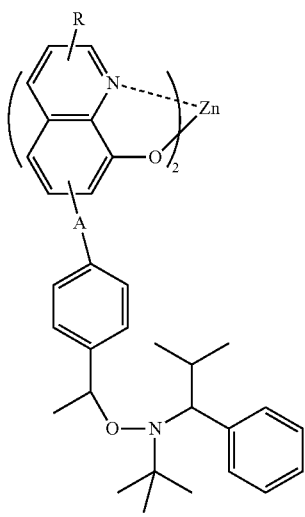
53
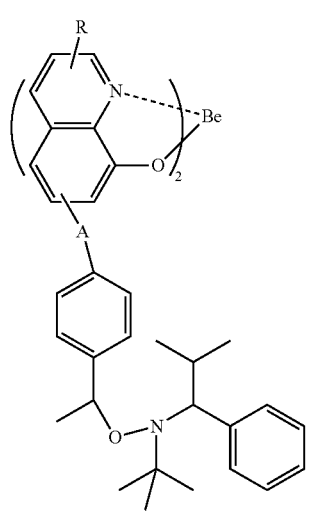
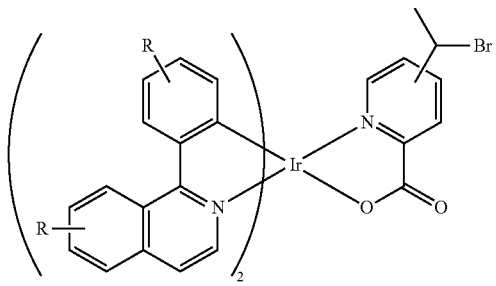
54
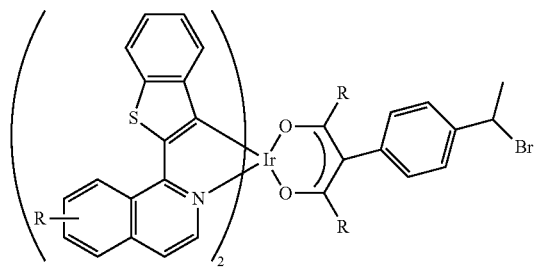
48a
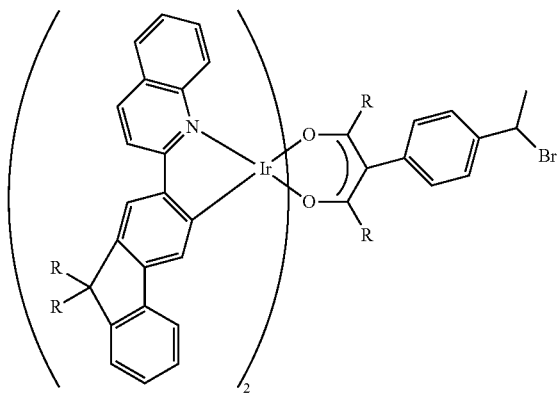
49a  50a -continued
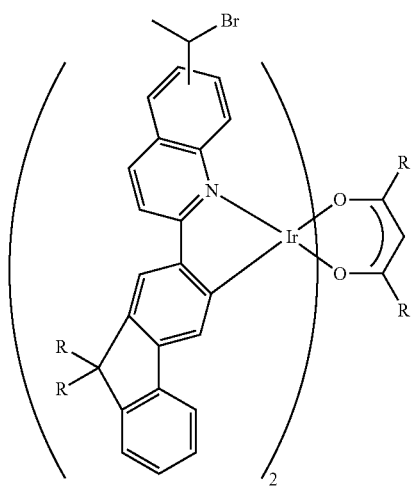 51a
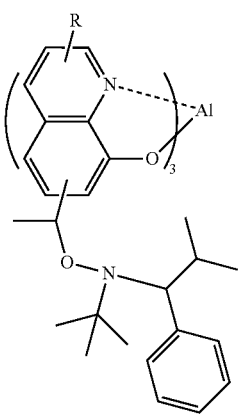 52a
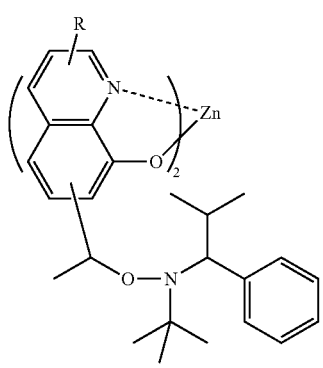 53a
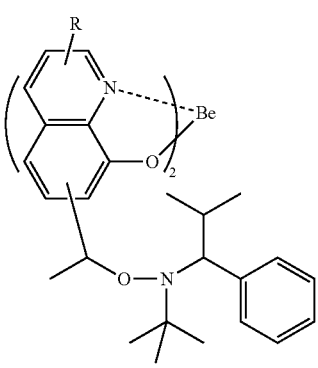 54a
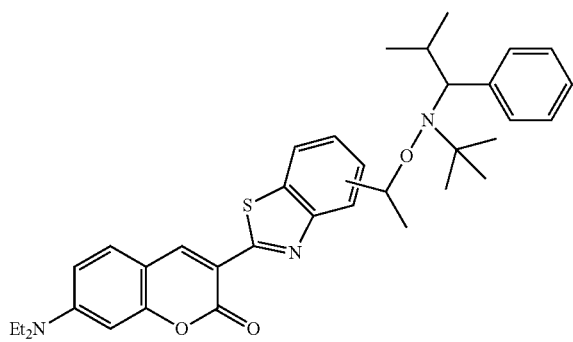 55
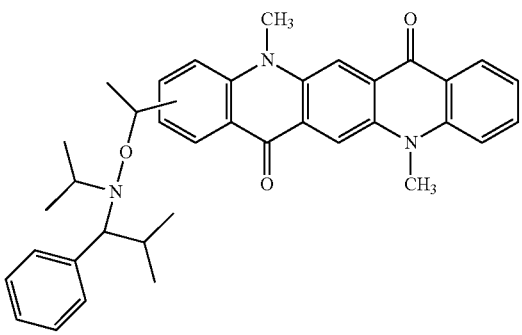 56
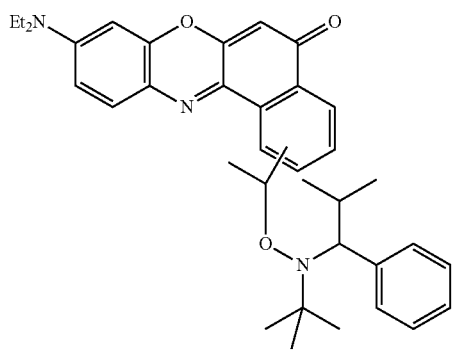 57
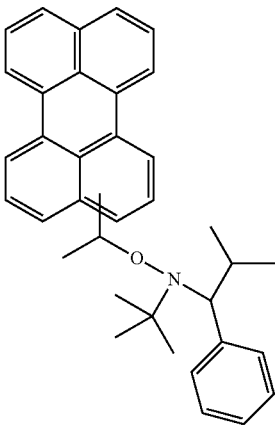 58

59
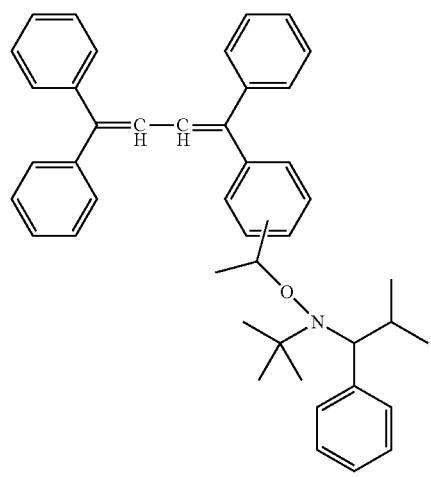
60
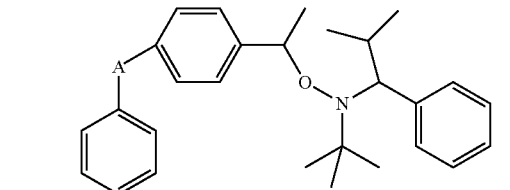
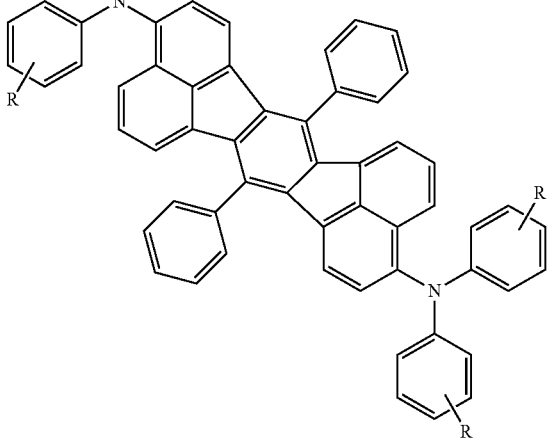
61
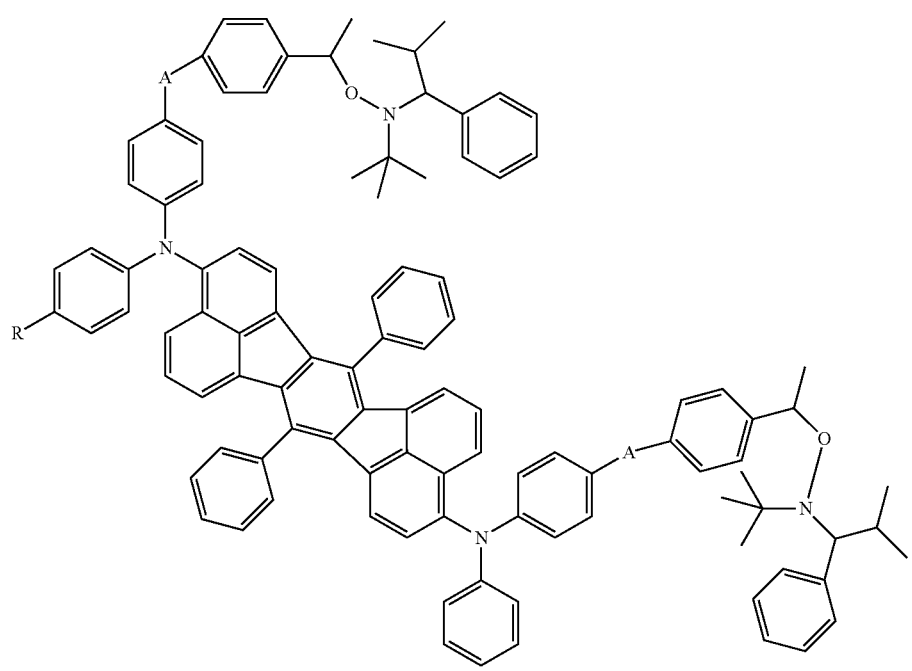

-continued
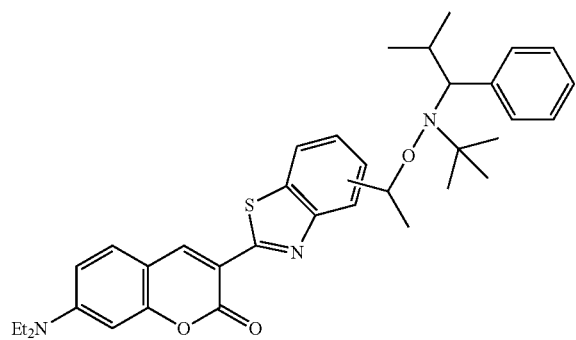
55a
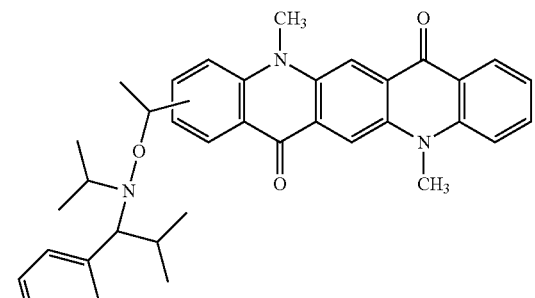
56a
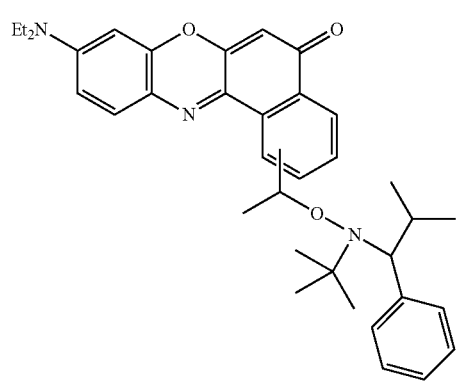
57a
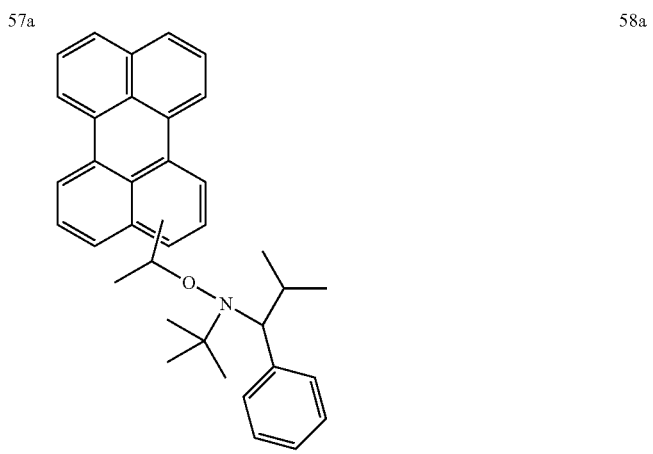
58a
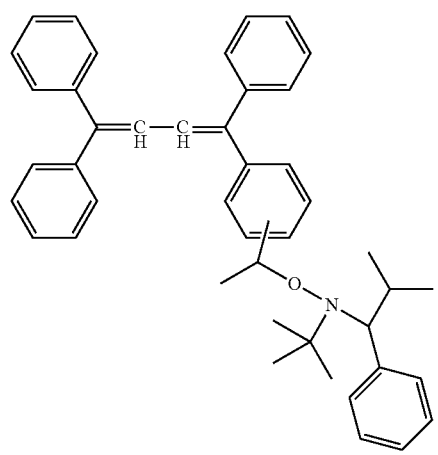
59a
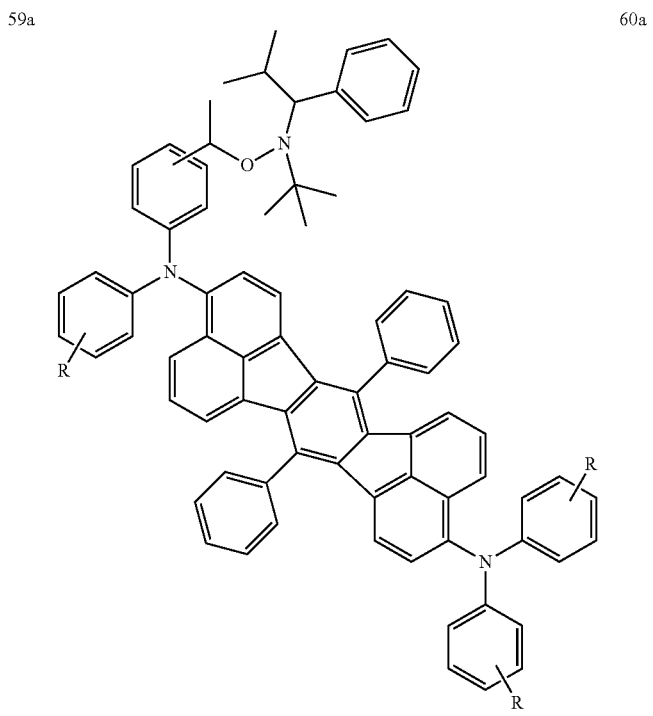
60a -continued
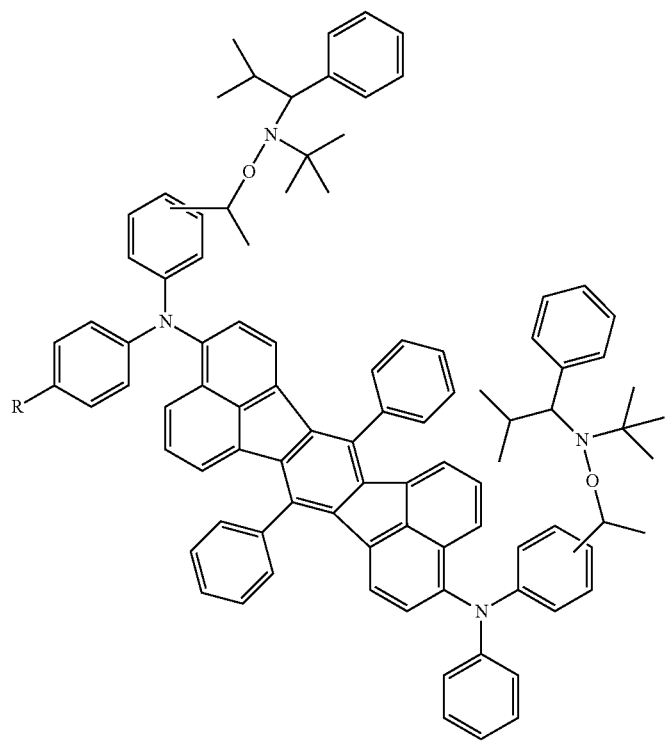
61a
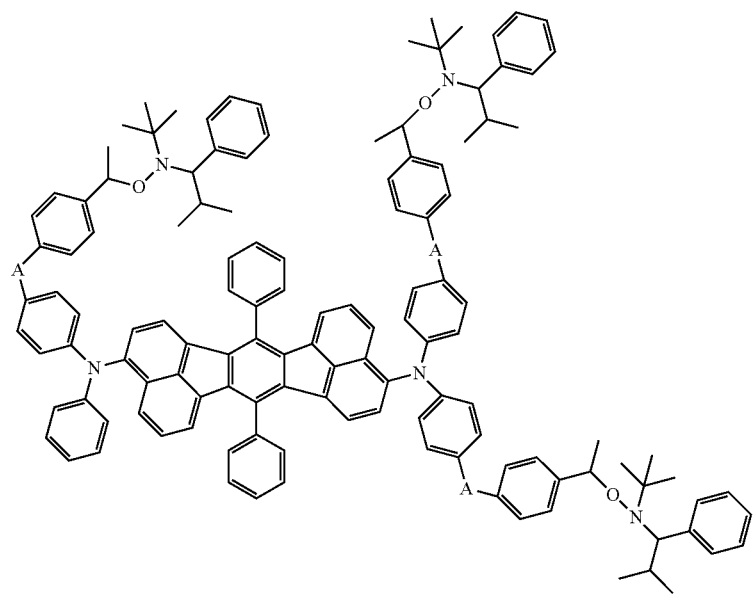
62

-continued
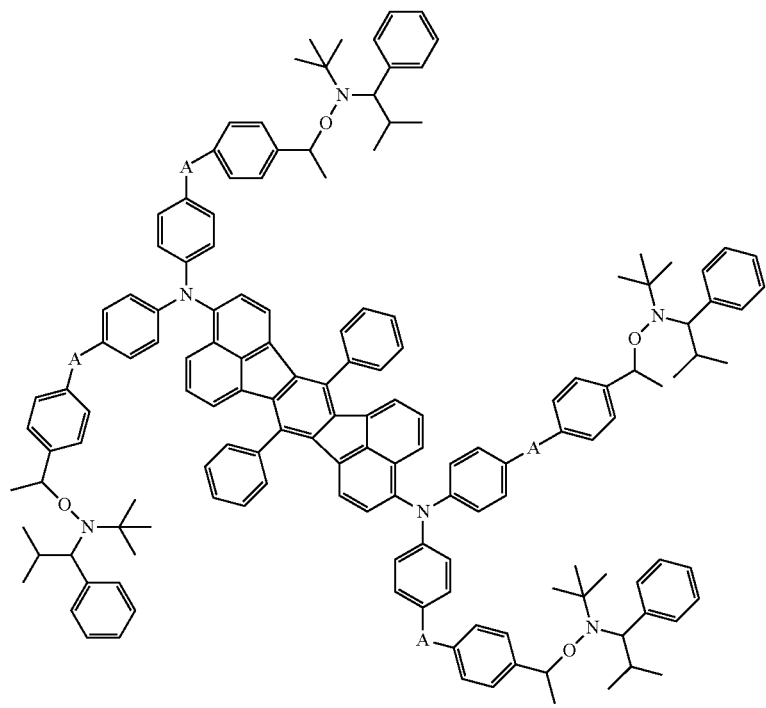
63
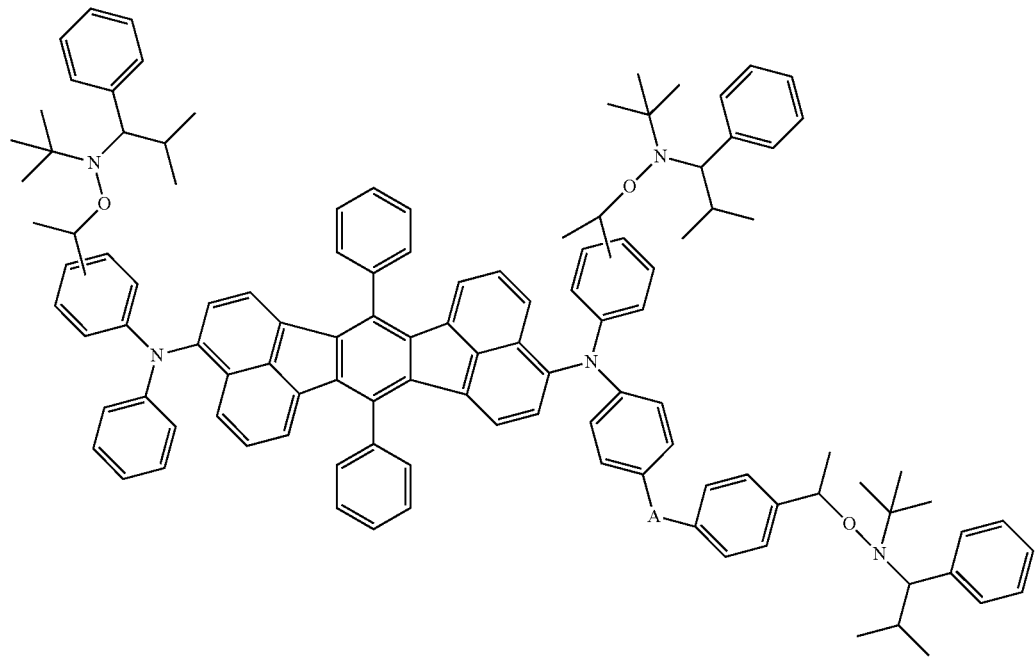
62a

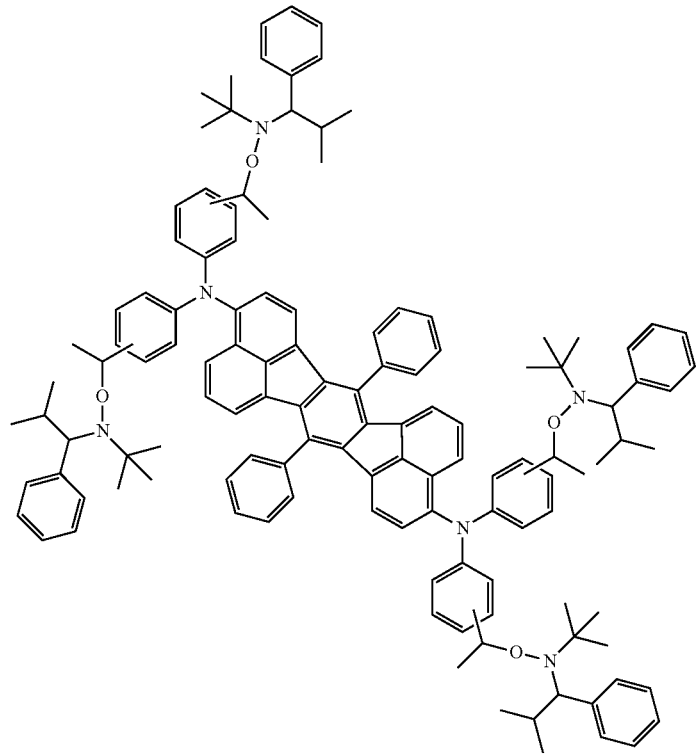
63a
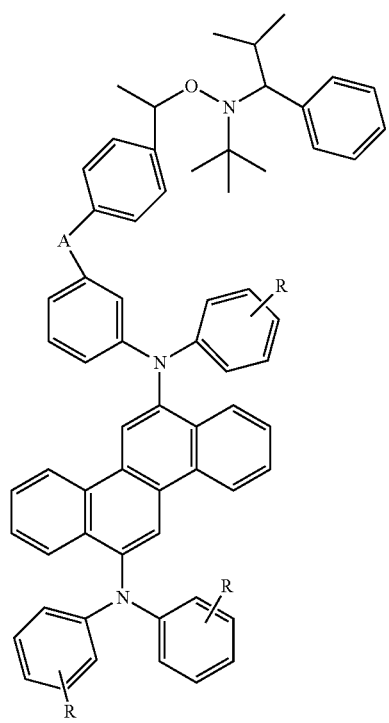
64
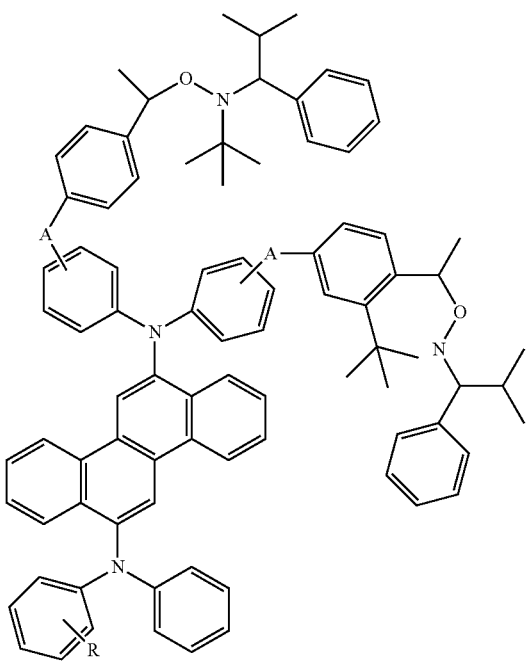
65

-continued
66
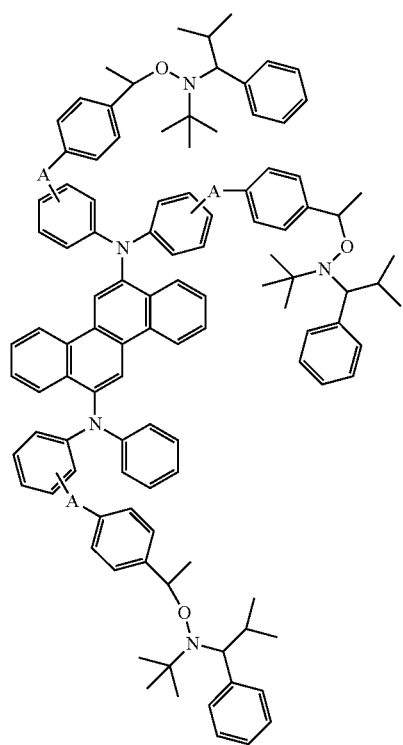
67
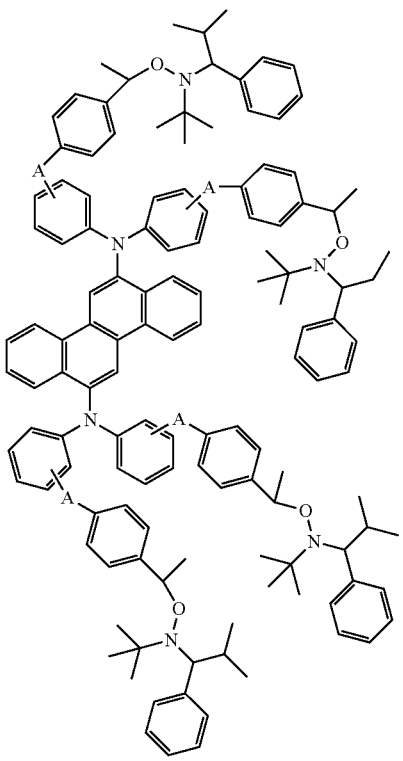
64a
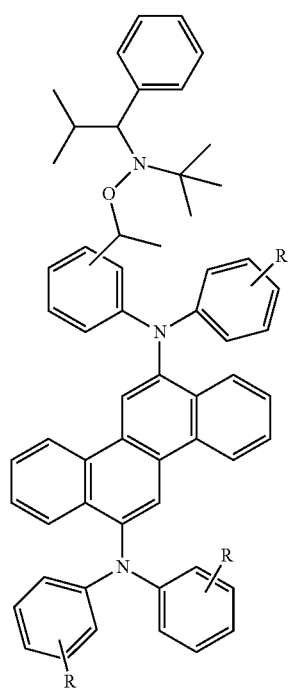
65a
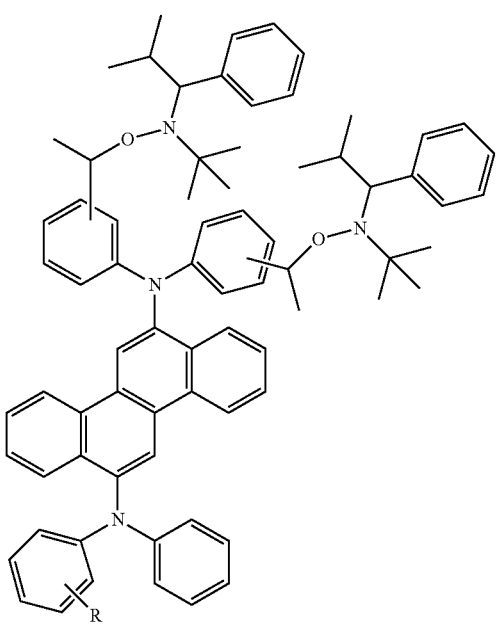

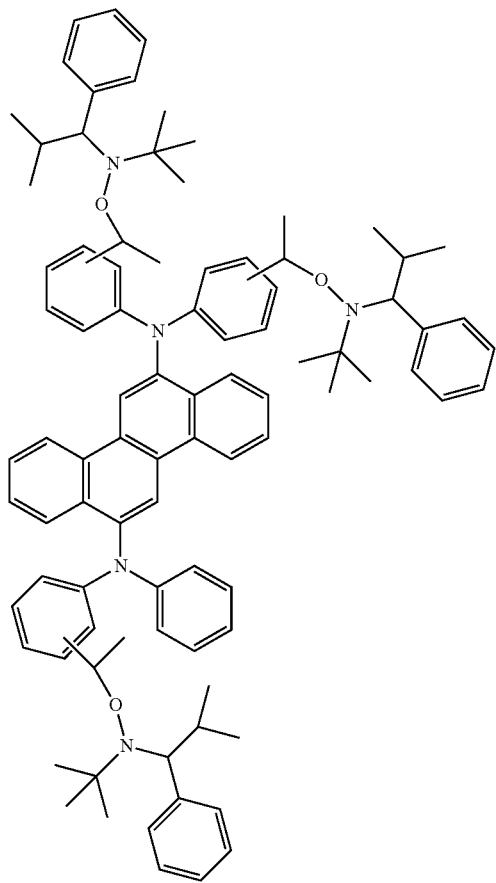
66a
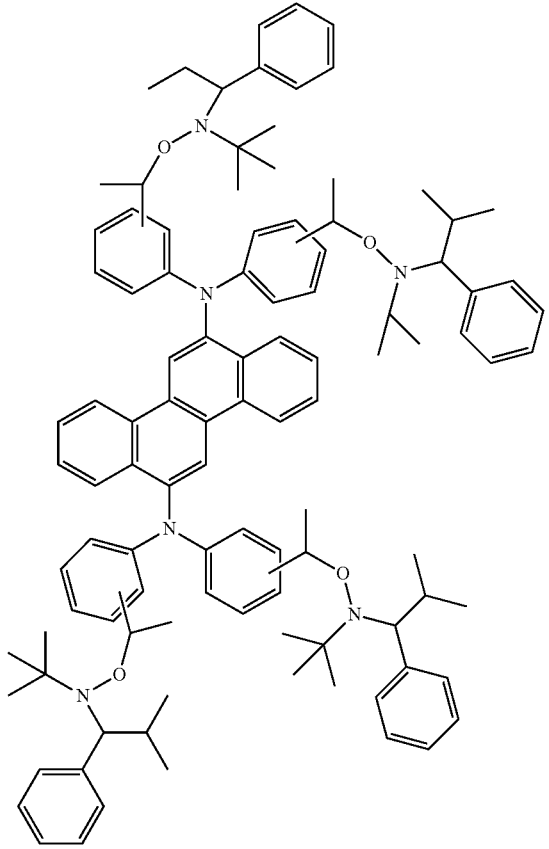
67a
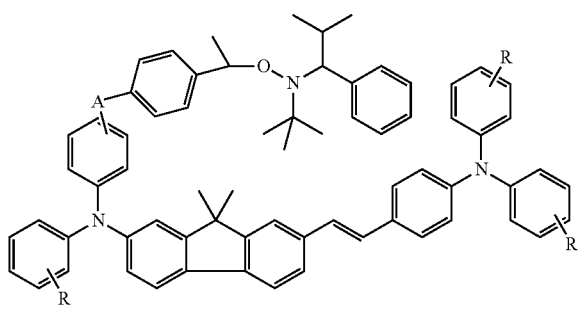
68
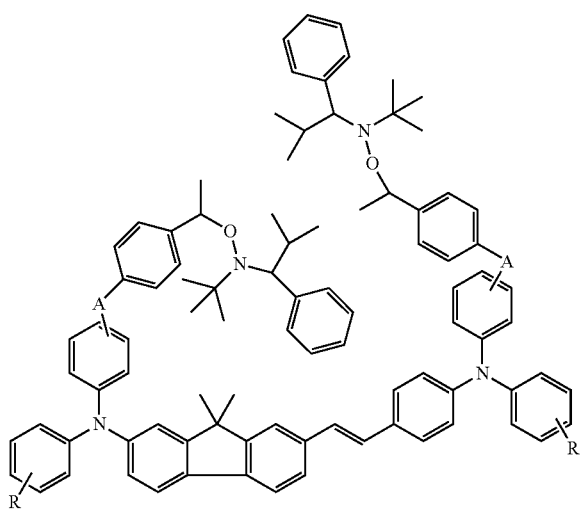
69

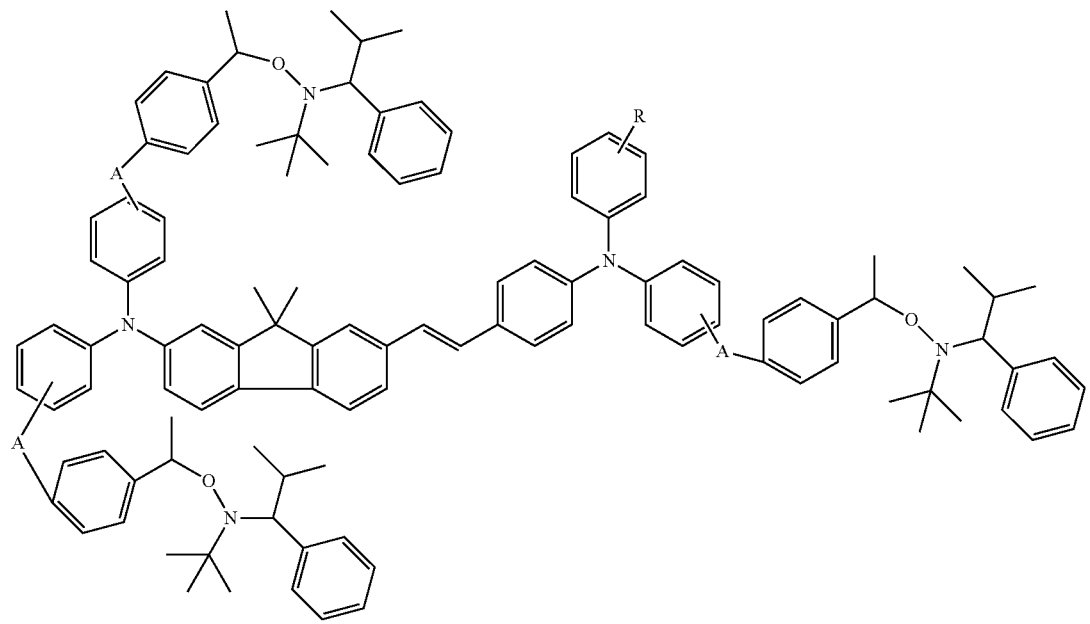
70
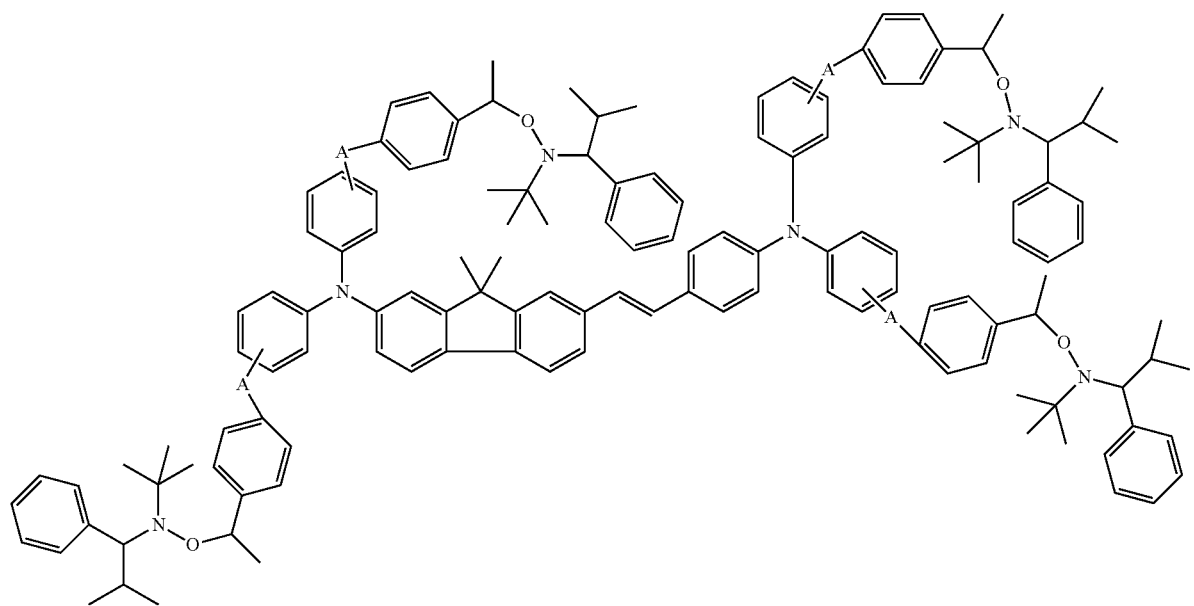
71

-continued
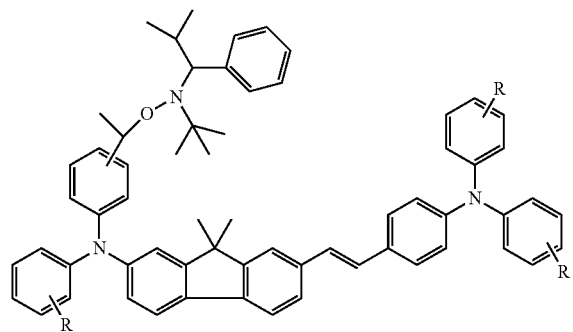
68a
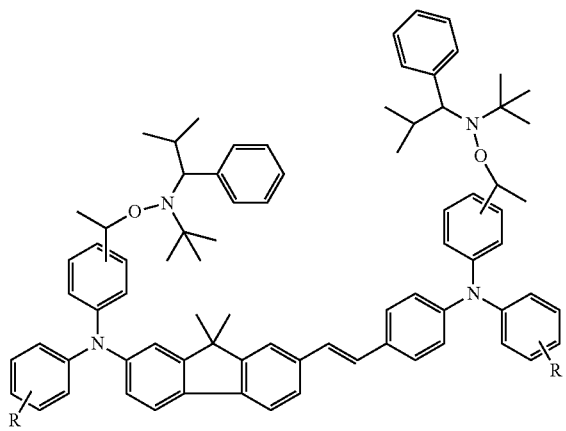
69a
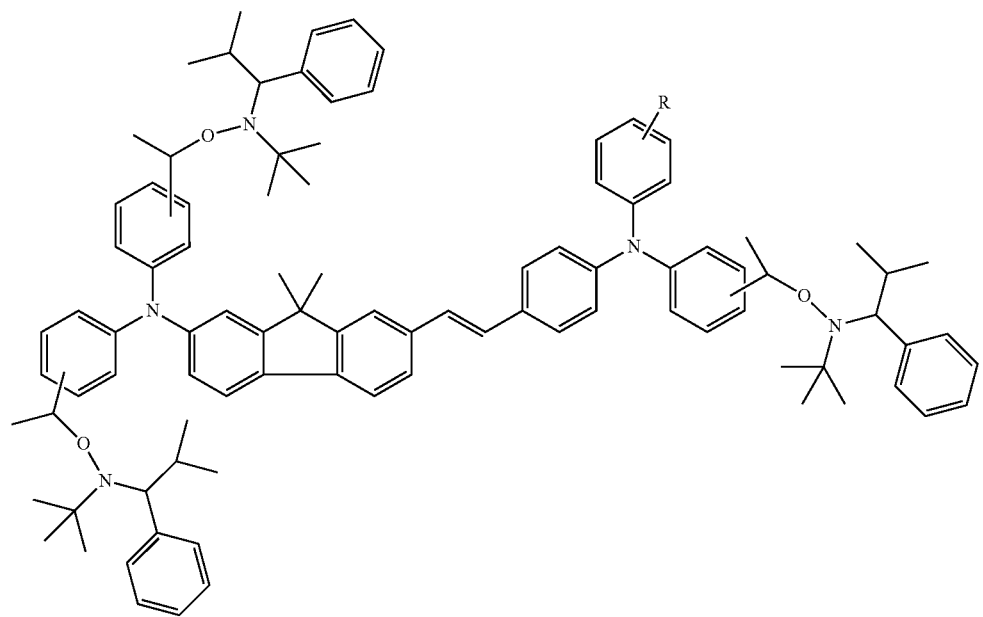
70a
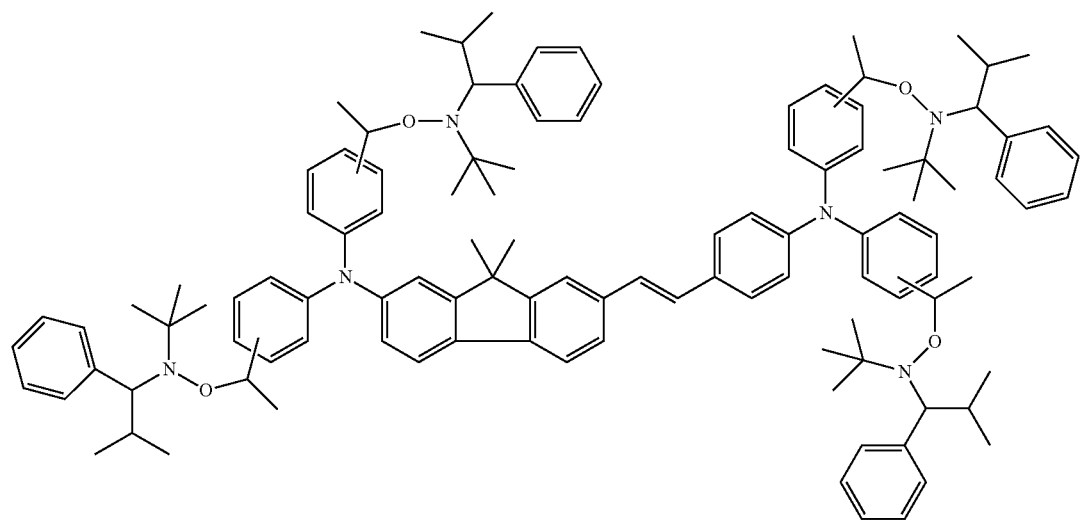
71a

-continued
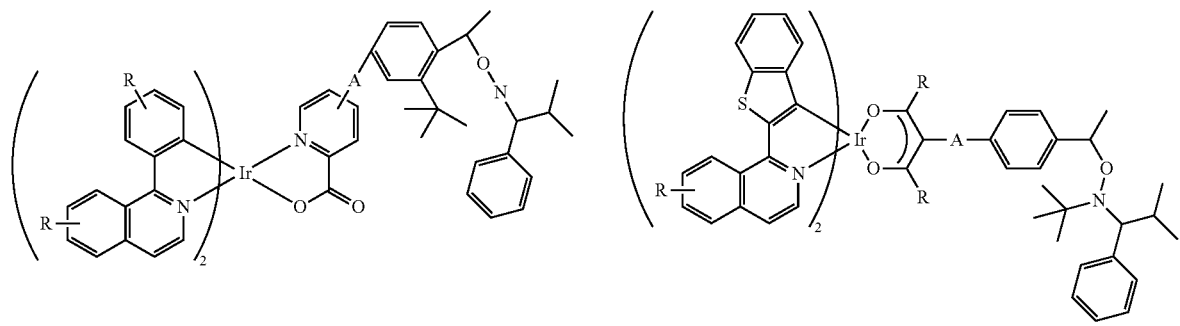
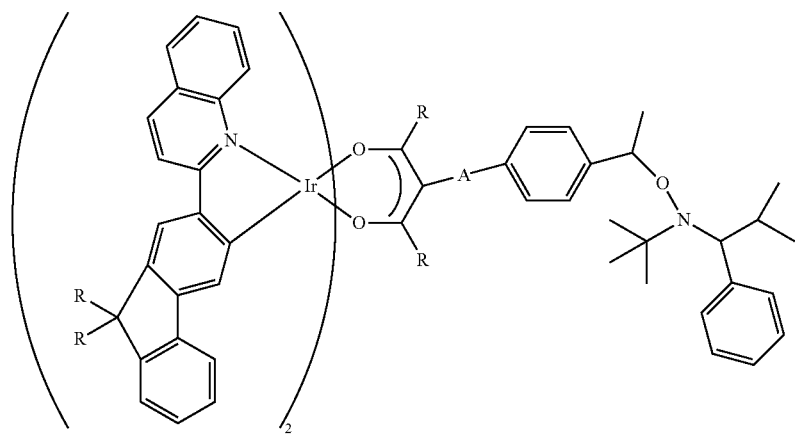
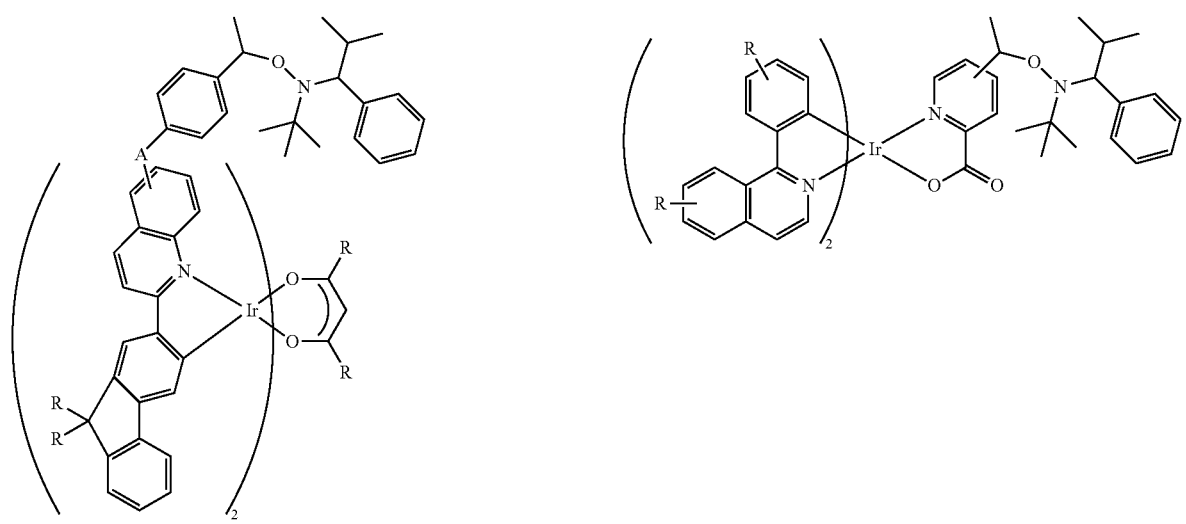

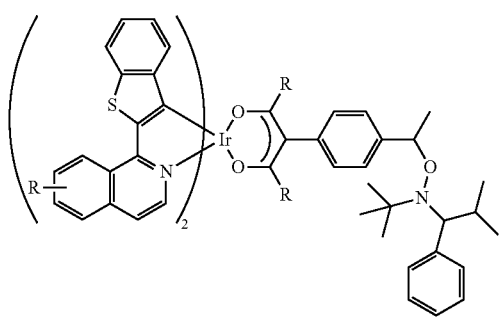 73a

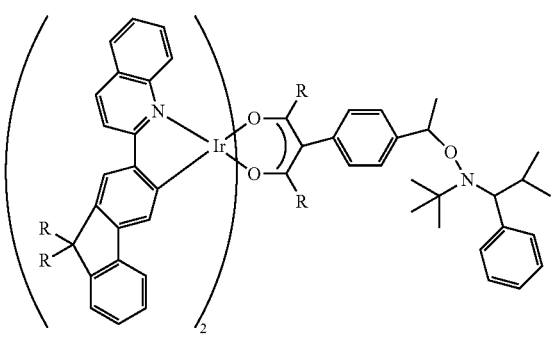 74a

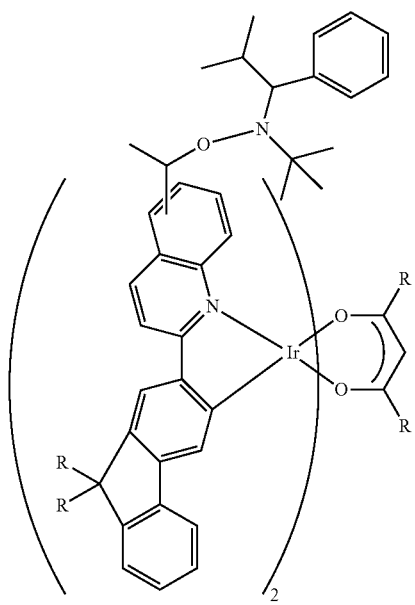 75a

A may be, for instance, heteroalkyl, silyl, siloxane, alkyl group.

R may be, for instance, alkyl (linear/branched), O-alkyl, cyclic alkyl, aryl, fused aryl, heteroaryl.

The light emitting components $X_2$ and $X_3$ have vinyl functional groups connected to an emitting component. The emitting components $X_2$ and $X_3$ are selected from the group consisting of substituted or unsubstituted organic fluorescent materials, substituted or unsubstituted phosphorescent organic metal complexes, and substituted or unsubstituted phosphorescent organic complexes, wherein the phosphorescent organic metal complex is provided as a complex of organic ligand and a metal selected from a transition metal group or rare earth metal group.

The emission colour of $X_2$ and $X_3$ may be selected from 400 nm to 800 nm.

The vinyl functionality is connected to the emitting component directly or by a linker A. The linker A may be selected independently from, for instance, the group consisting of heteroalkyl, silyl, siloxane, alkyl group.

The vinyl functional group R" is selected from the group consisting of vinyl, N-vinyl, vinyl ester, meth(acrylate), meth(acrylamide), maleic anhydride and maleimide.

R may be, for instance, alkyl (linear/branched), O-alkyl, cyclic alkyl, aryl, fused aryl, heteroaryl.

Some examples of the emitting components $X_2$ and $X_3$ are shown below as compounds 76 to 125 and 76a to 125a.

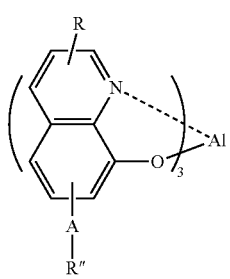 76

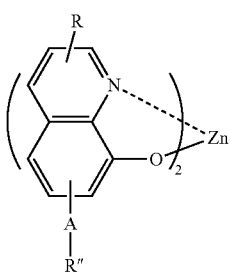 77

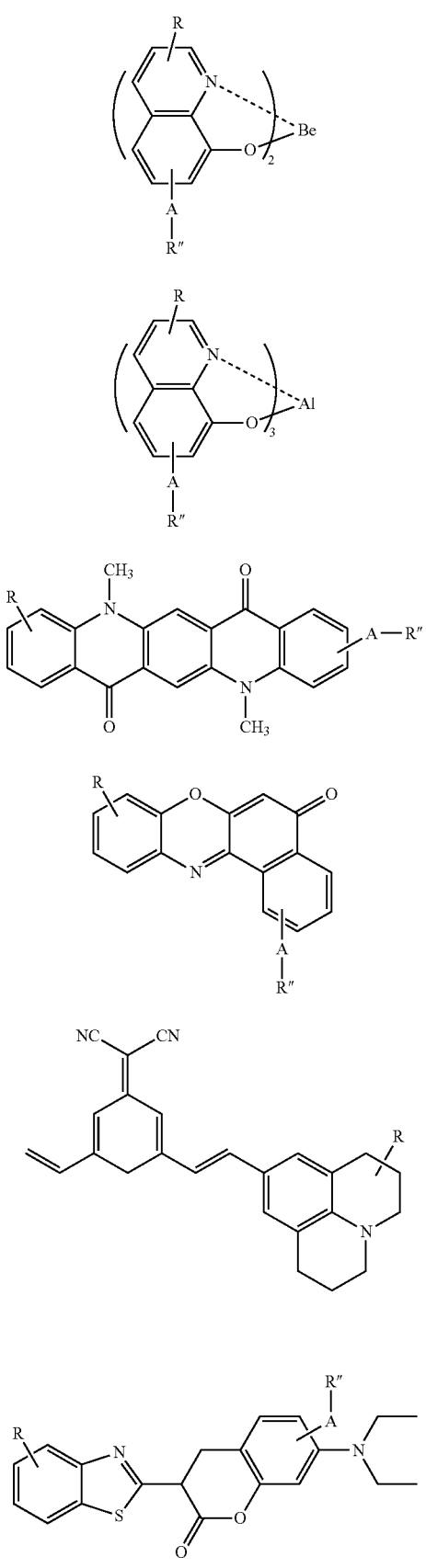
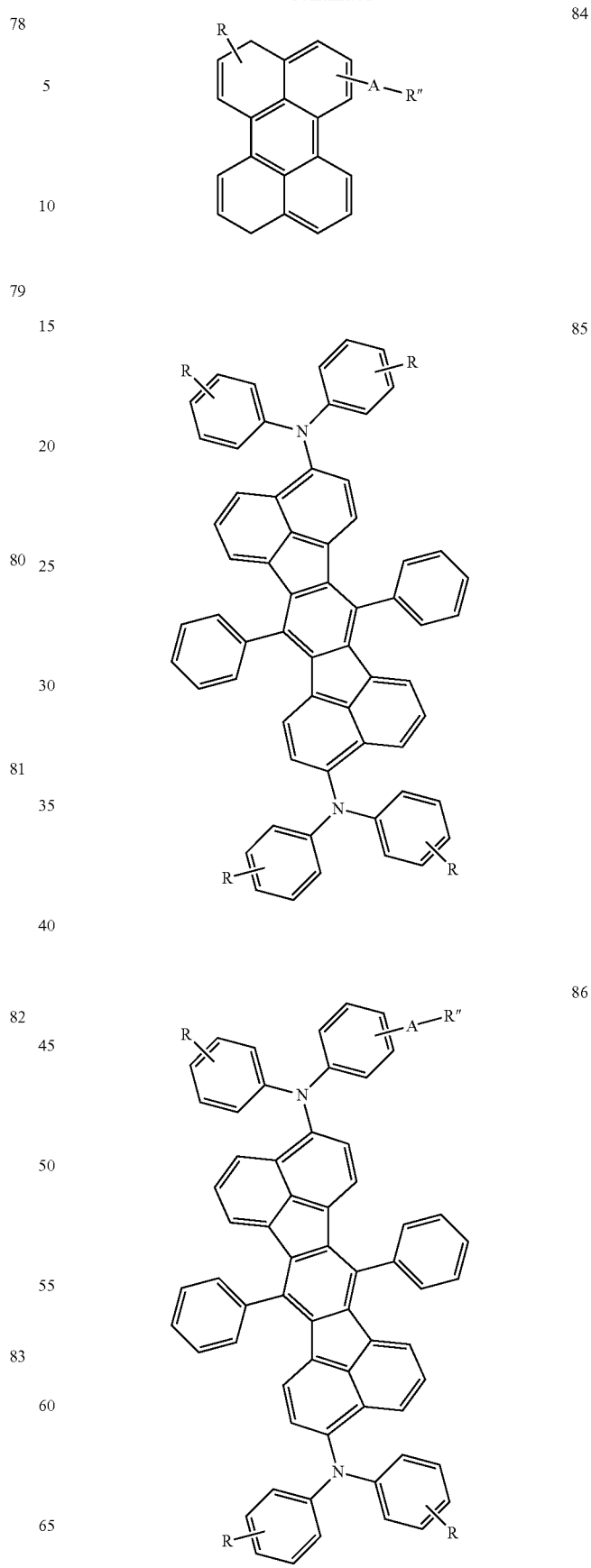

73
-continued
87
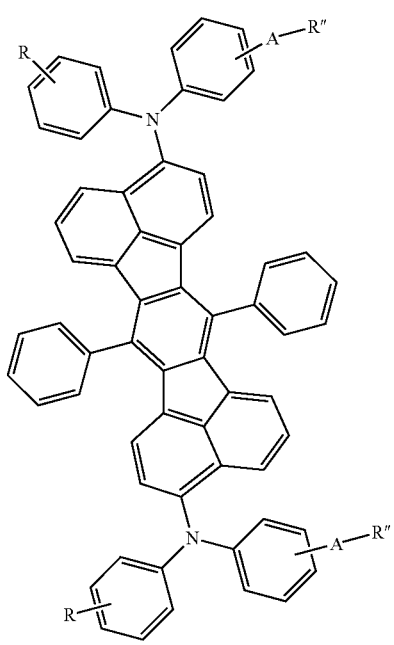
76a
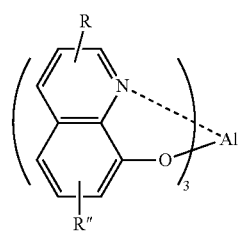
77a
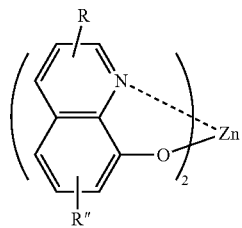
78a
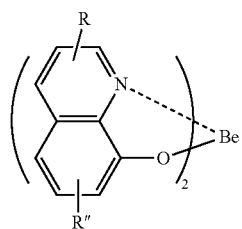
79a
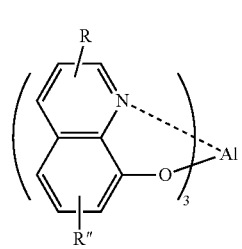
74
-continued
80a
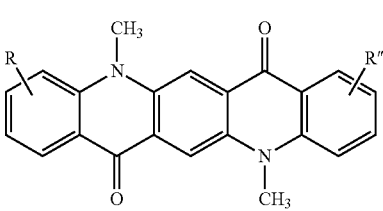
81a
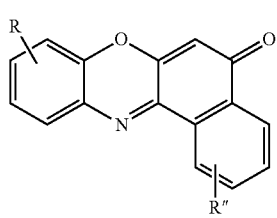
82a
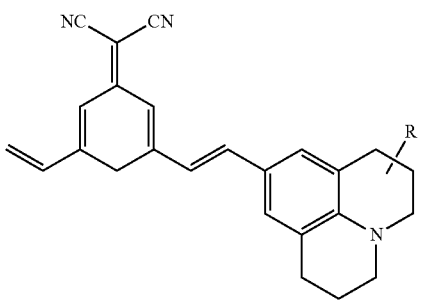
83a
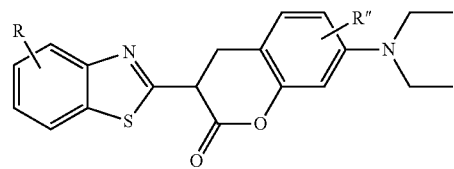
84a
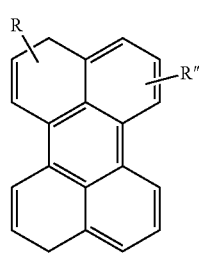

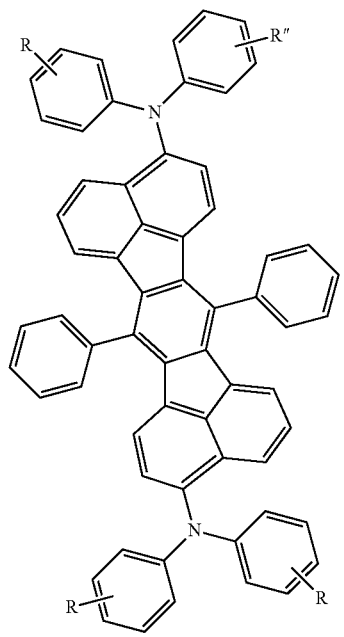
75
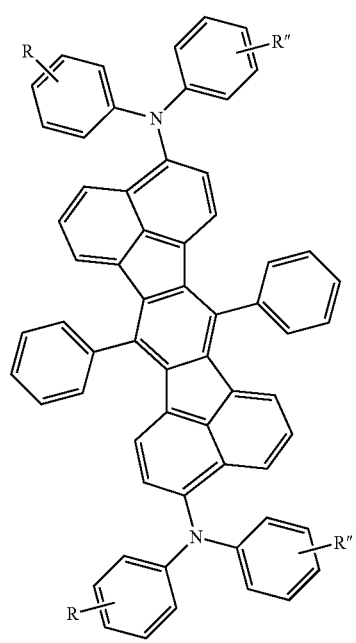
87a
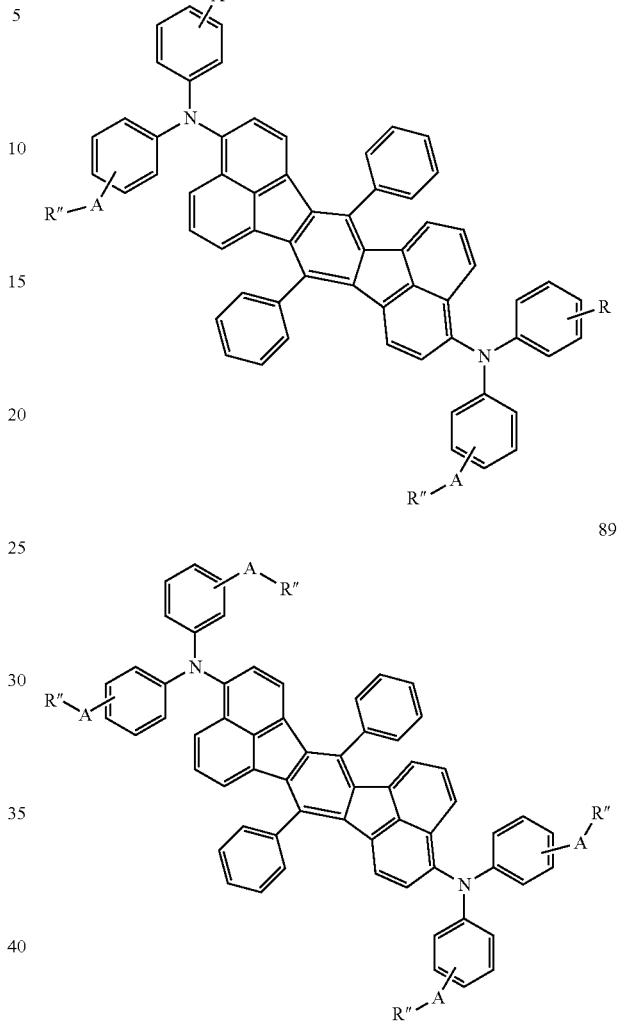
86a
88
89
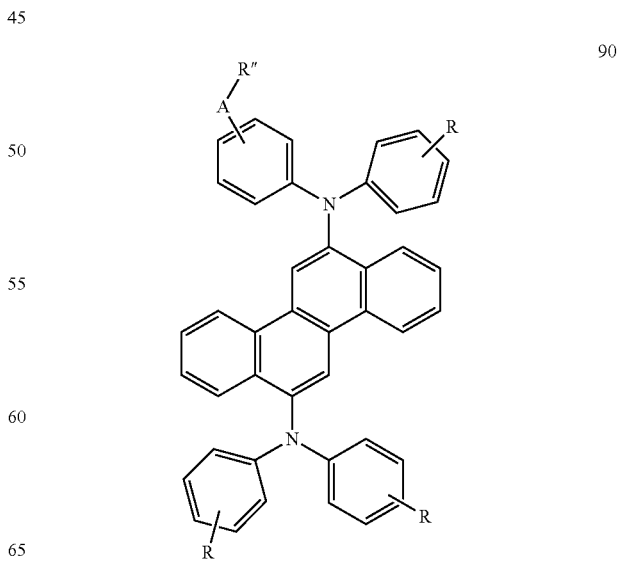
90

77 78
-continued -continued
91
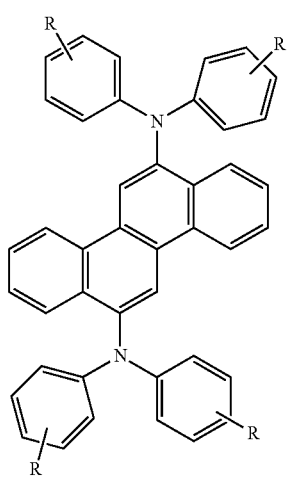
92
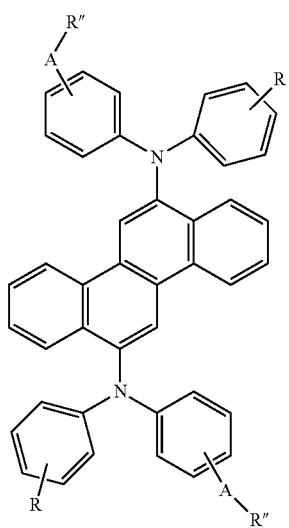
93
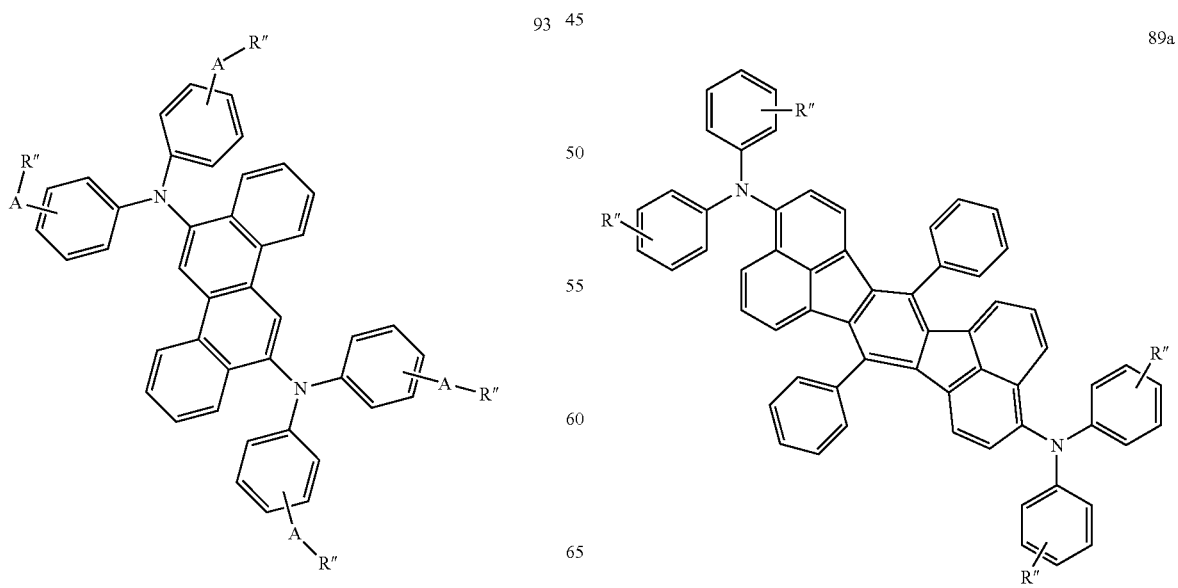
94
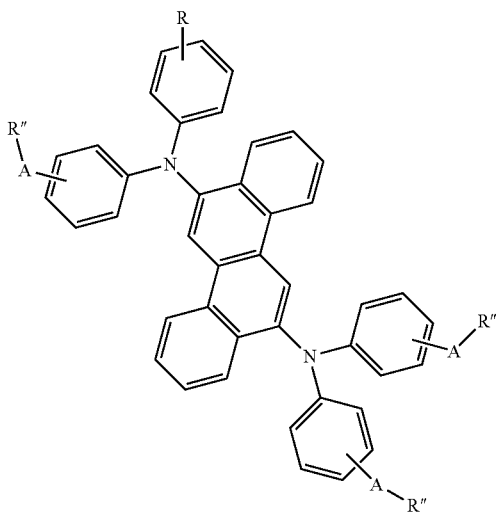
88a
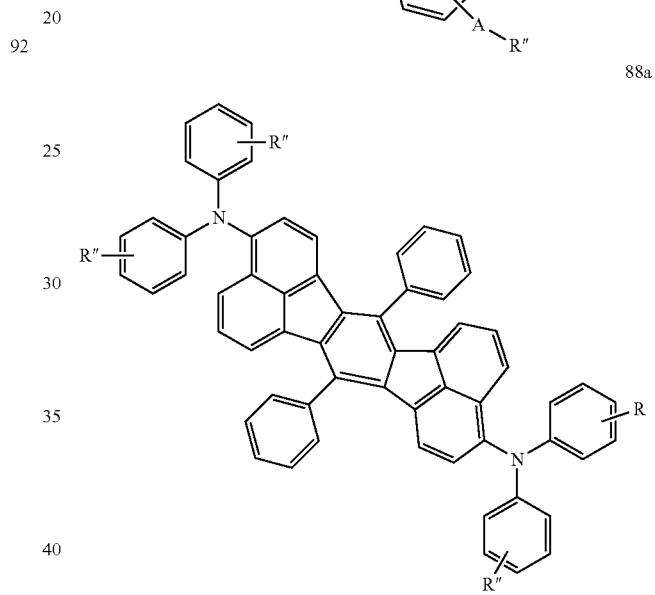
89a

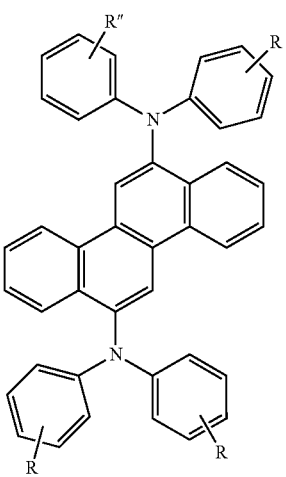
90a
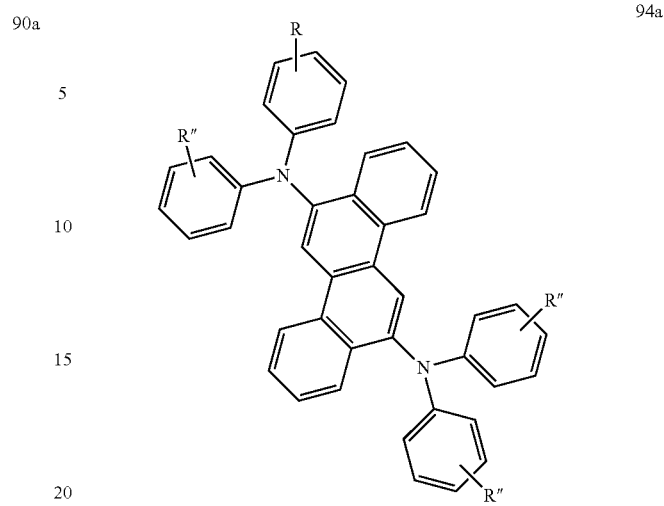
94a
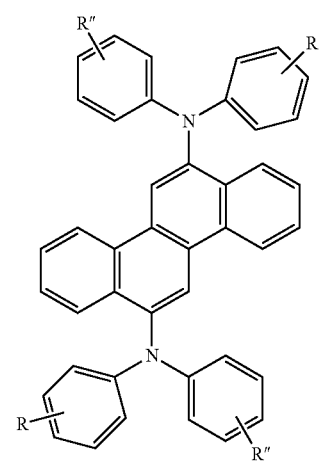
92a
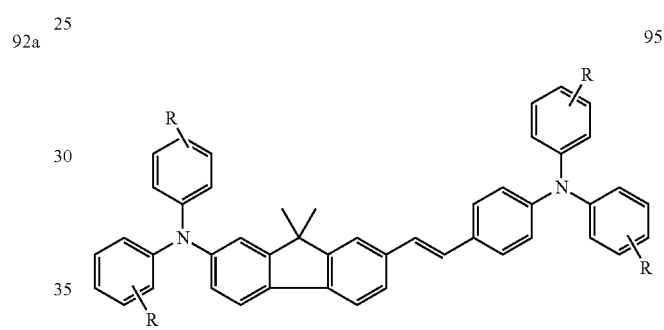
95
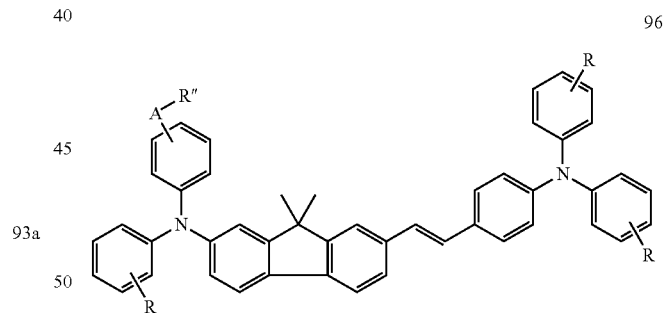
96
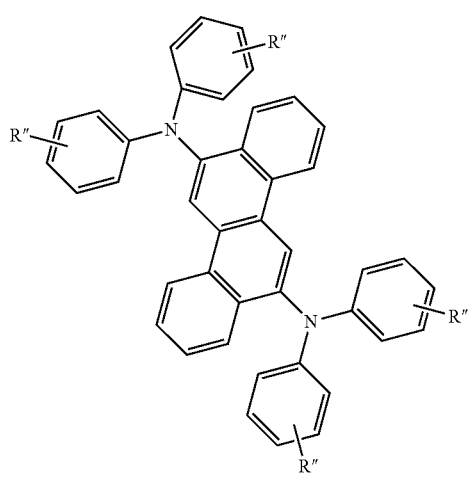
93a
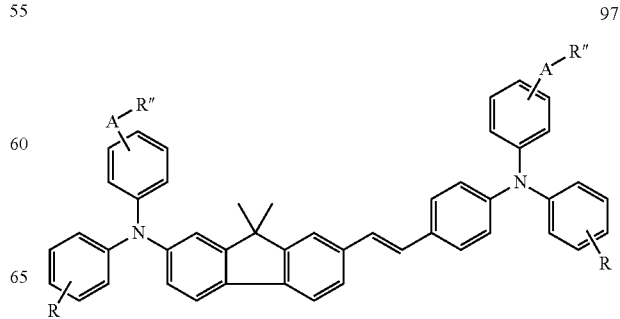
97

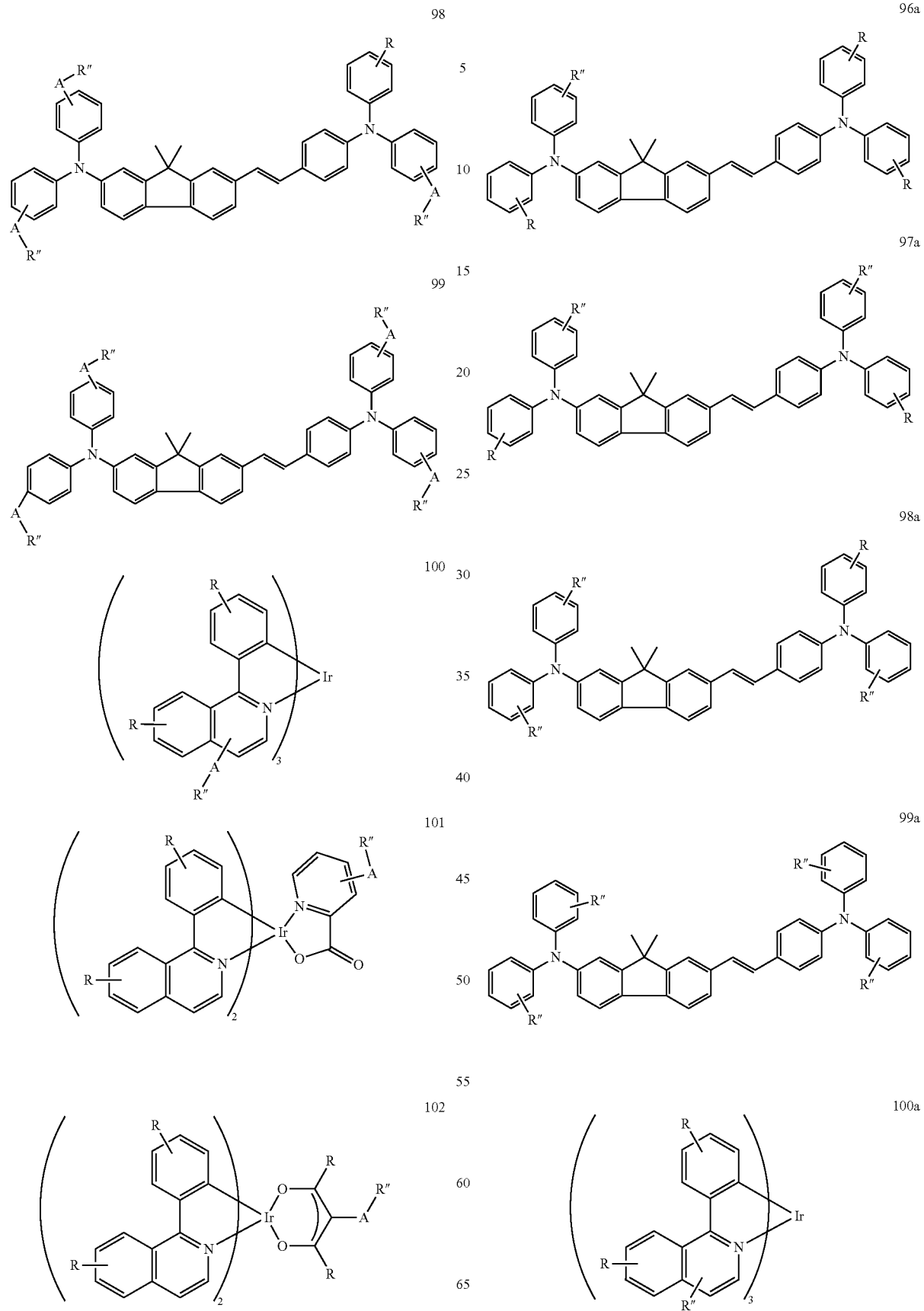

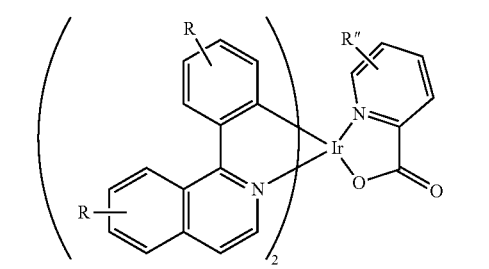
101a
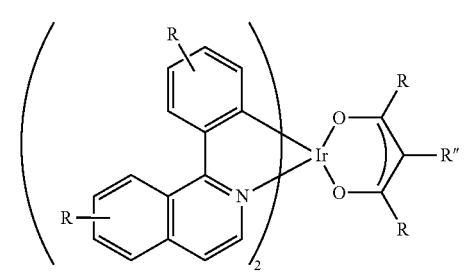
102a
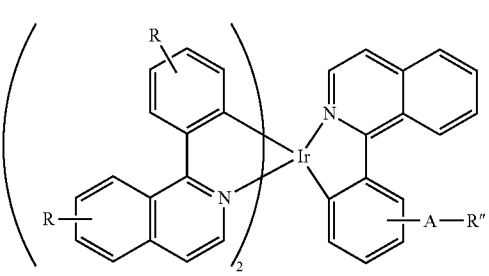
103
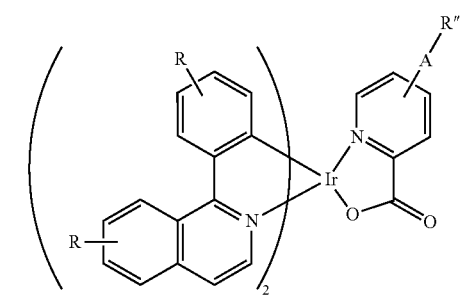
104
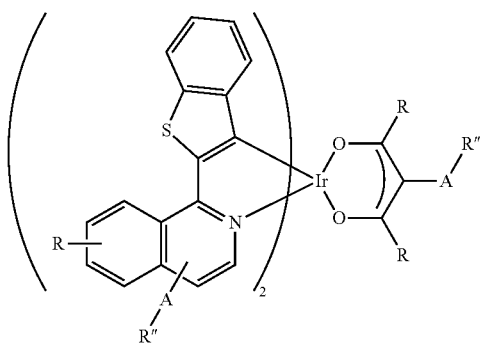
105
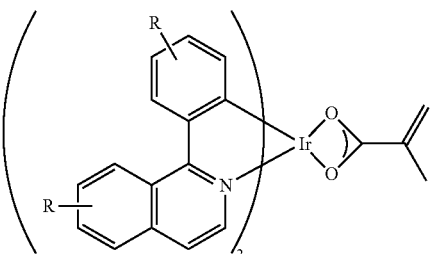
106
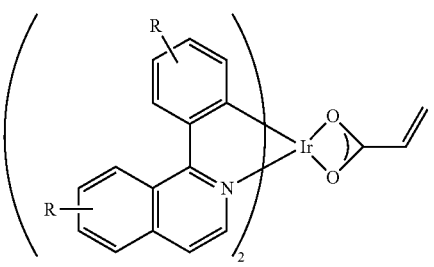
107
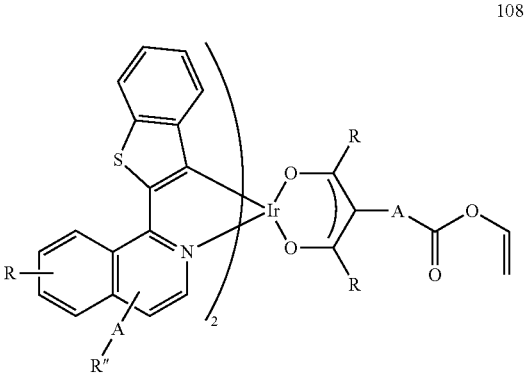
108
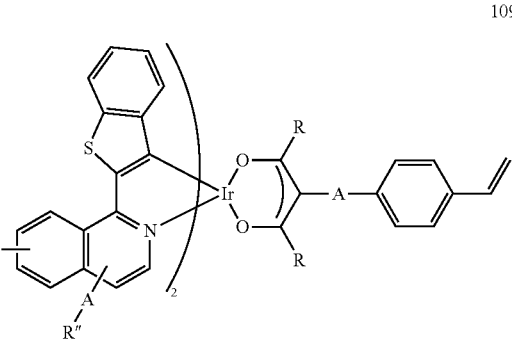
109
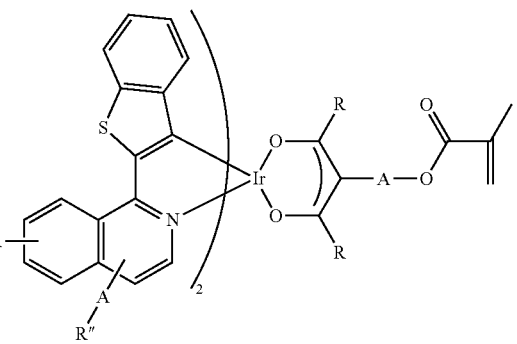
110

111
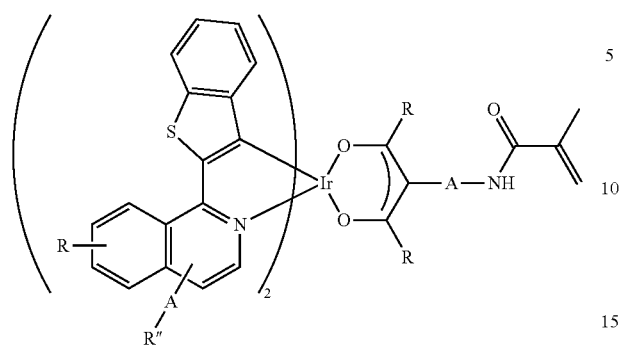
107a
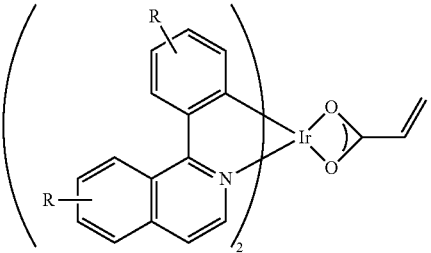
103a
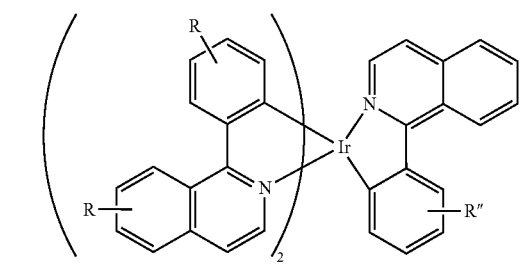
108a
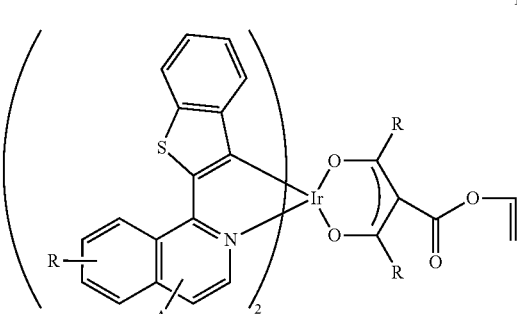
104a
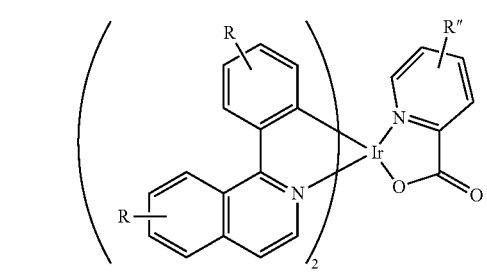
105a
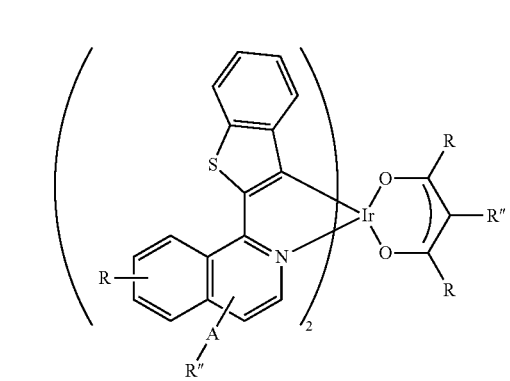
109a
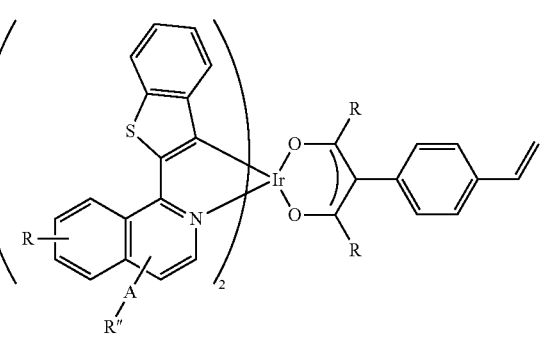
106a
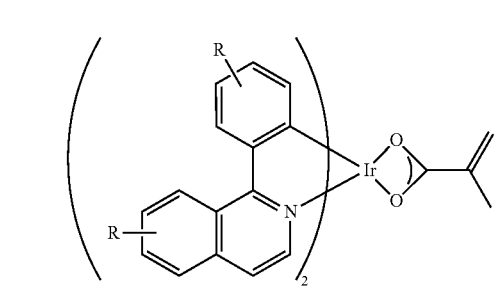
110a
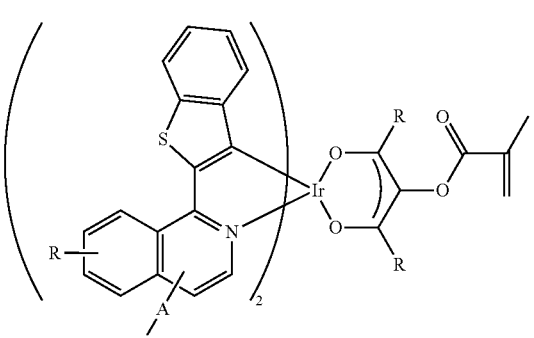

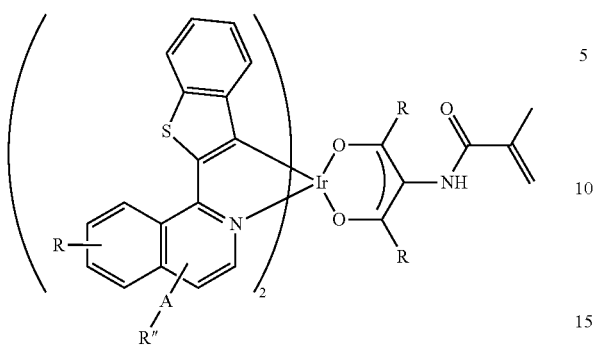
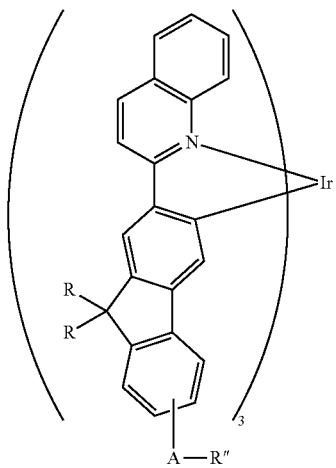
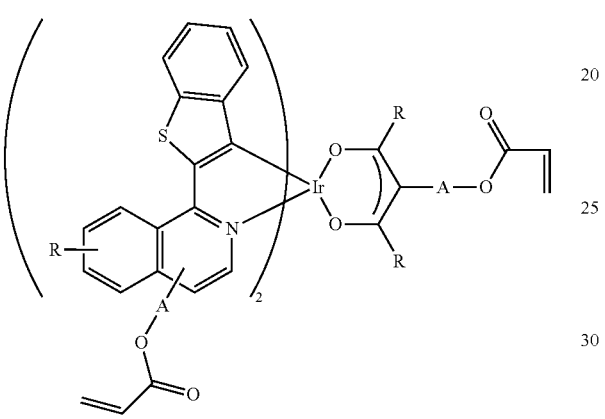
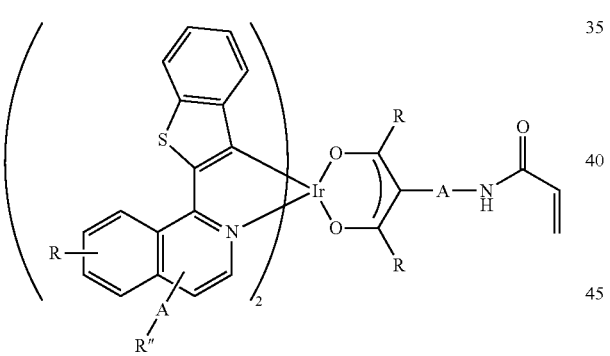
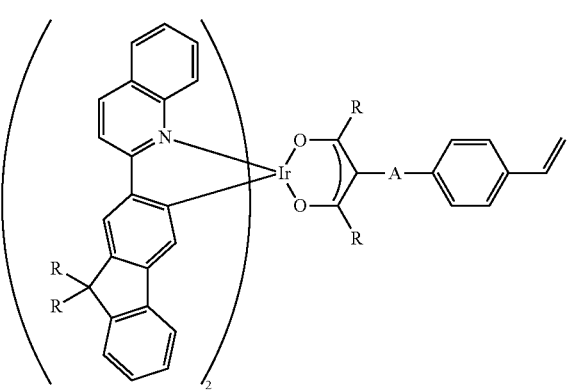
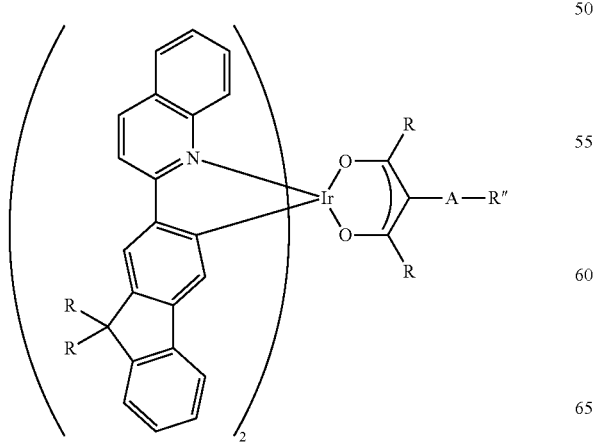

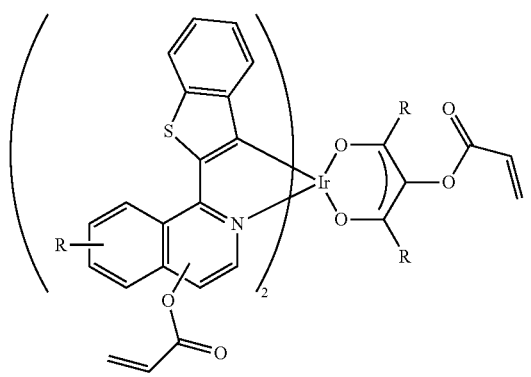
112a
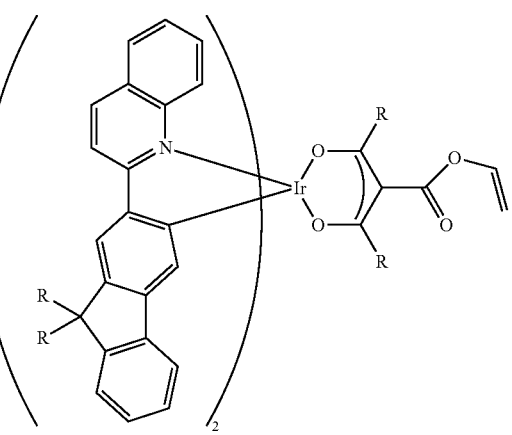
116a
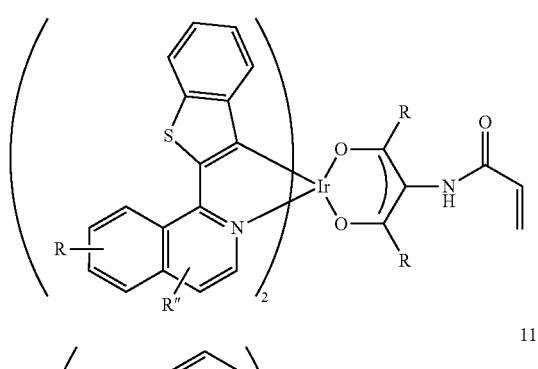
113a
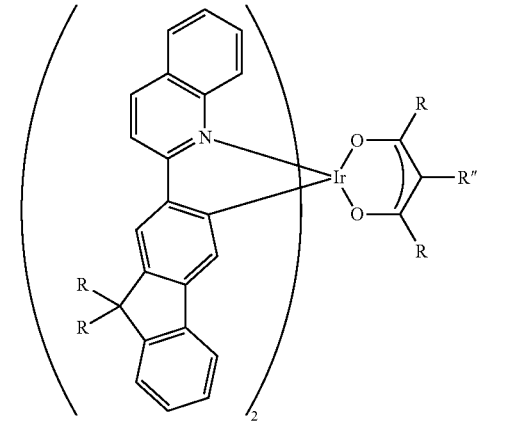
114a
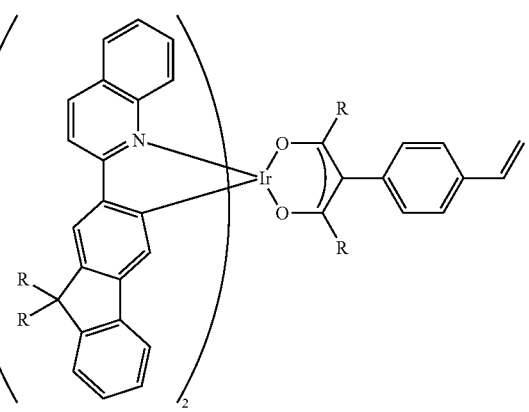
117a
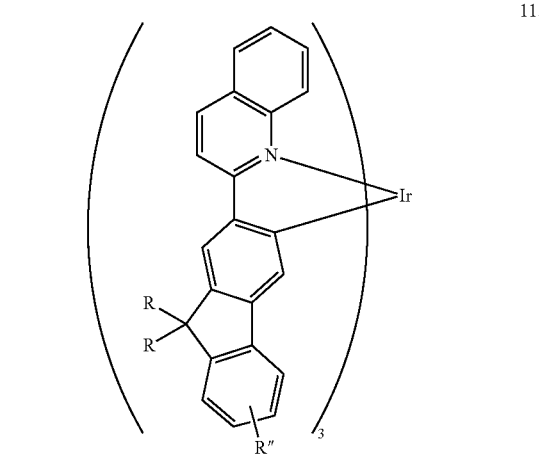
115a
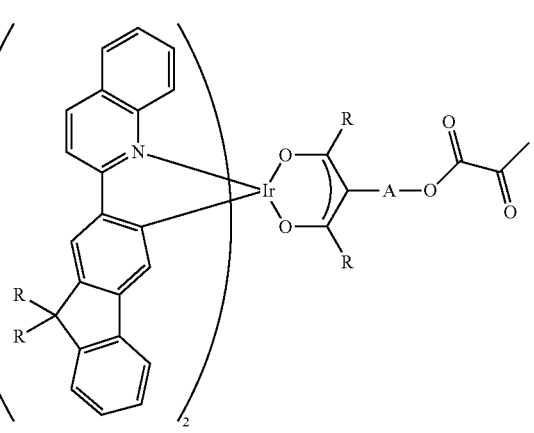
118

119
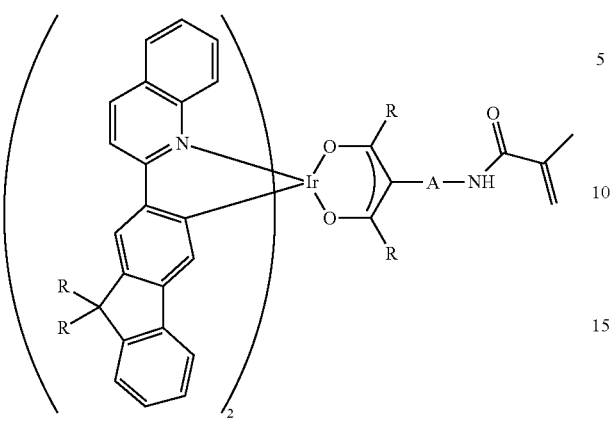
120
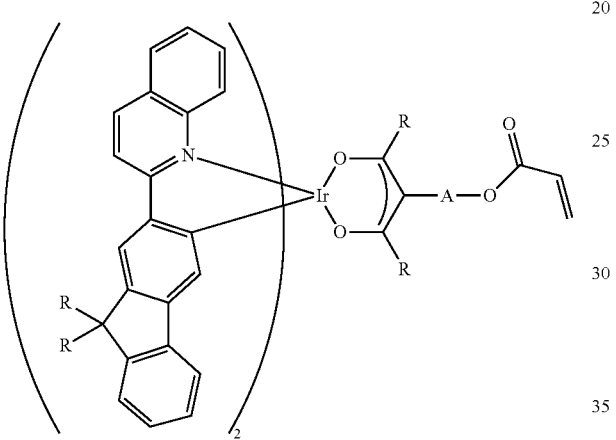
121
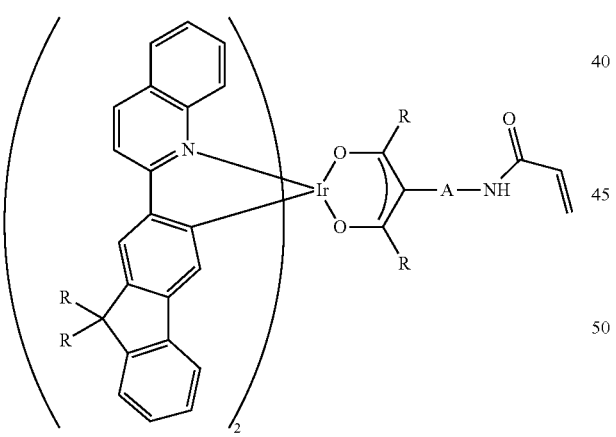
122
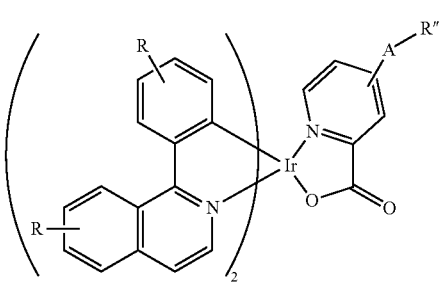
123
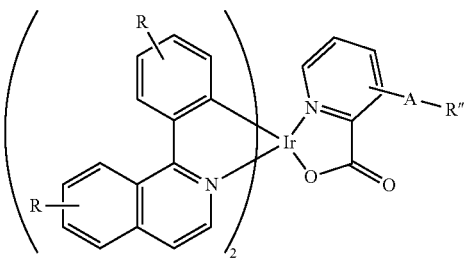
124
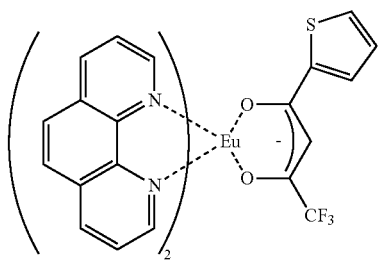
125
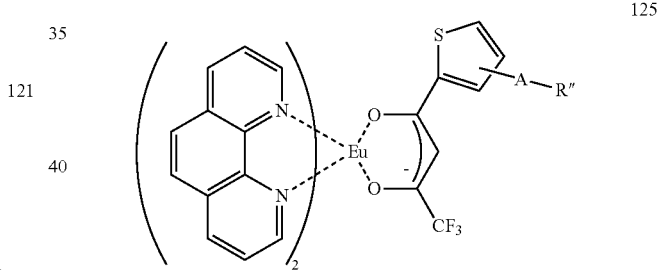
118a
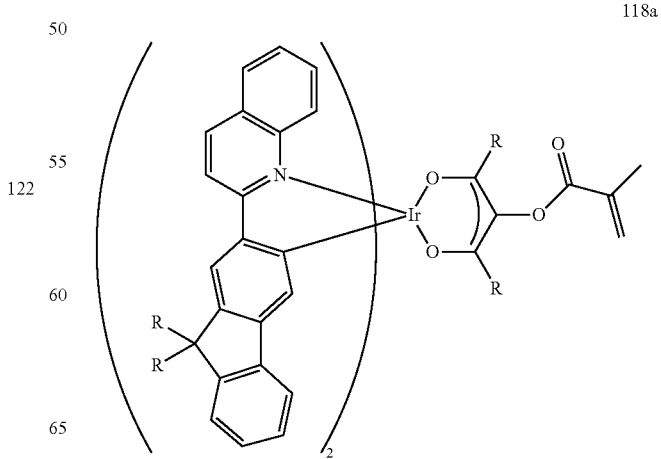

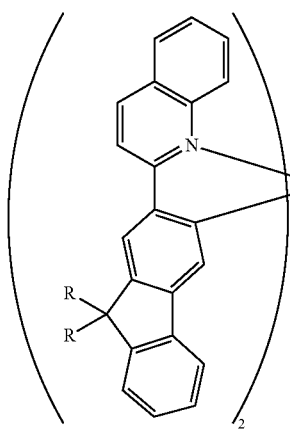

119a

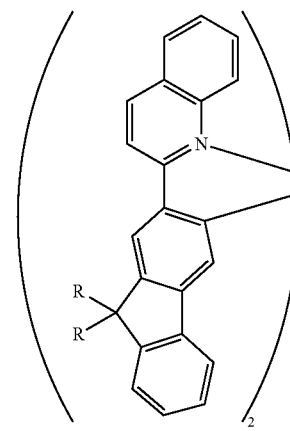

120a

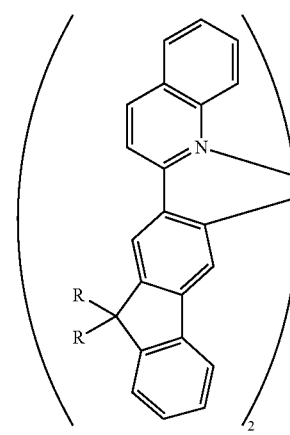

121a

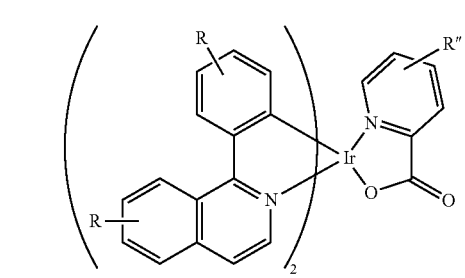

122a

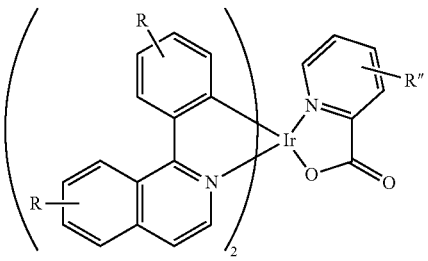

123a

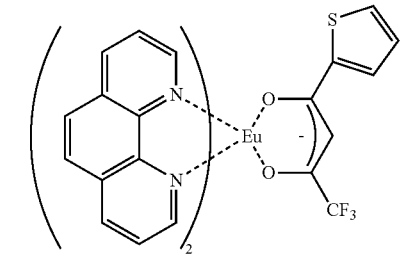

124a

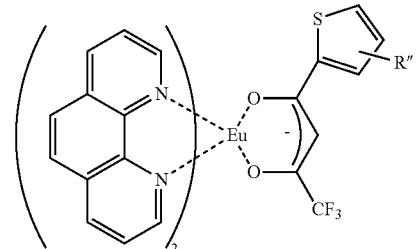

125a

In formula (2a), (2b) and (2c), Q (ie $Q_1$, $Q_2$, $Q_3$) is a spacer connected with emitting component X (ie $X_1$, $X_2$, $X_3$, respectively) and carrier transporting component Z (ie $Z_1$, $Z_2$, $Z_3$, respectively). The spacer will help improve solubility and maximise energy transfer by placing proper distance in the polymer chain, by creating controlled spacing between the energy carrier and dopant monomer units. This is achieved by selecting an appropriate spacer in the polymer chain and making alternating, random or block copolymer with the energy carrier monomers.

Spacer Q is a small polymer of specific precursor monomers. Suffix m (ie $m_1$, $m_2$, $m_3$) is a monomeric repeat unit of the spacer Q being a positive integer from 1 to 100, and more preferably from 5 to 20.

The precursor monomers of the spacer Q have vinyl function. Some examples of the monomer precursor of spacer Q are shown below as compounds 126 to 135, 135a,

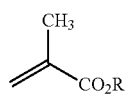

126

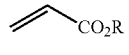

127

128

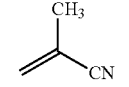

129

130

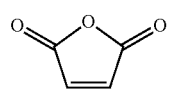

131

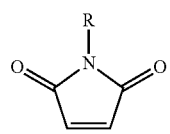

132

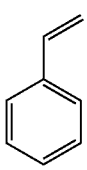

133

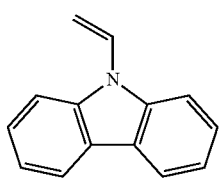

134

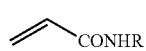

135

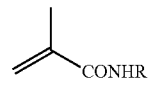

135a

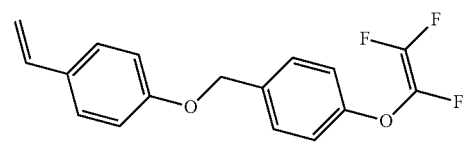

135b

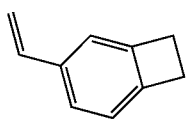

The charge transporting moiety Z (ie $Z_1$, $Z_2$, $Z_3$) may be selected from the group consisting of a hole transporting material, an electron transporting material and/or a host material having both hole and electron transporting characteristics.

Charge transporting moiety Z is a small polymer of specific precursor monomers. The precursor monomers of the charge transporting moiety Z have vinyl functional group, or a vinyl function with substituted or unsubstituted alkyl group, substituted or unsubstituted aryl group, substituted or unsubstituted heterocycles, substituted or unsubstituted alkylamine group, substituted or unsubstituted amido group, substituted or unsubstituted alkyloxy group, substituted or unsubstituted aryloxy group and substituted or unsubstituted thioalkyloxy group.

Some examples of the monomer precursor of charge transporting moiety Z are shown below as compounds 136-141, 136a-141a, 164, 165, 164a, 165a, 165', 165'a, 172-183, 172a-183a and examples of emissive materials 142-163, 142'-163', 142a-162a, 142'a-162'a.

136

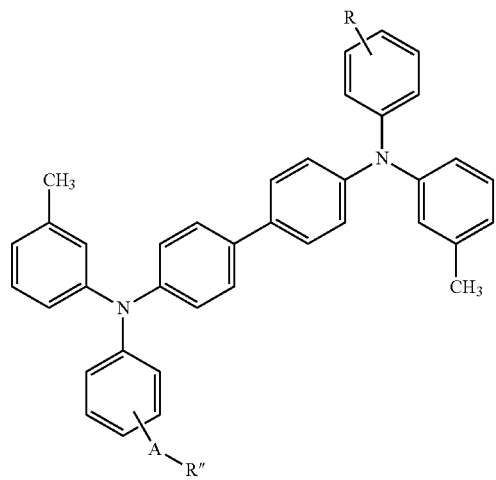

137

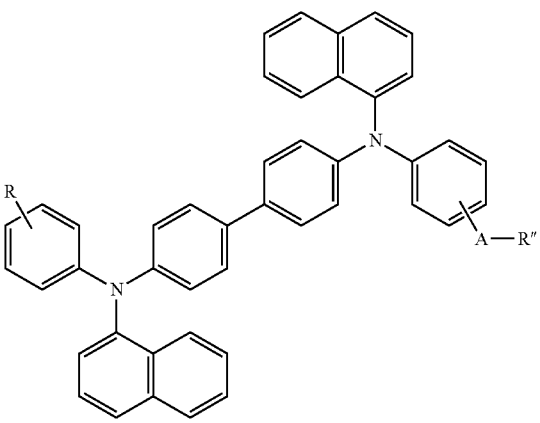

-continued
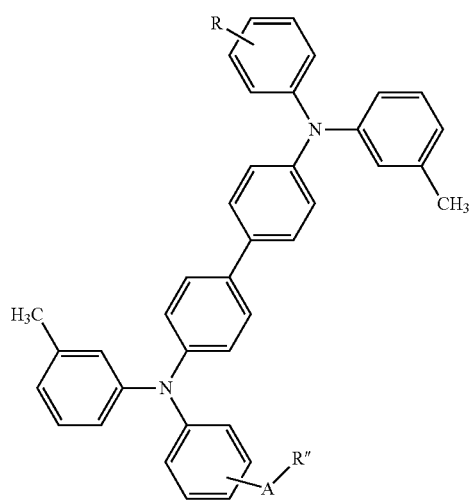
139
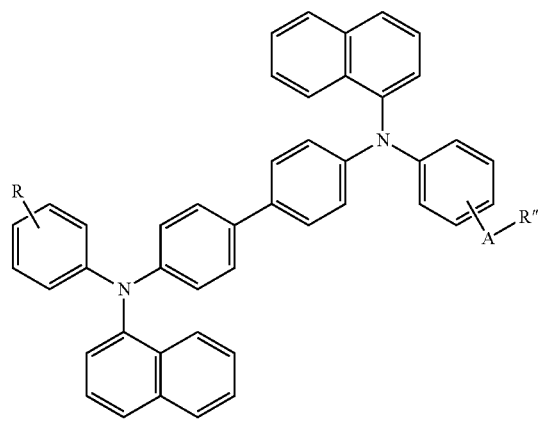
138
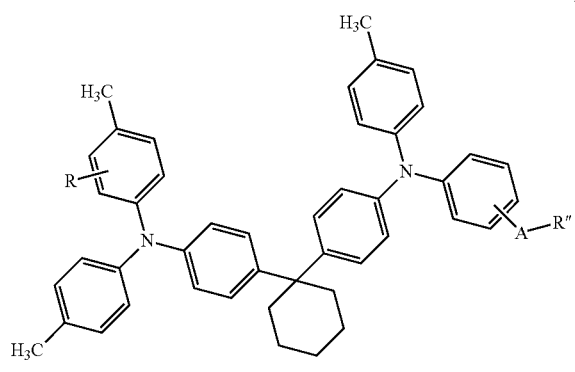
140
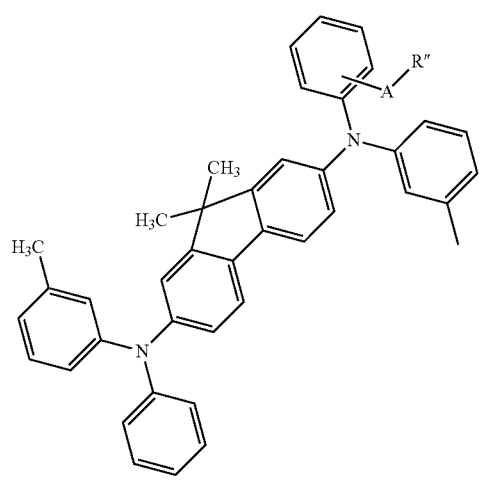
141
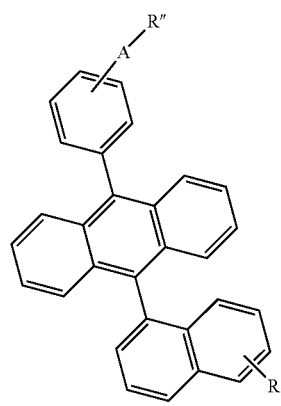
142
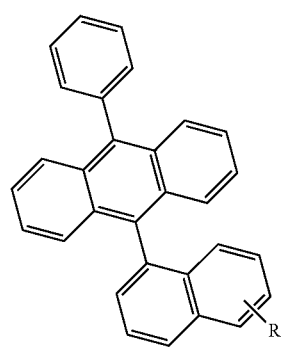
142'

-continued
143
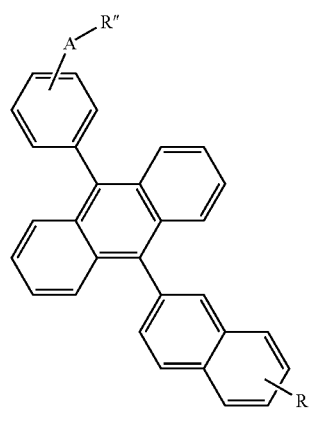
144
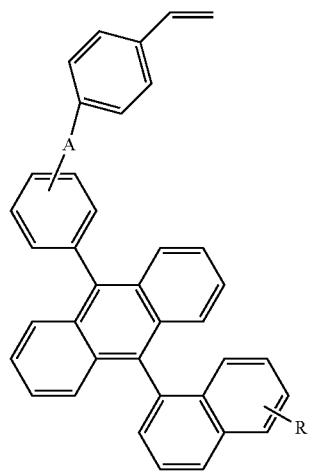
145
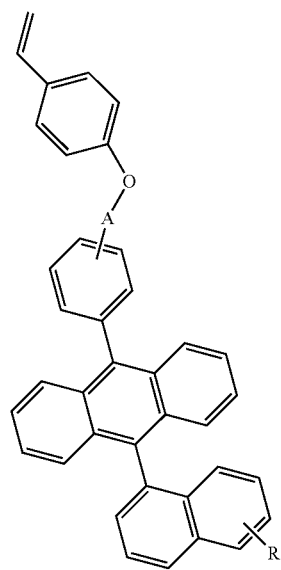
146
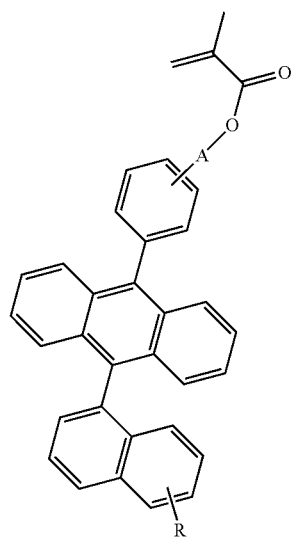
136a
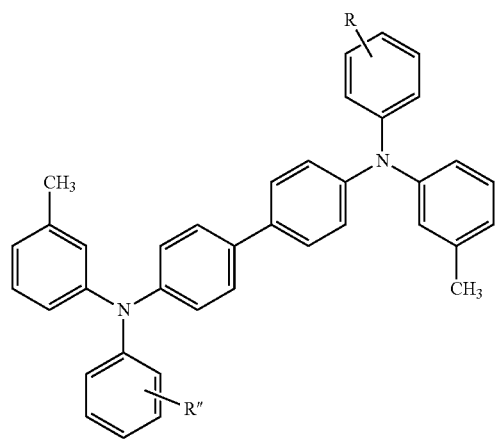
137a
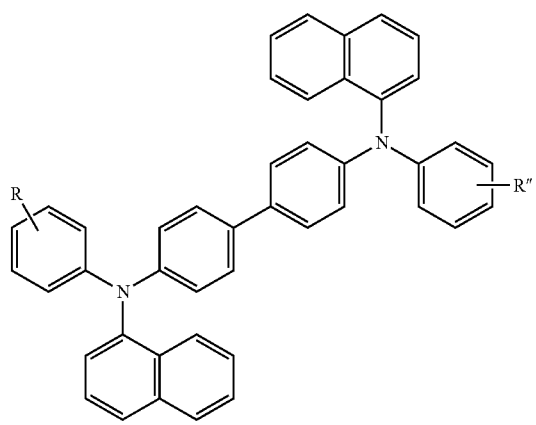

-continued
139a
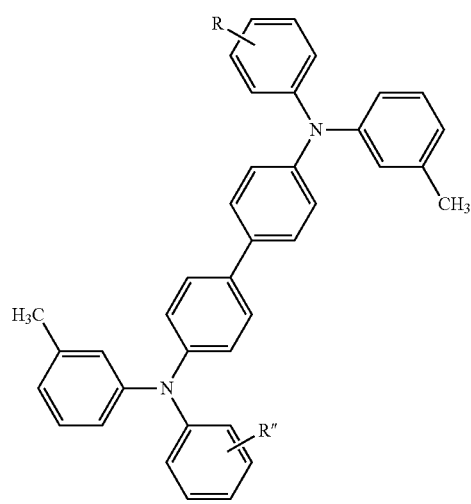
138a
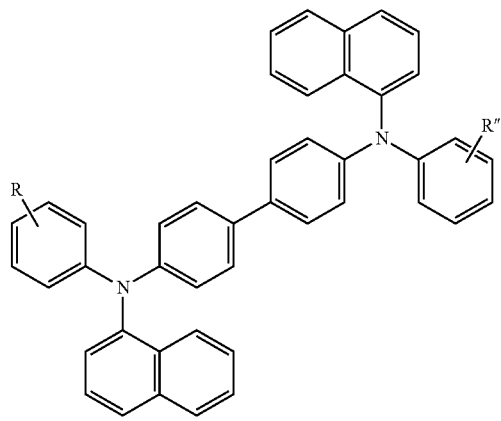
140a
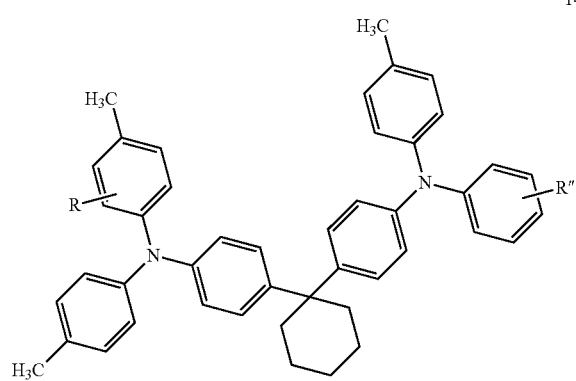
141a
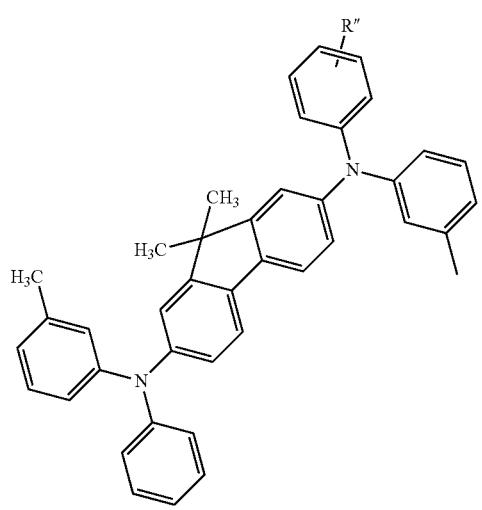
142a
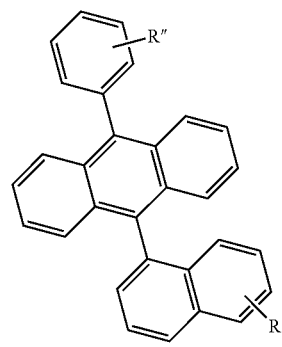
143a
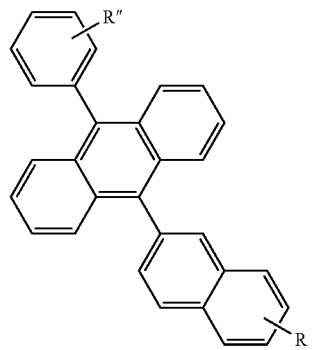

-continued
144a
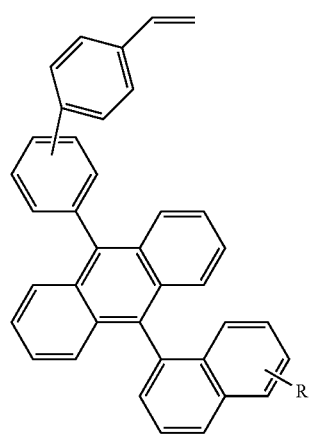
145a
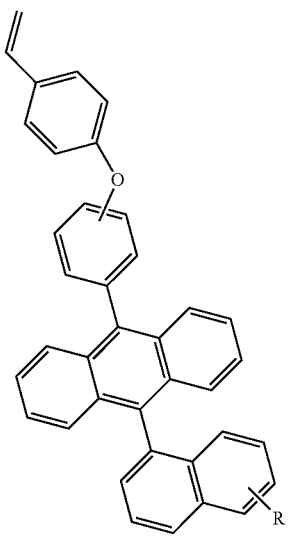
146a
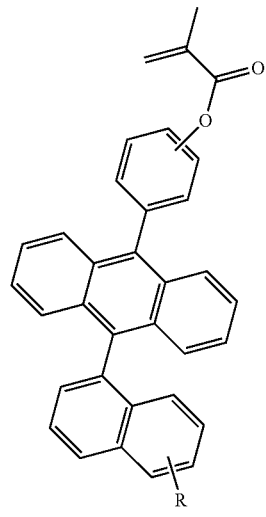
147
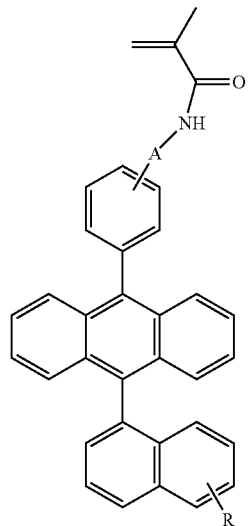
148
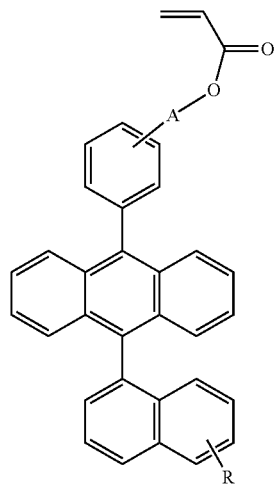
149
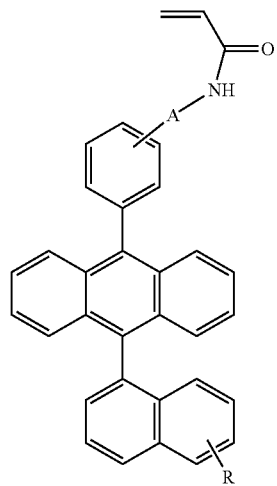

-continued
150 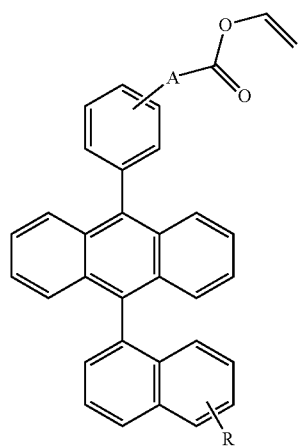 151 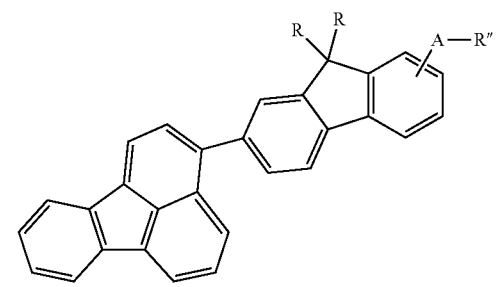
152 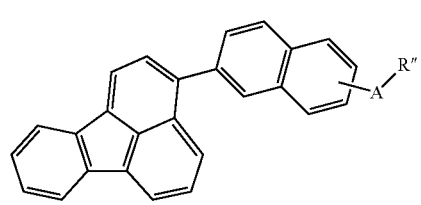 153 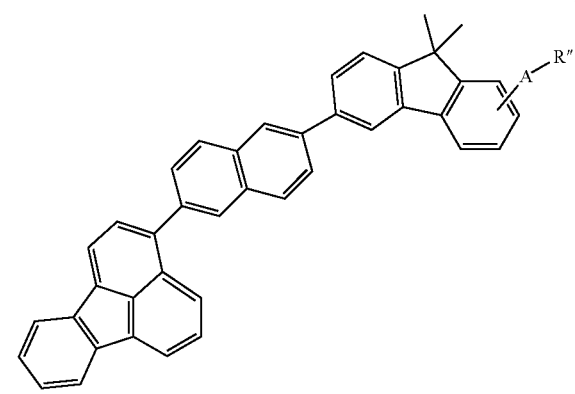
154 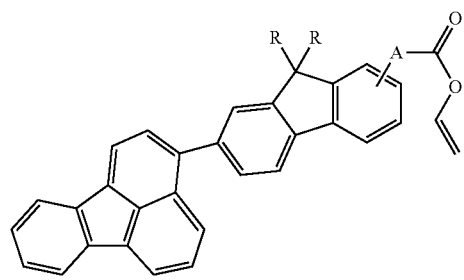 155 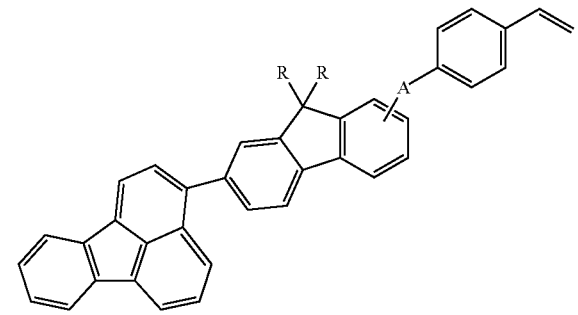
156 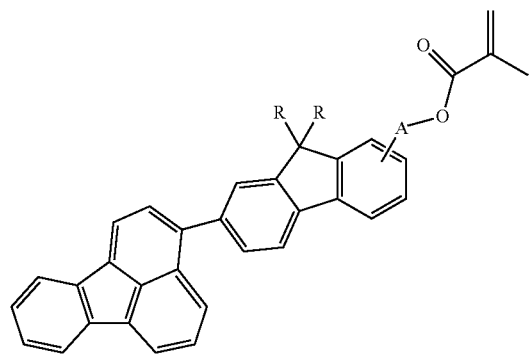 157 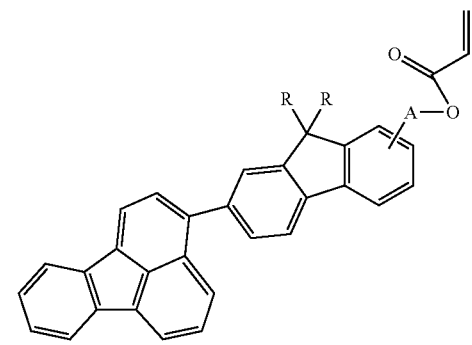

-continued
147a
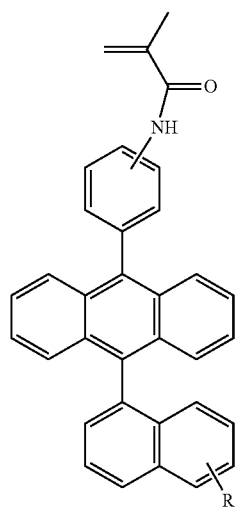
148a
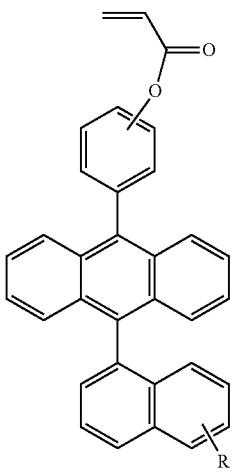
149a
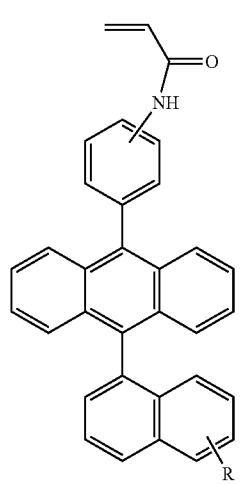
150a
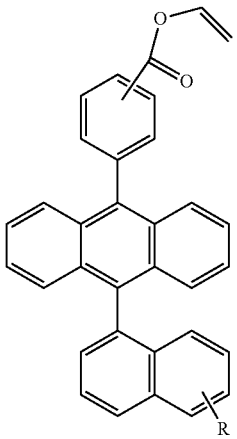
151a
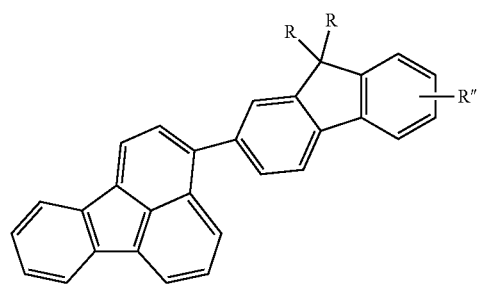
152a
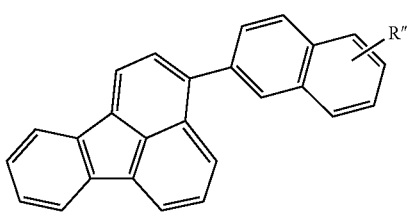

-continued
153a 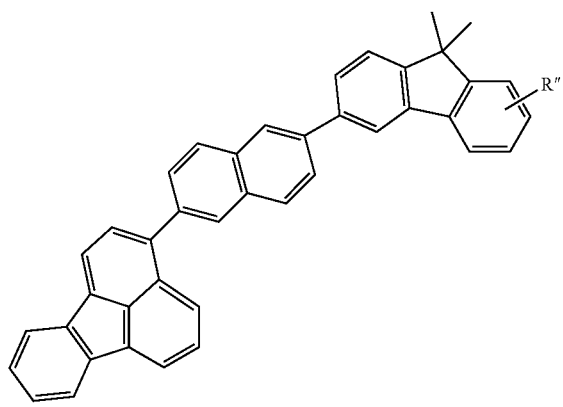
154a 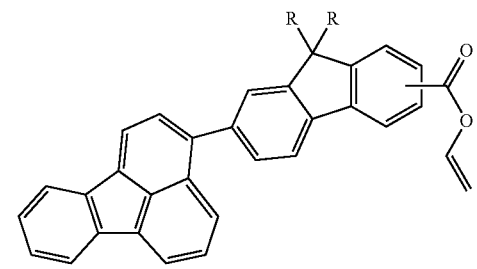
155a 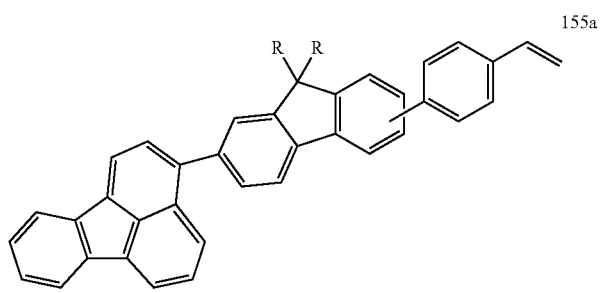
156a 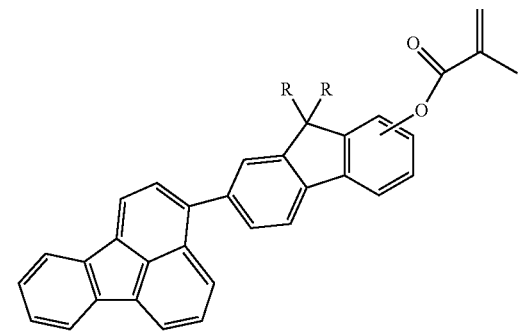
157a 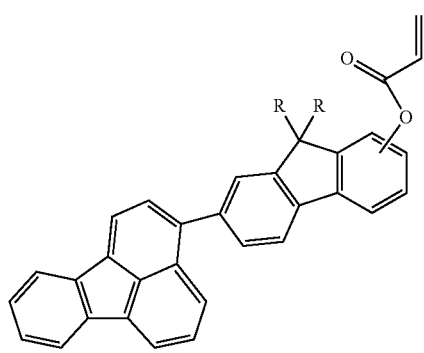
151' 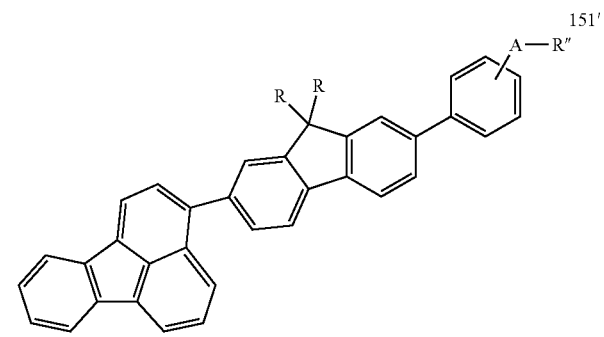
152' 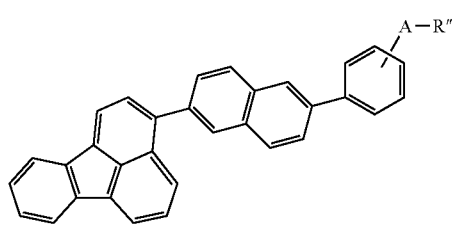
153' 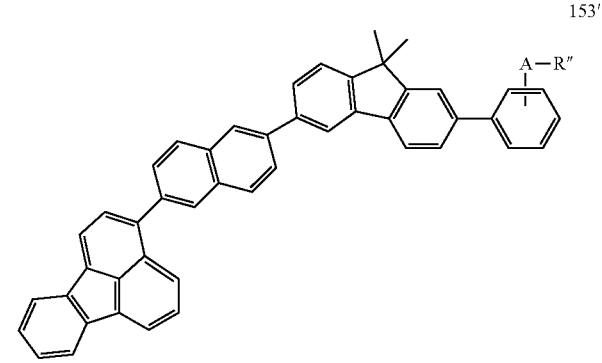

-continued
154'
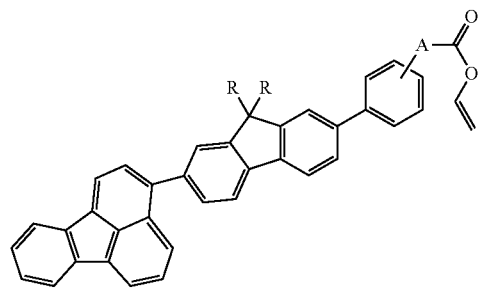
155'
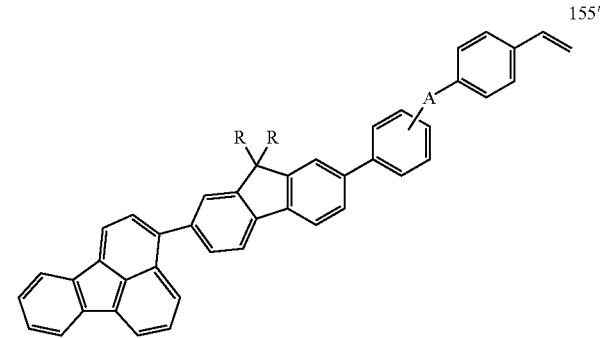
156'
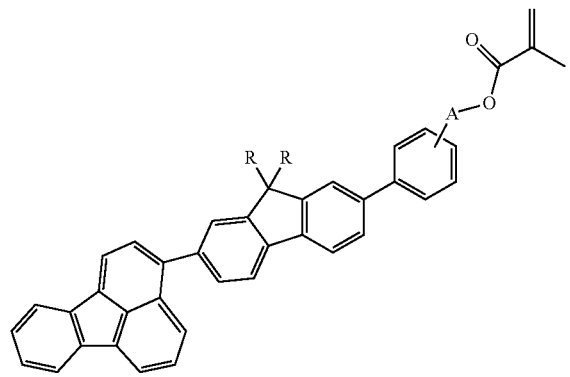
157'
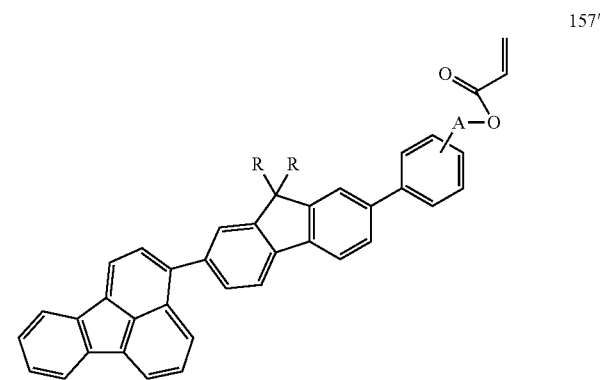
151'a
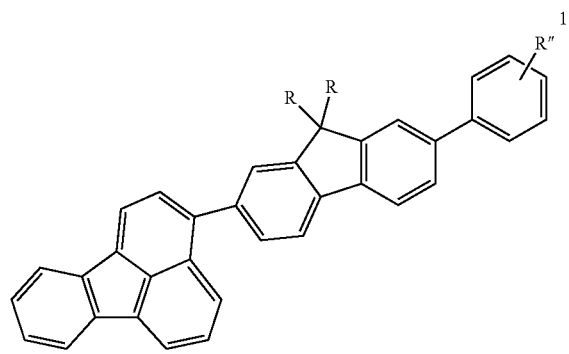
152'a
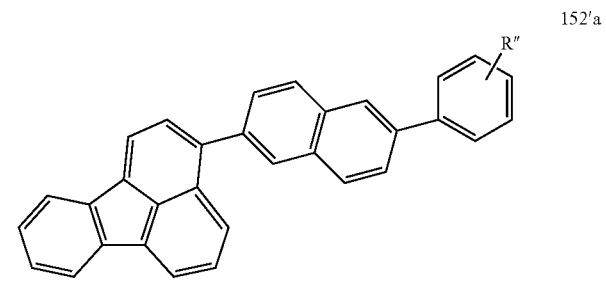
153'a
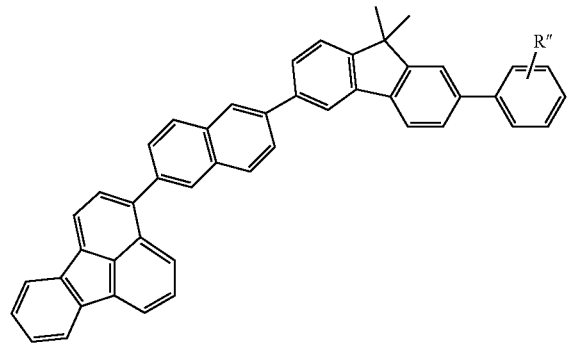
154'a
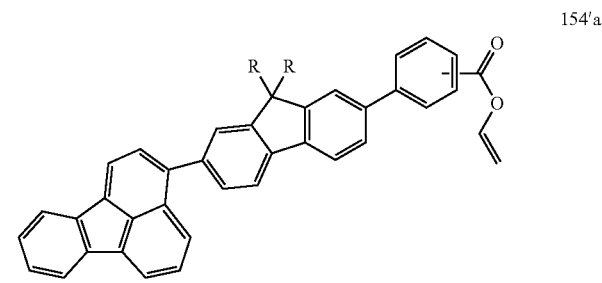

-continued
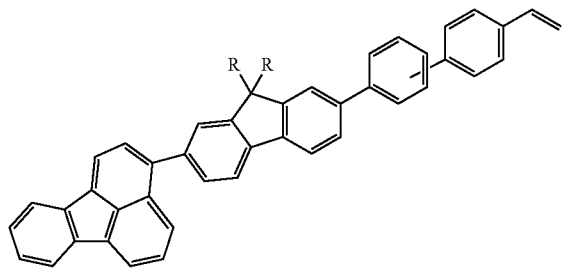
155'a
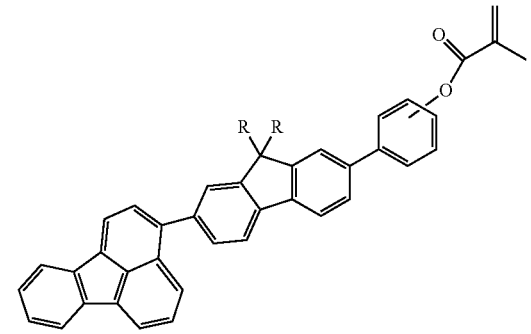
156'a
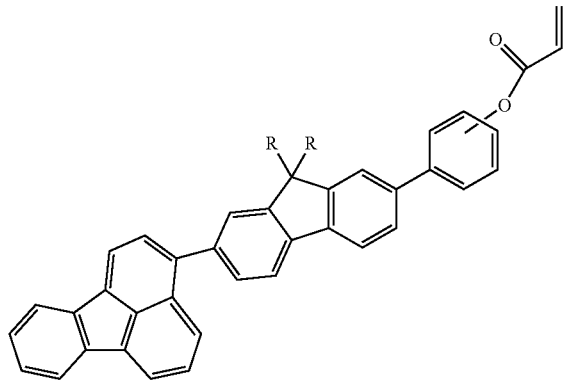
157'a
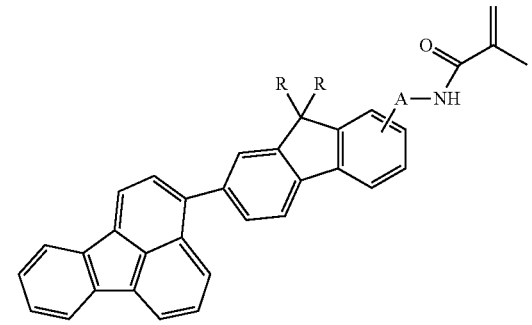
158
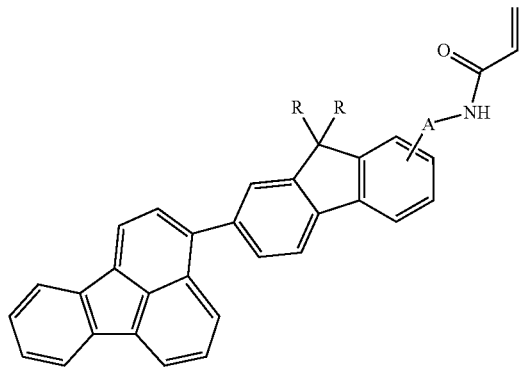
159
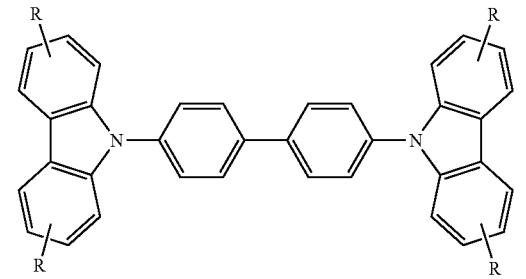
160
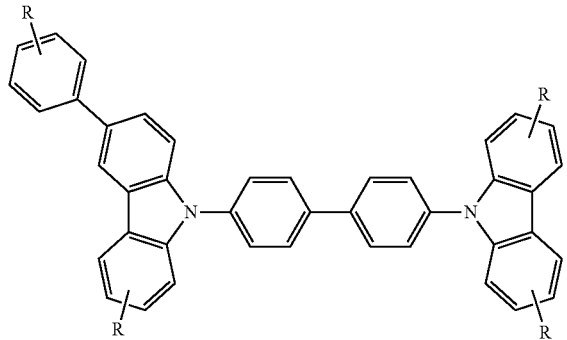
161
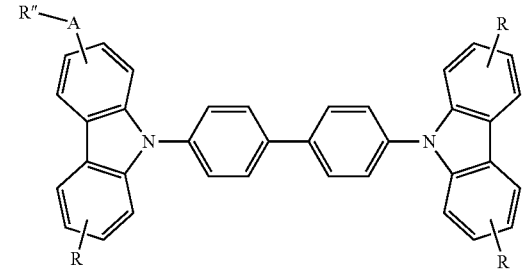
162

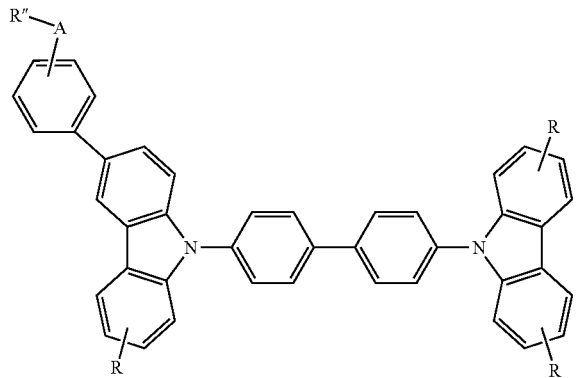
163
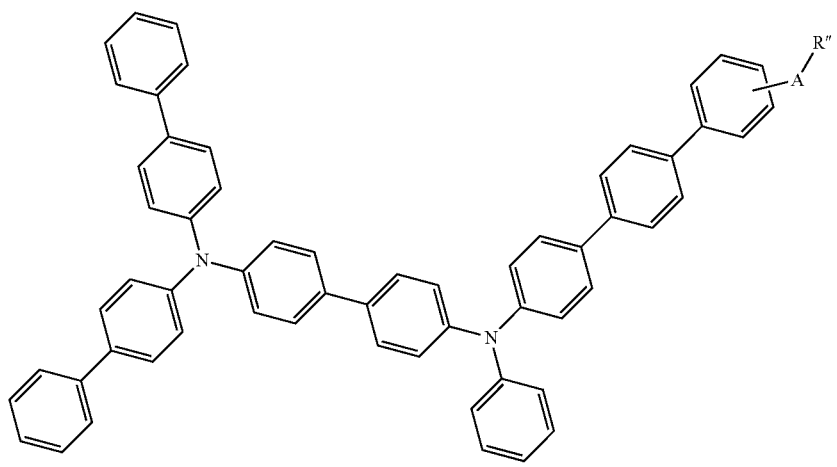
164
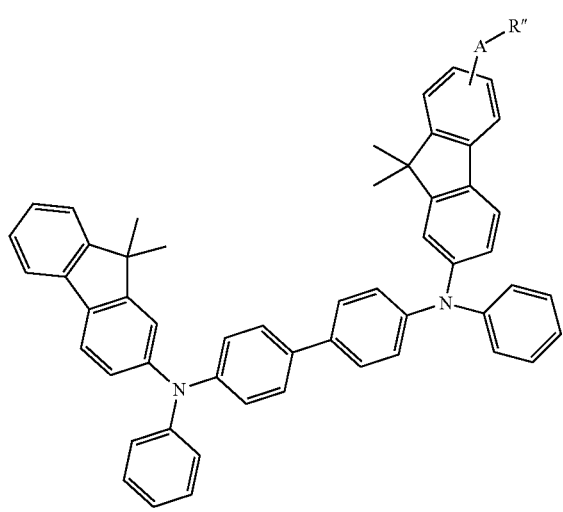
165
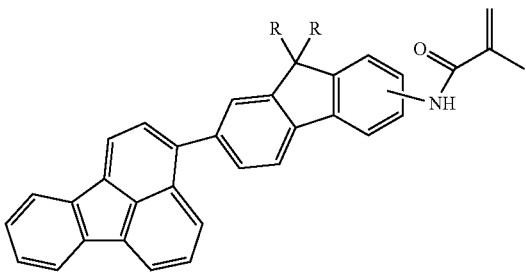
158a

-continued
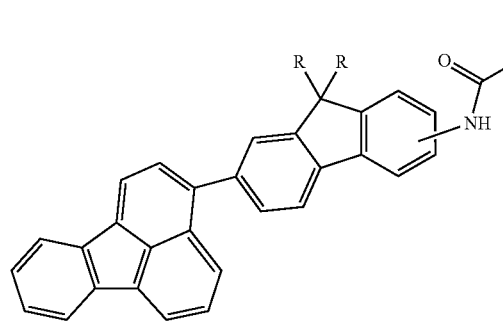
159a
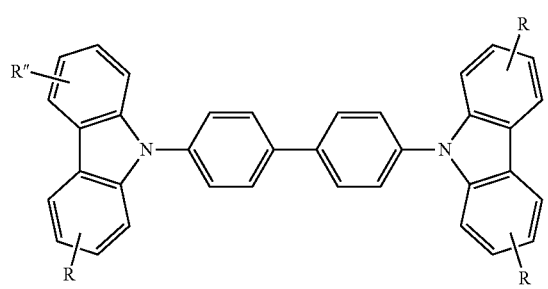
162a
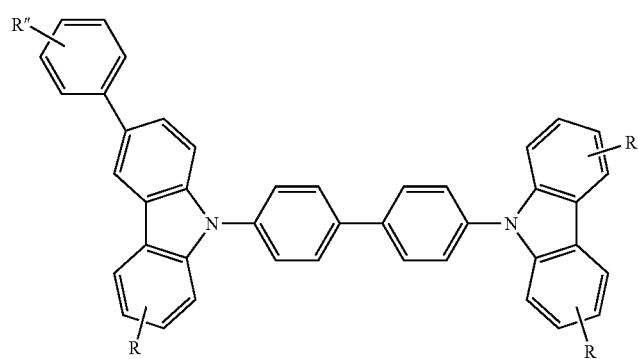
163a
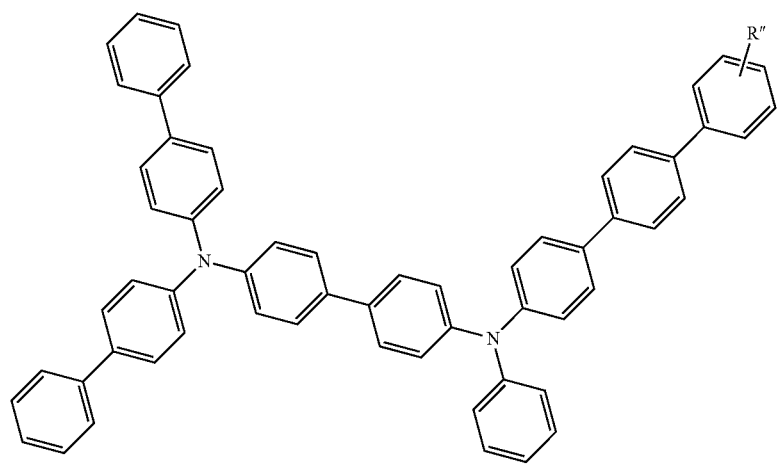
164a
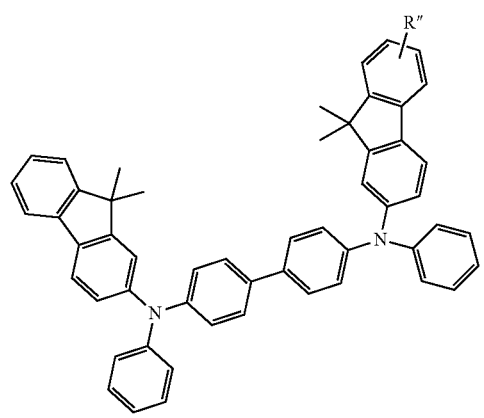
165a
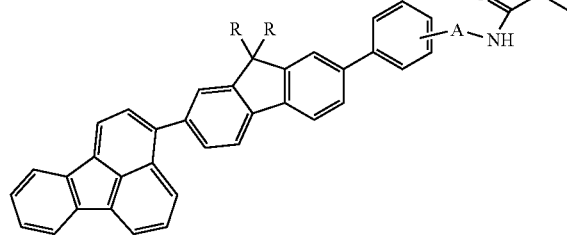
158'

-continued
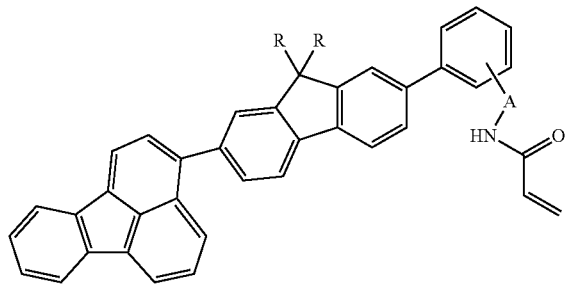
159'
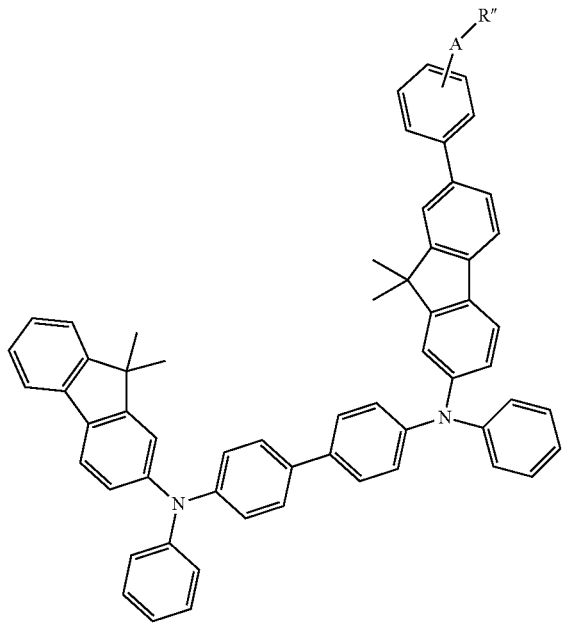
165'
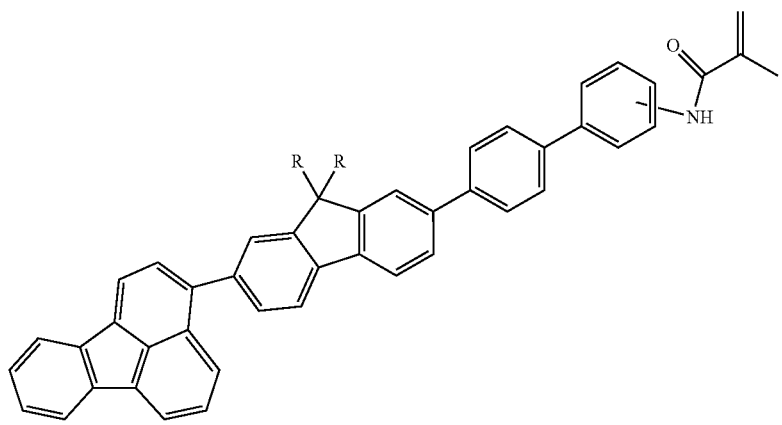
159'a
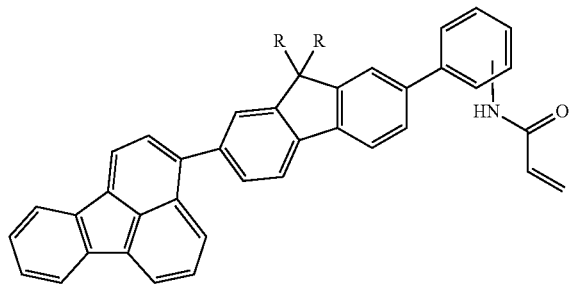
158'a
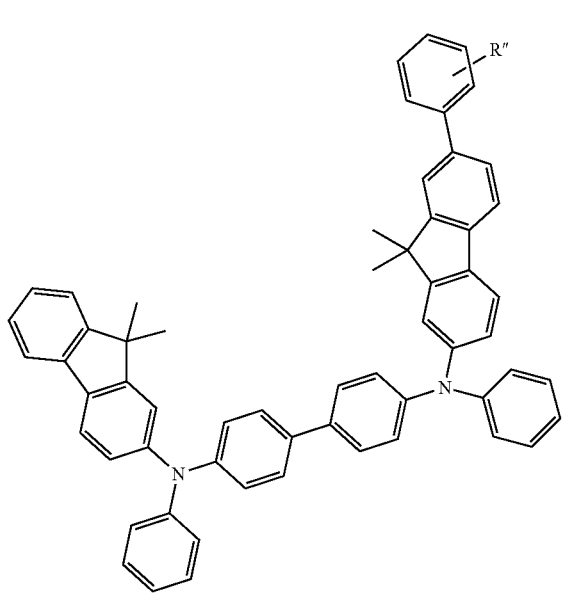
165a'

-continued
166
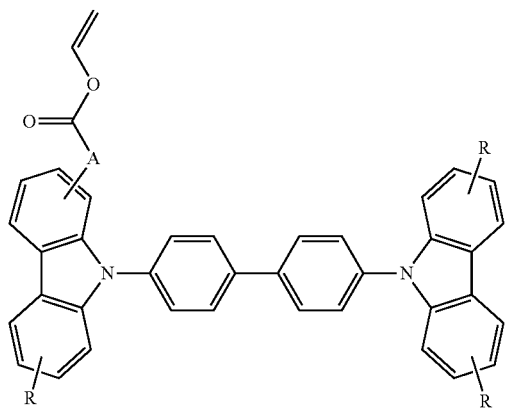
167
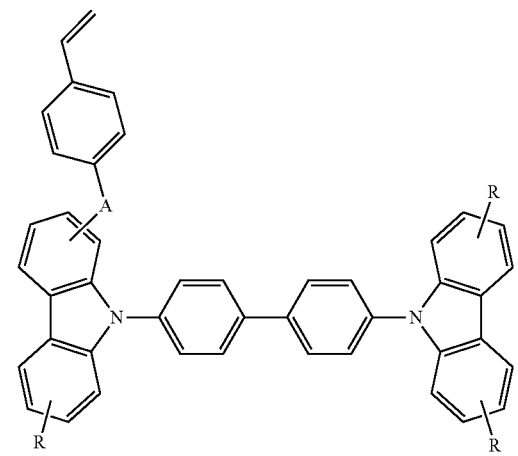
168
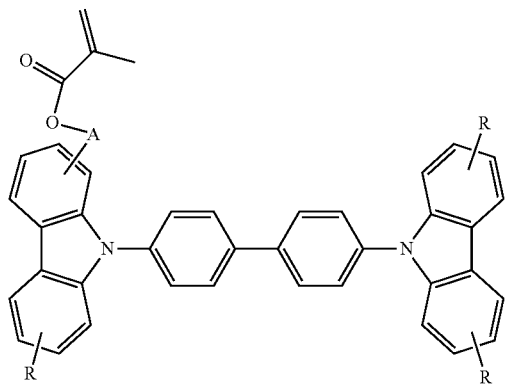
169
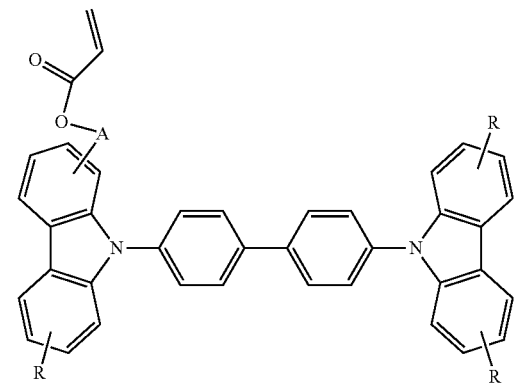
170
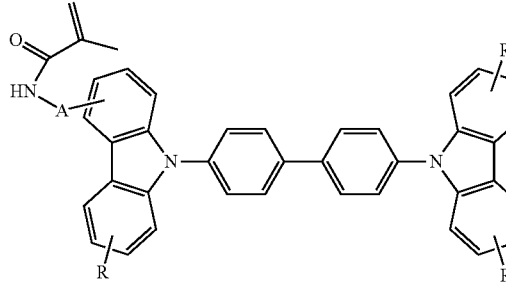
171
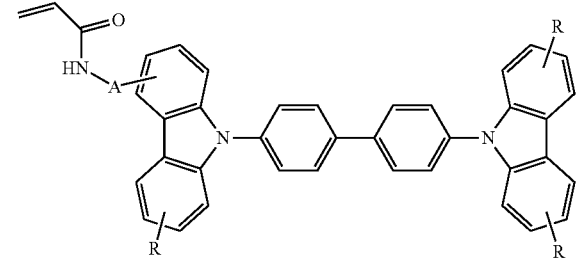
166a
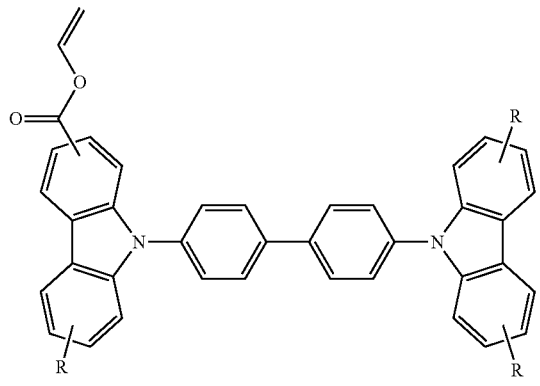
167a
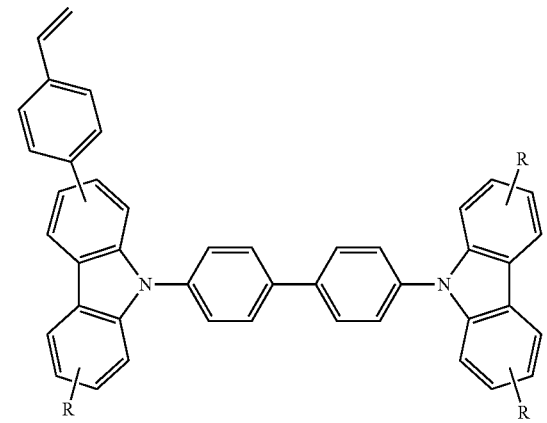

-continued
168a
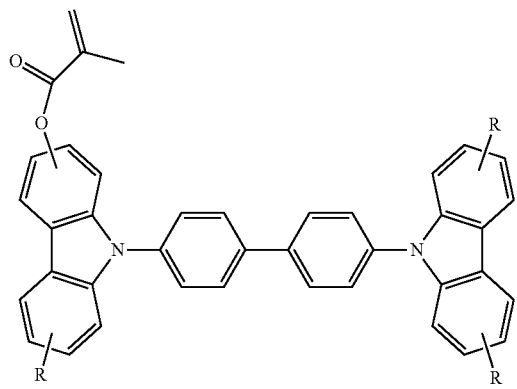
169a
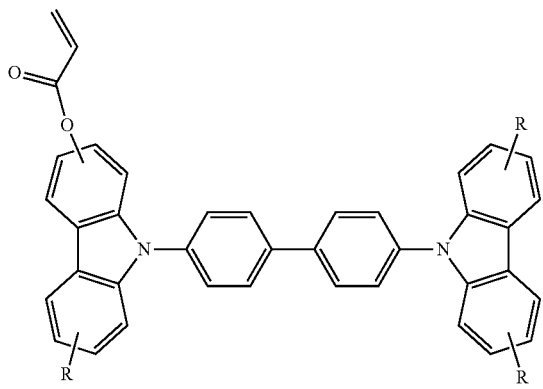
170a
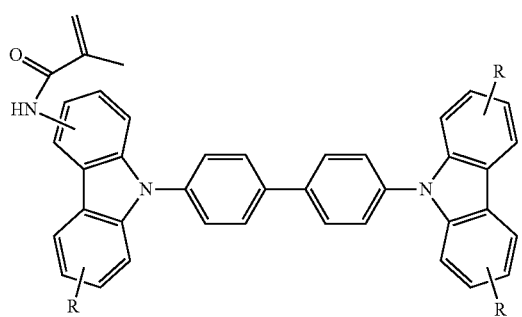
171a
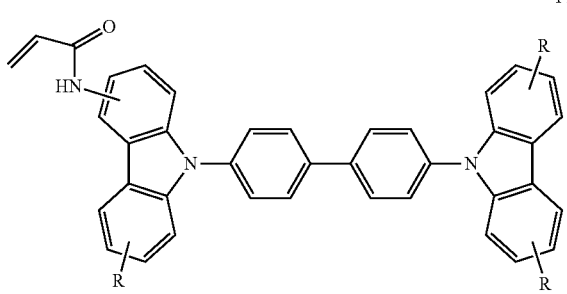
166'
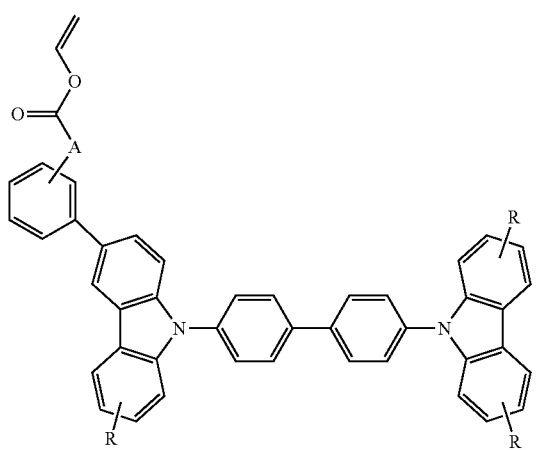
167'
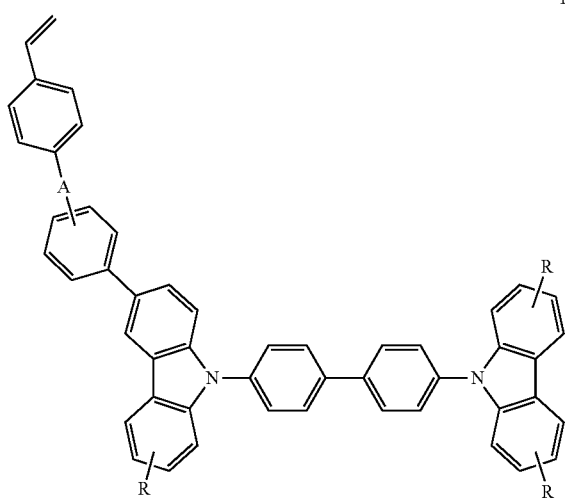
168'
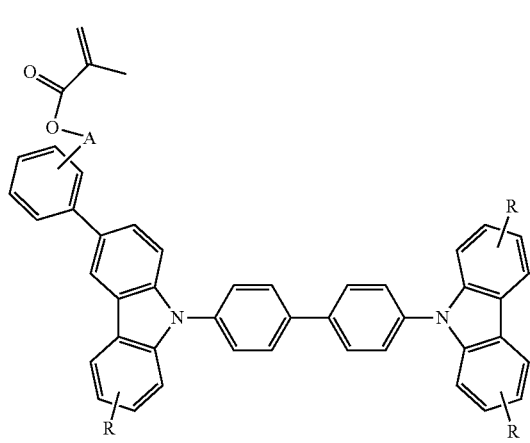
169'
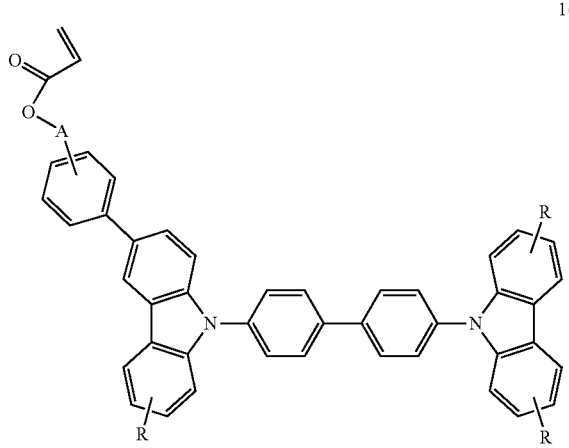

-continued
170'
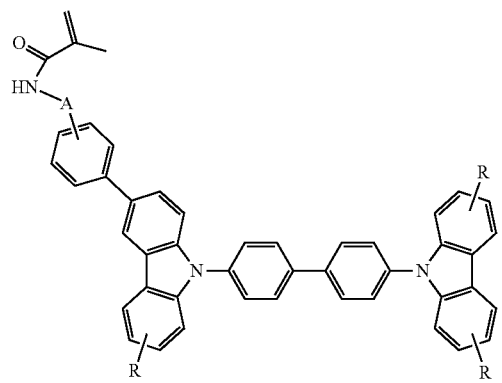
171'
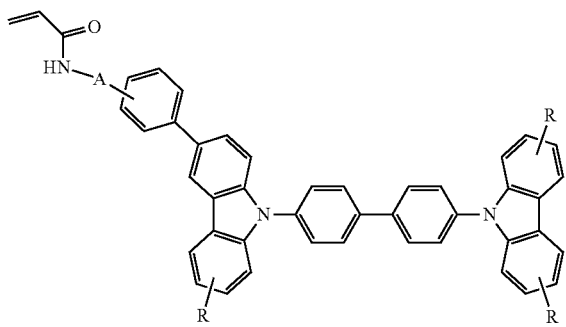
166'a
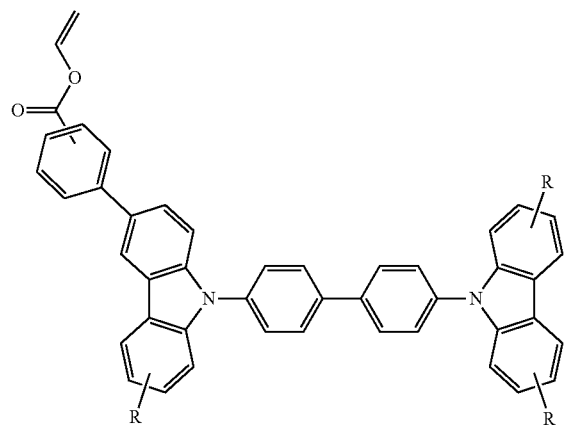
167'a
168'a
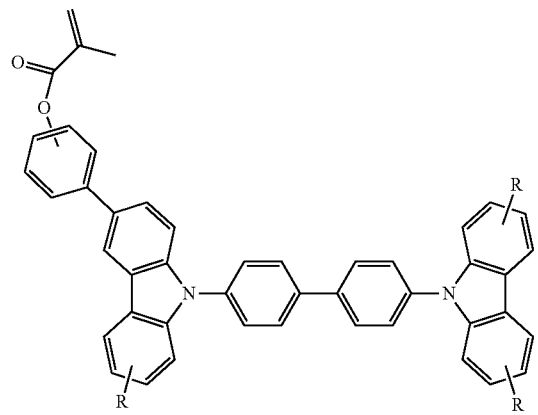
169'a
170'a
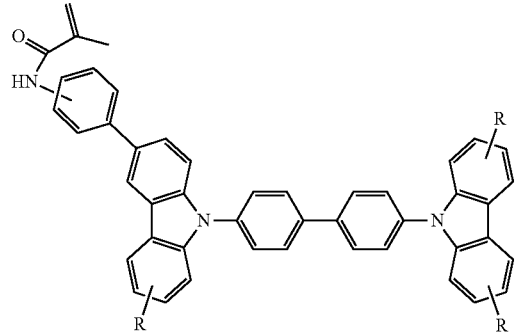
171'a
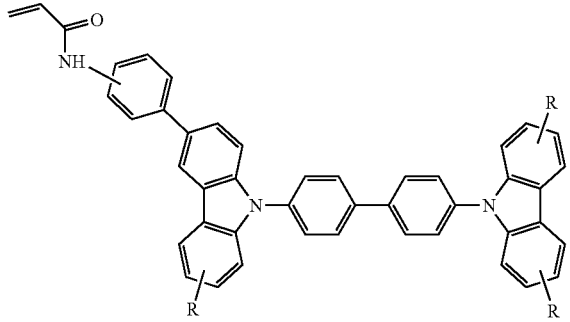

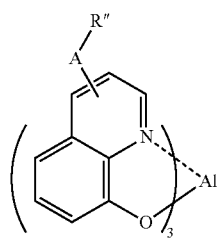
127
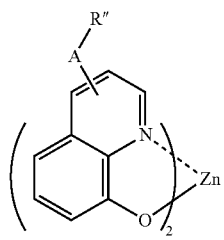
172
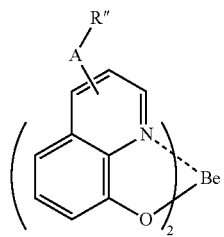
173
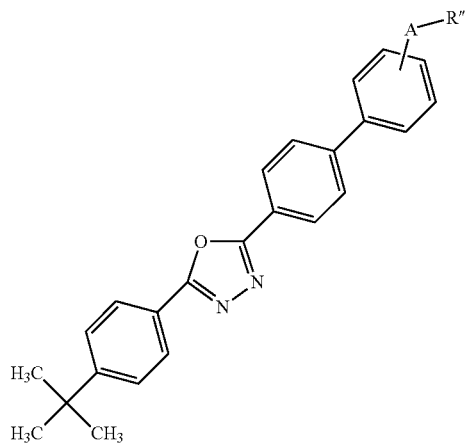
175
174
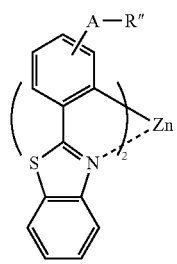
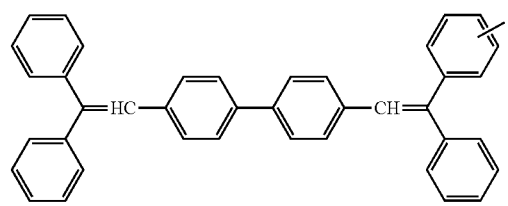
176
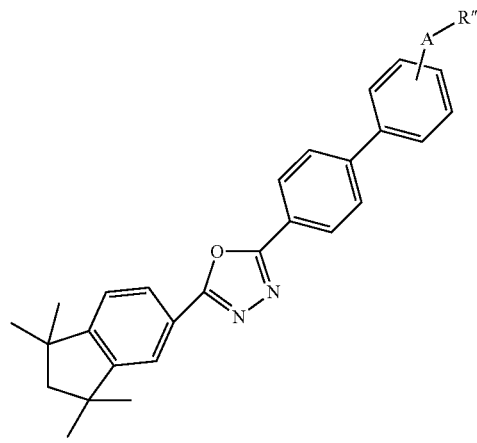
178
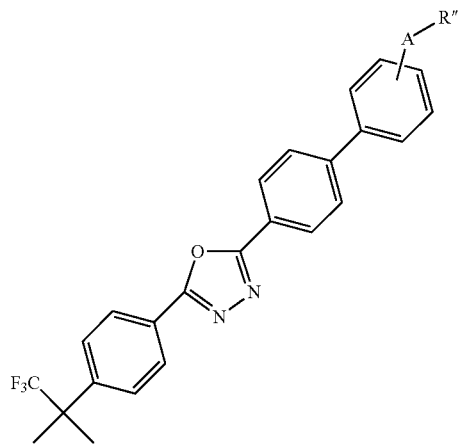
179

-continued
180 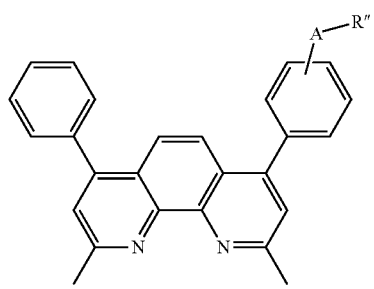
181 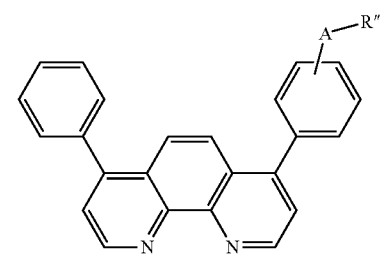
182 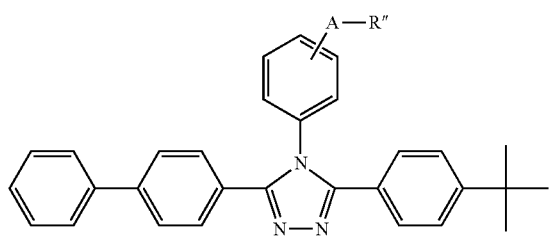
183 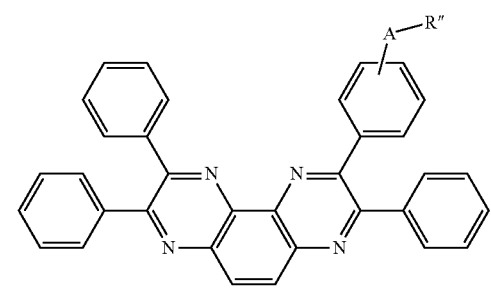
172a 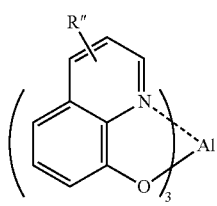
173a 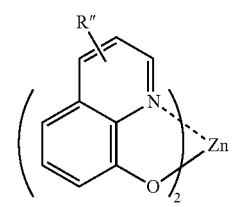
174a 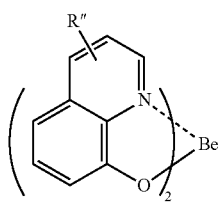
175a 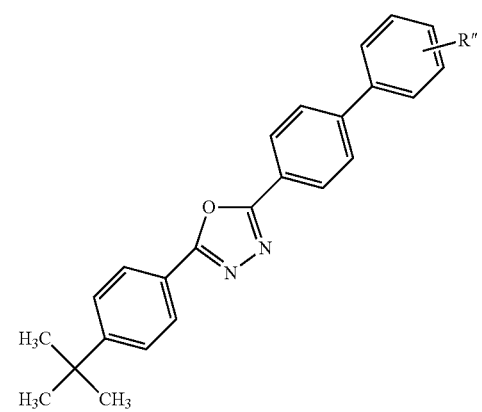
176a 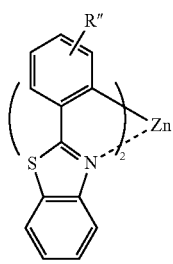
177a 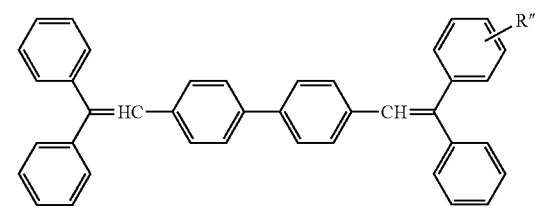

178a
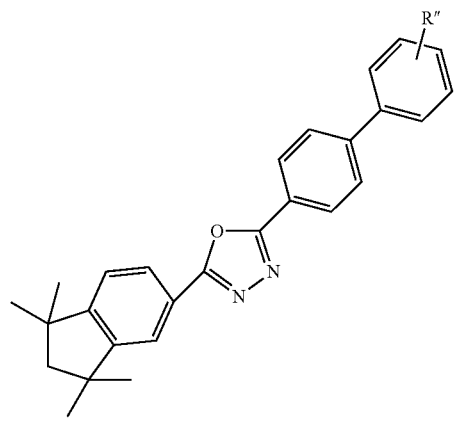

179a
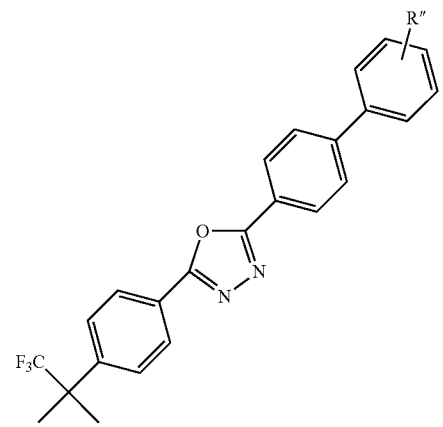

180a
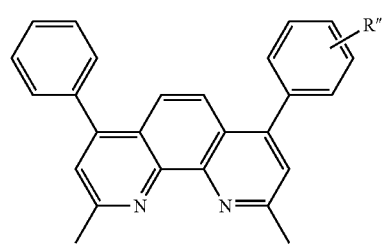

181a
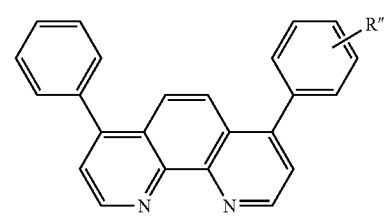

182a
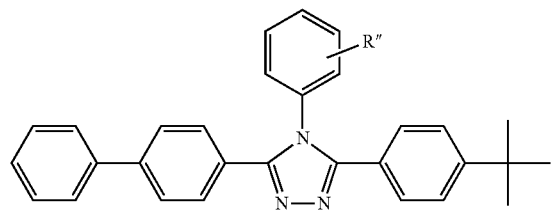

183a
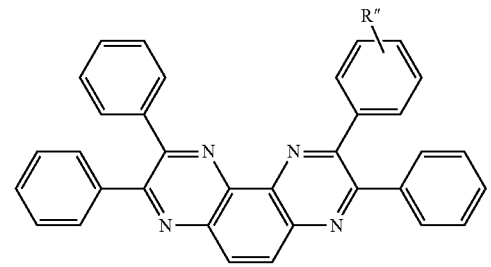

The device may emit white luminescence by selecting an emission colour combination of either $X_1$ of (1a) and $X_2$ of (1b), $X_1$ and $X_3$ of (1c), or $X_1$, $X_2$ and $X_3$ or by doping either small molecule(s) or polymer molecule(s) into (1a), where $n_2$ and $n_3$ are 0, wherein the emission colour temperature is in the range of 4000 K to 10,000 K depending upon the kind of white colour. Some examples of the polymer of this invention are shown below from 184, to 215 and 184a, 184' and 186a.

184
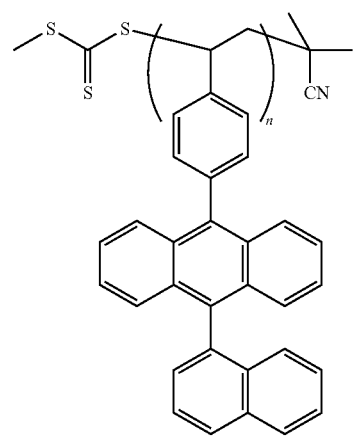

184a
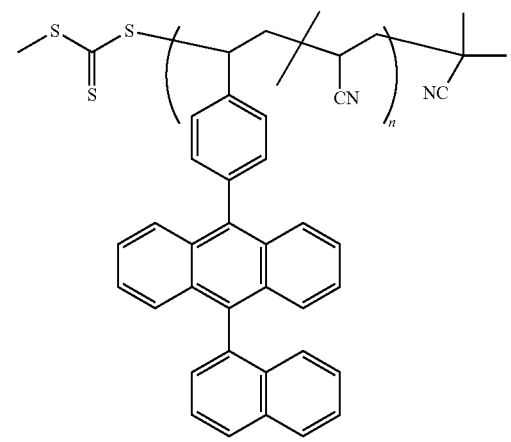

184'
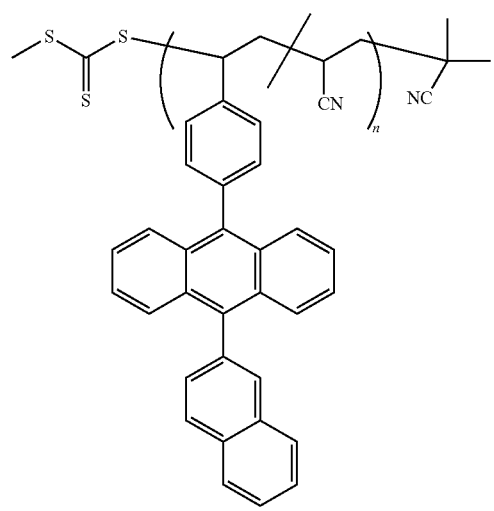
185
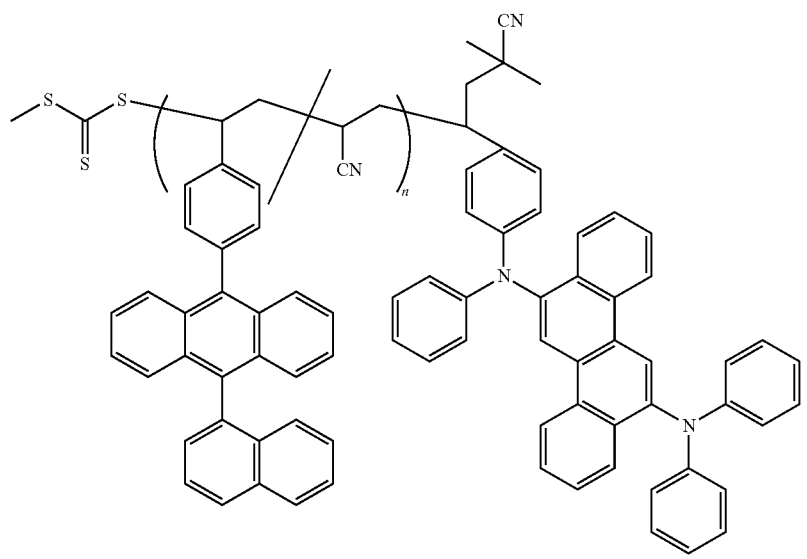

186
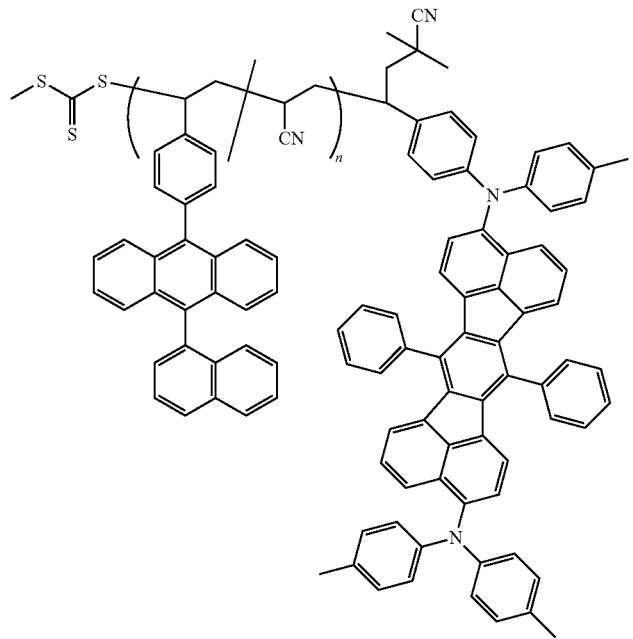
186a
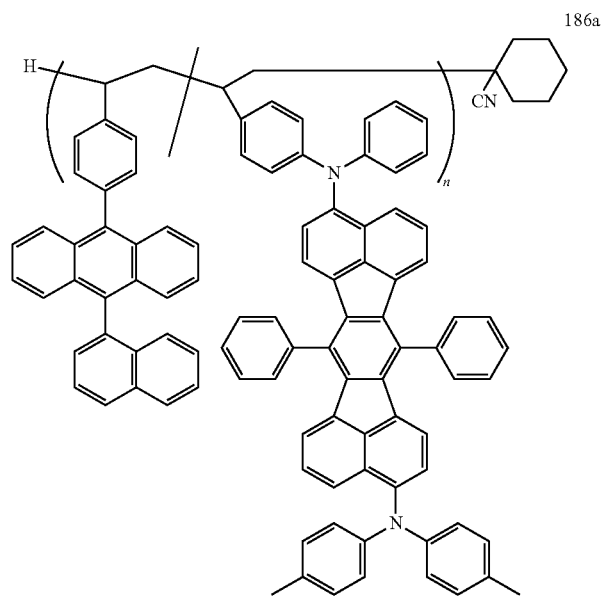
187
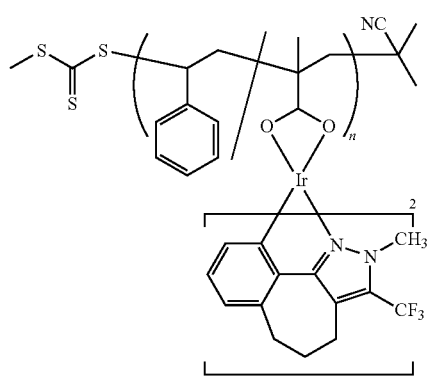

-continued
188
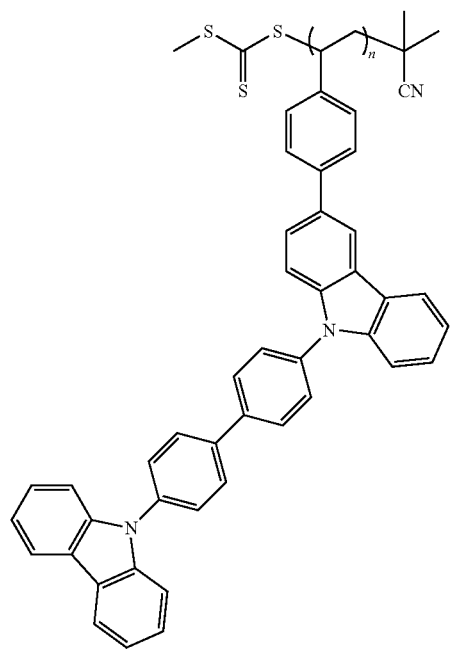
189
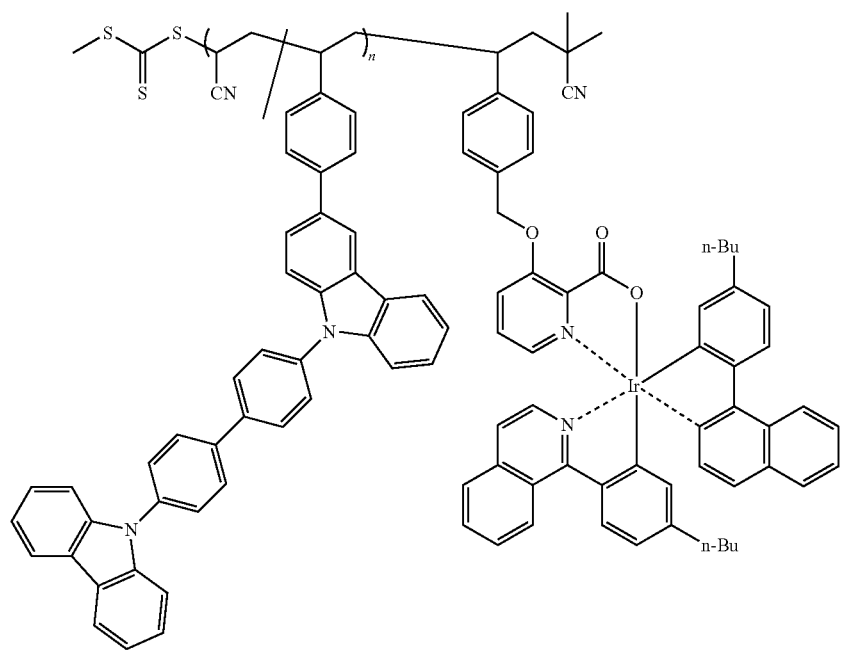

-continued
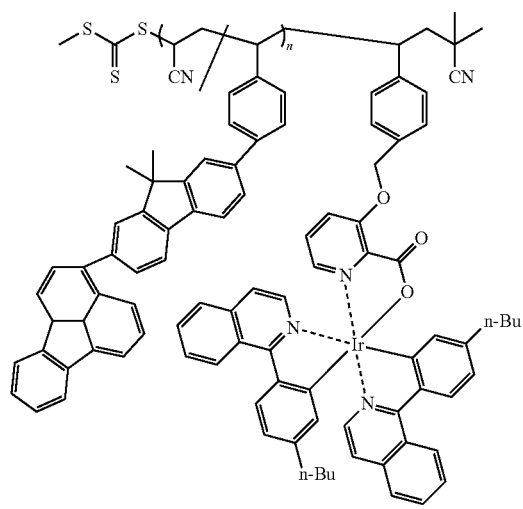
190
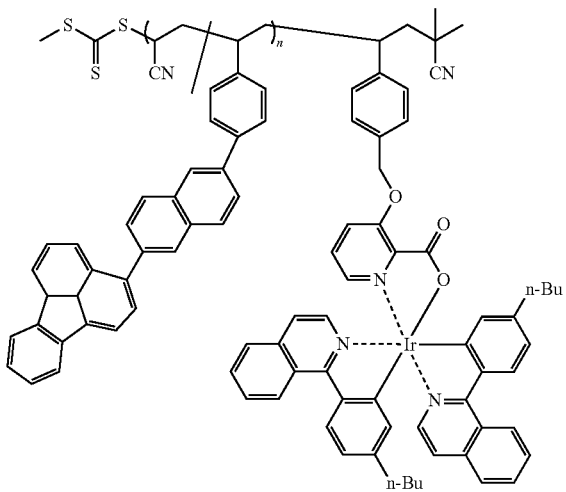
191
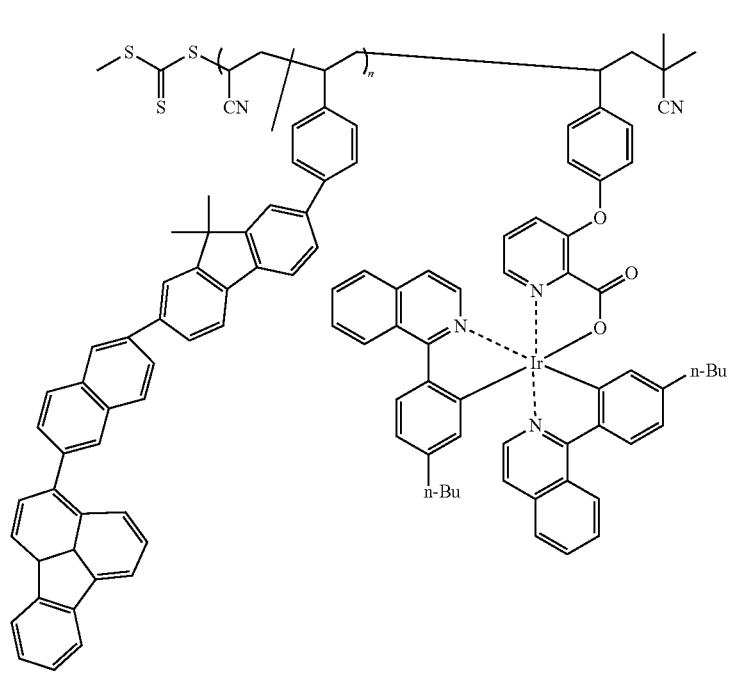
192

-continued
193
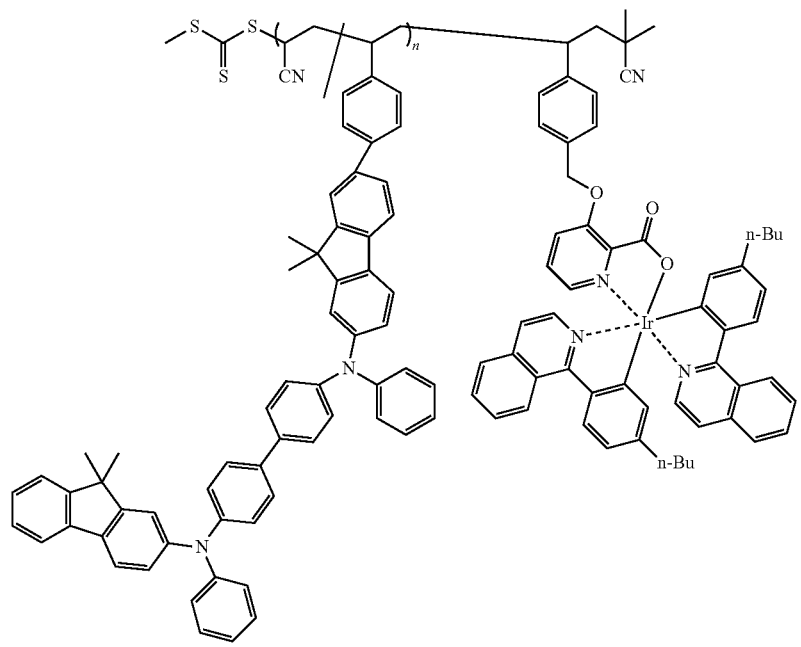
194
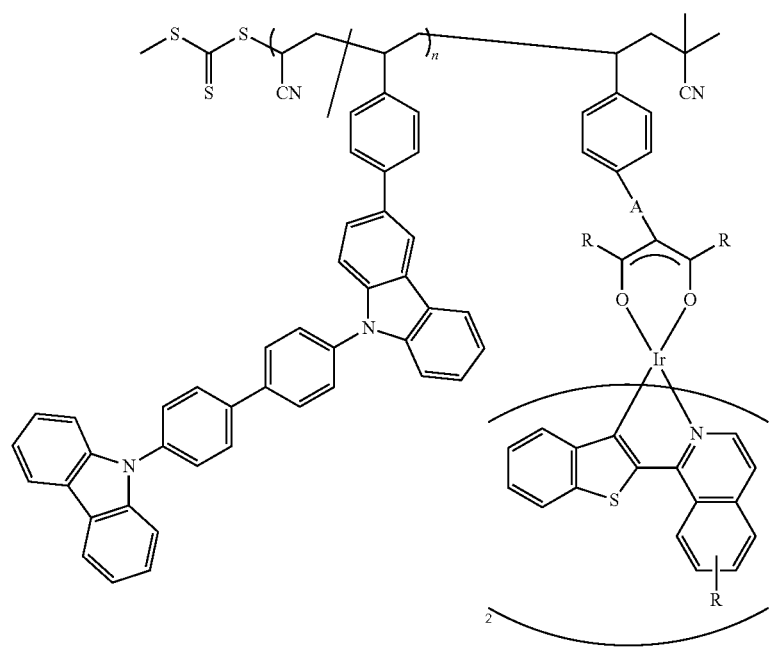

195
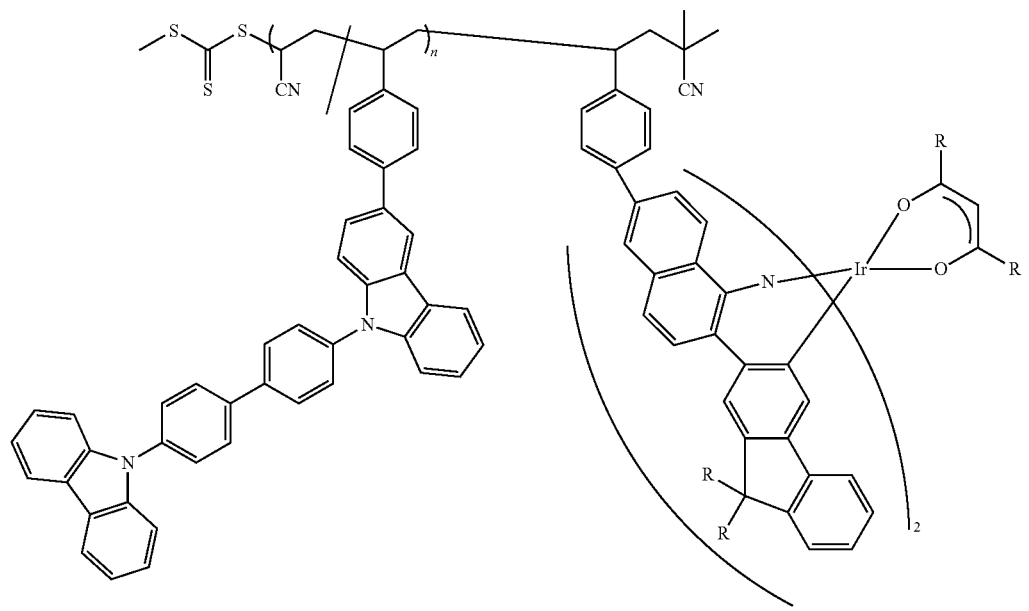
196
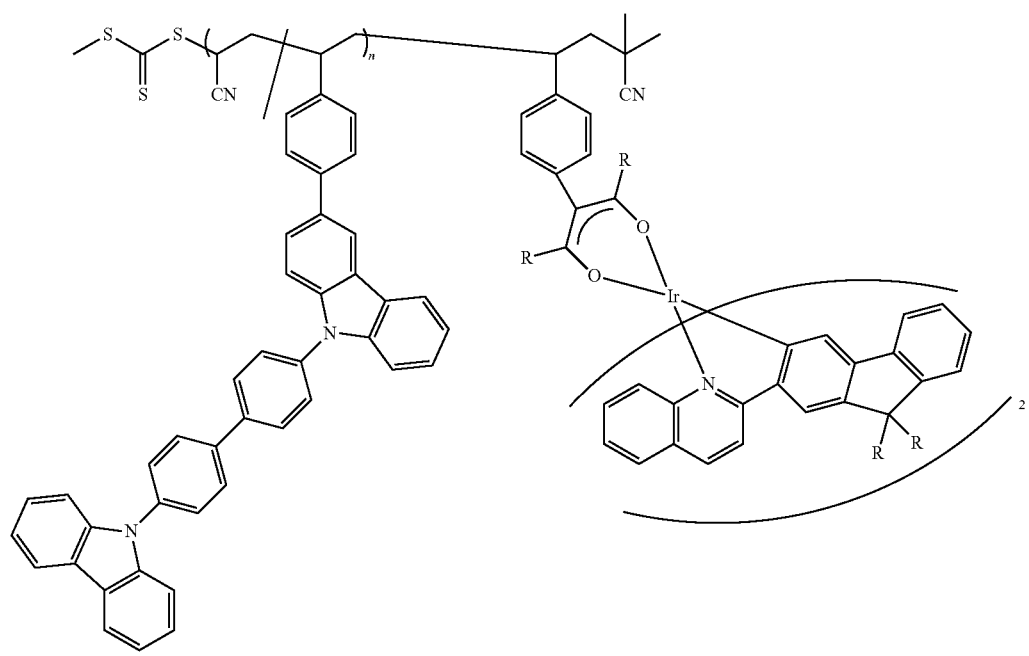

-continued
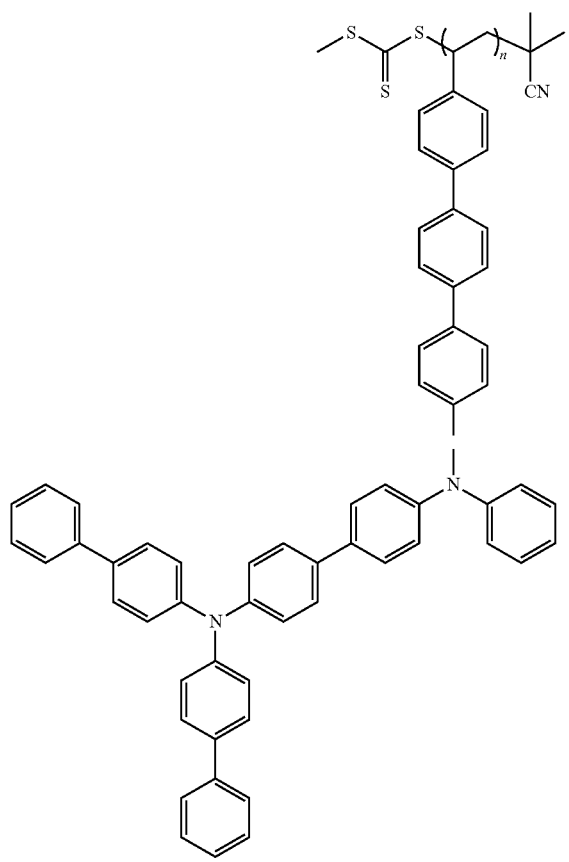
197
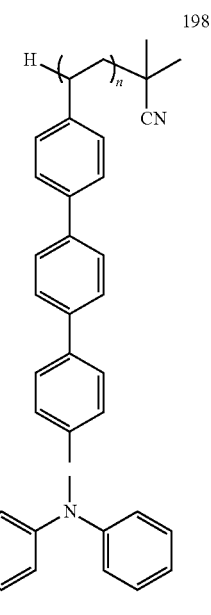
198
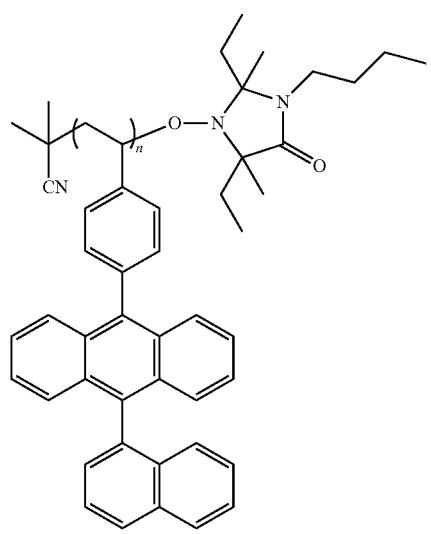
199

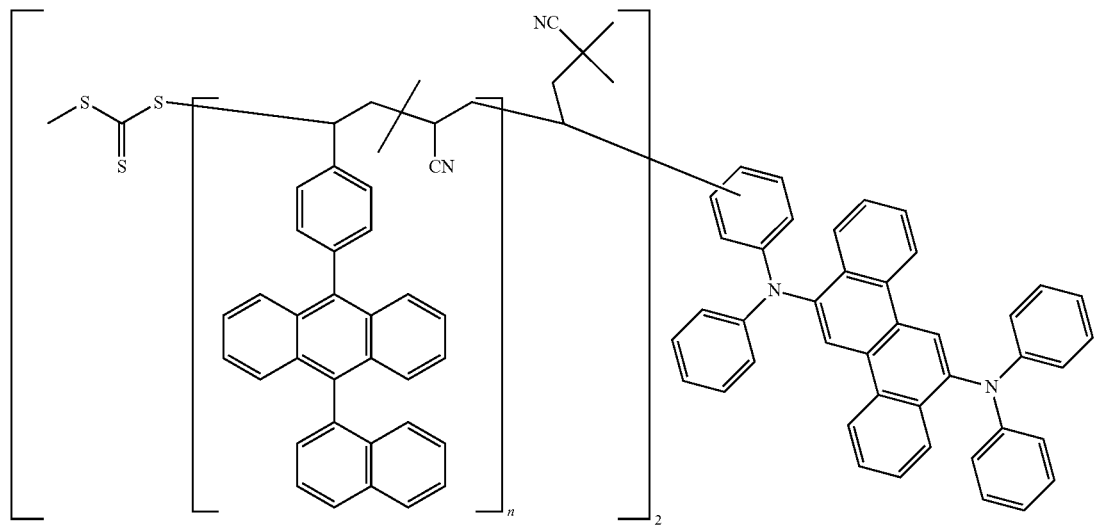
200
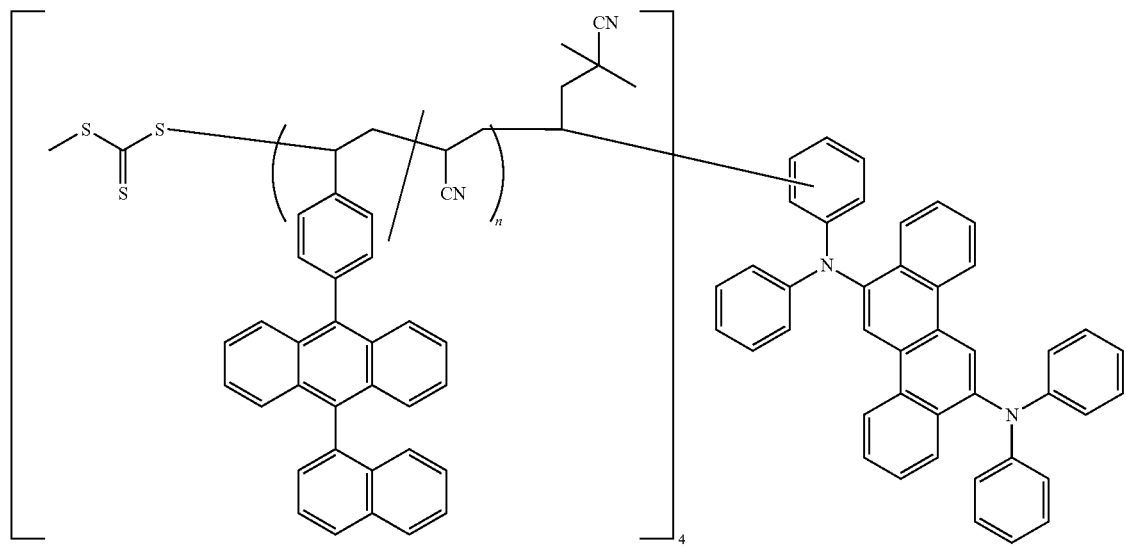
201

-continued
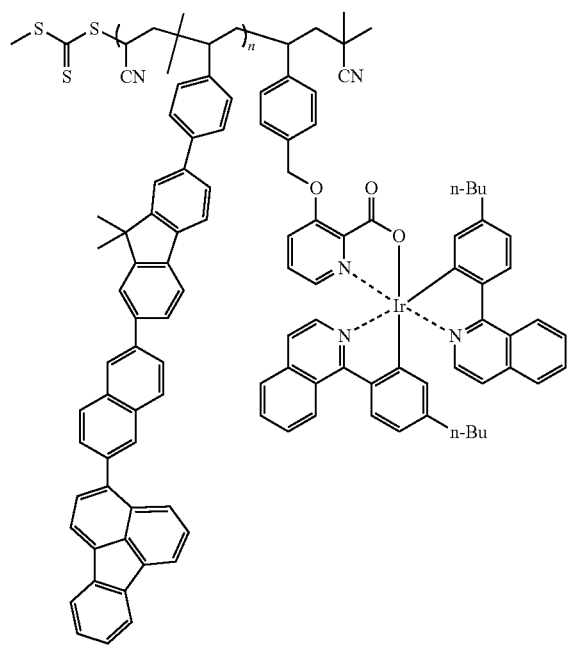
202
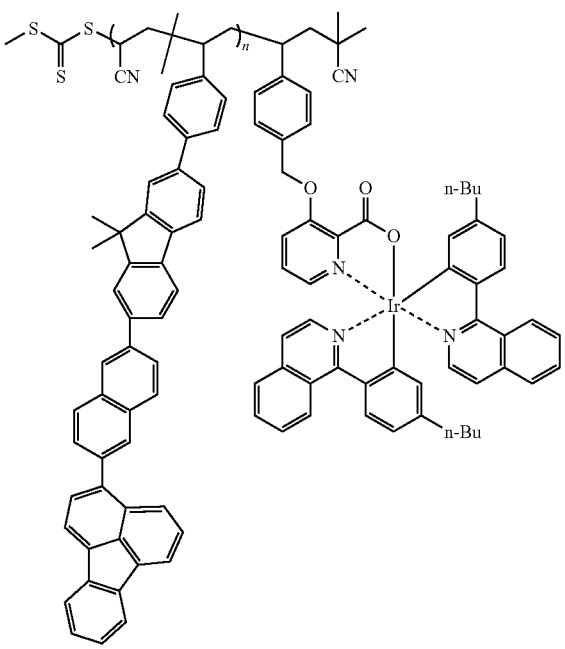
203
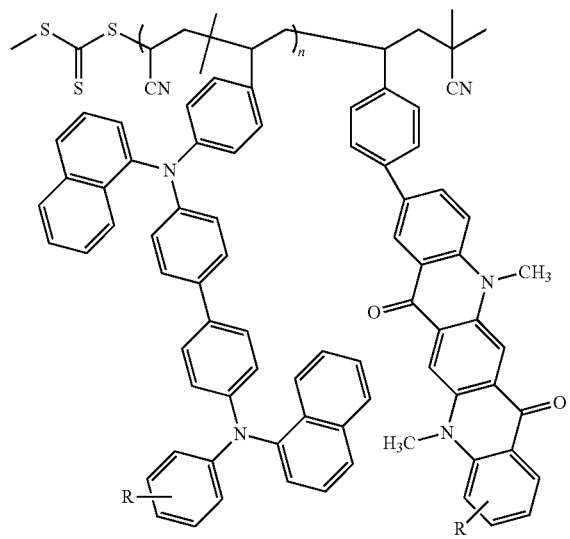
204
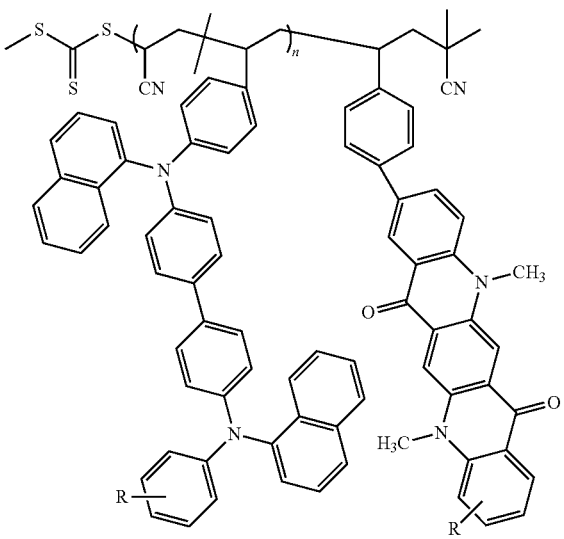
205

-continued
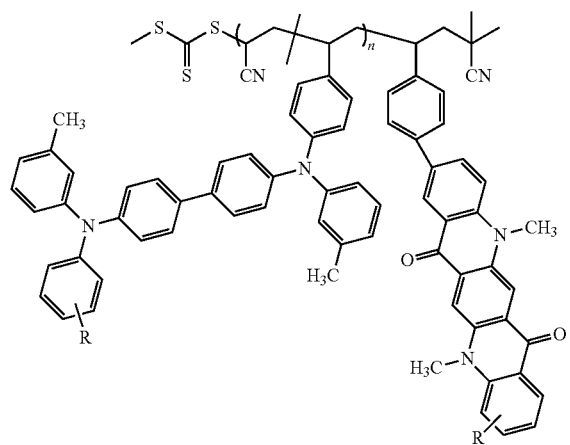
206
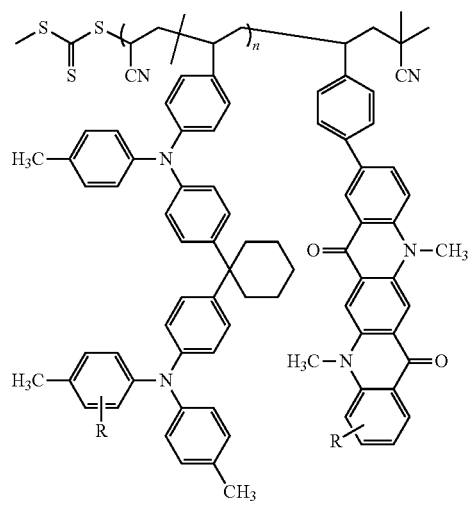
207
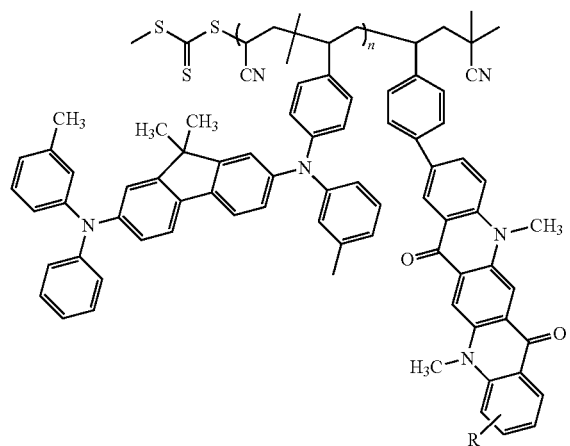
208
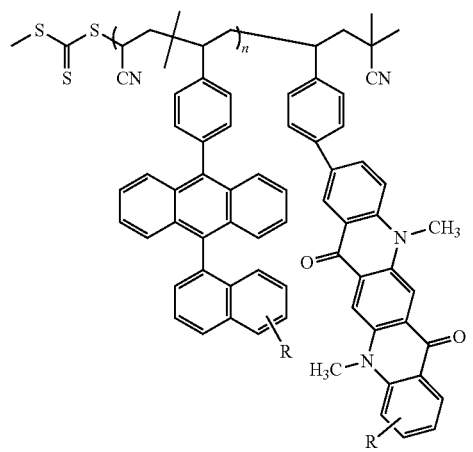
209
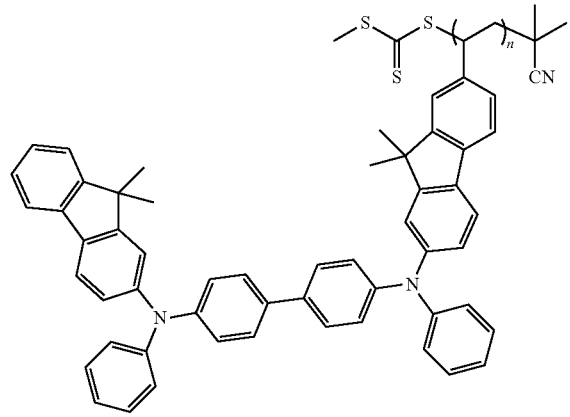
210
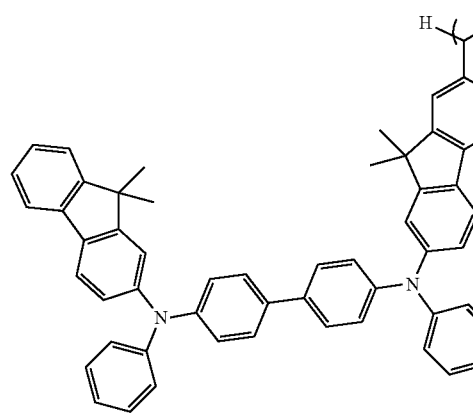
211

-continued
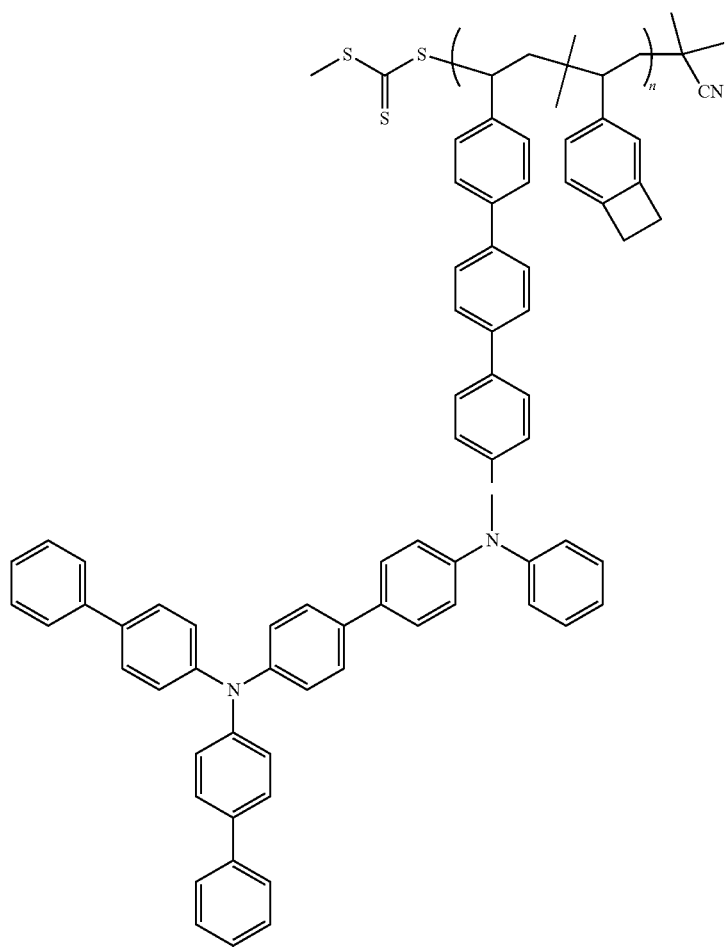
212
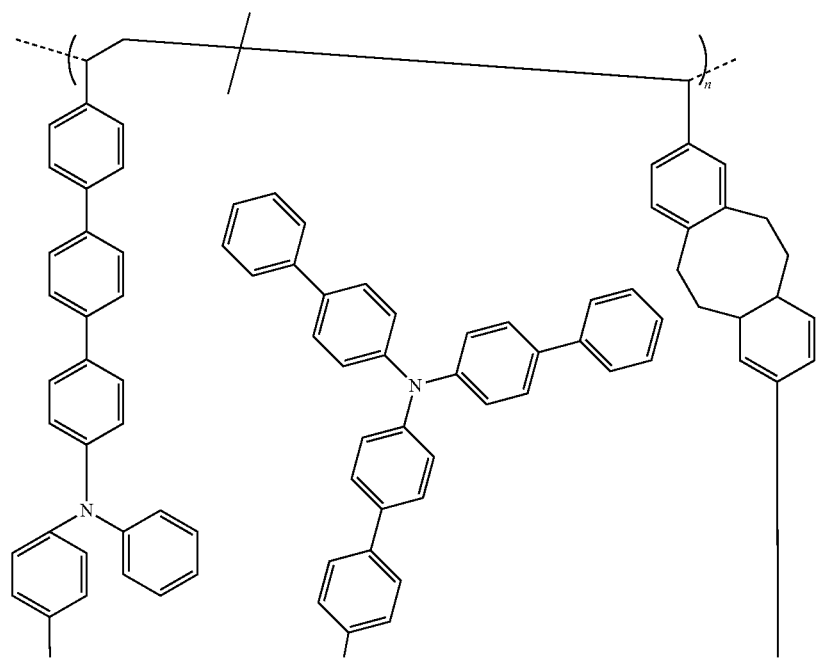
213

155
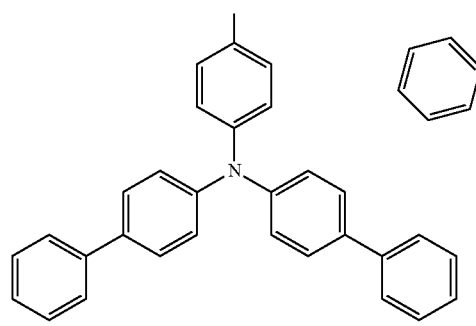
156
-continued
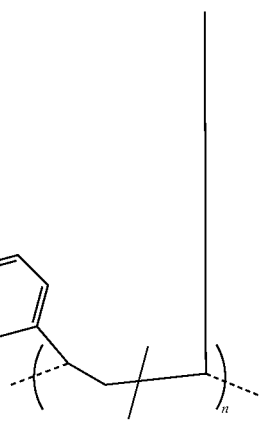
214
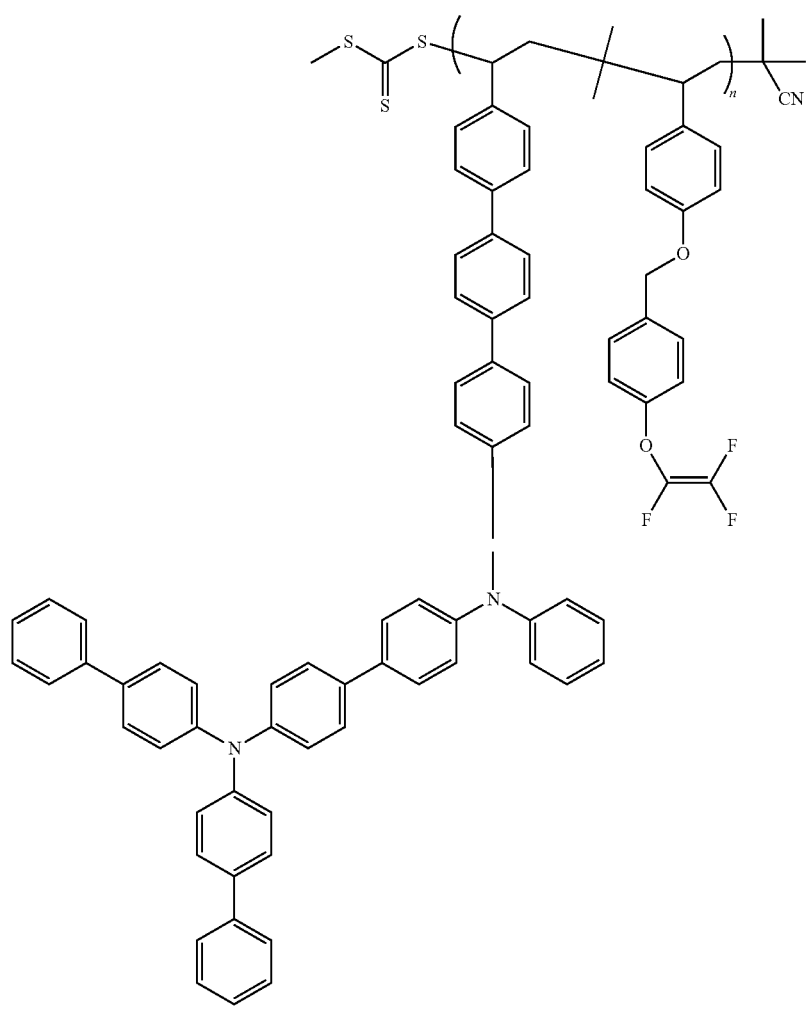

-continued

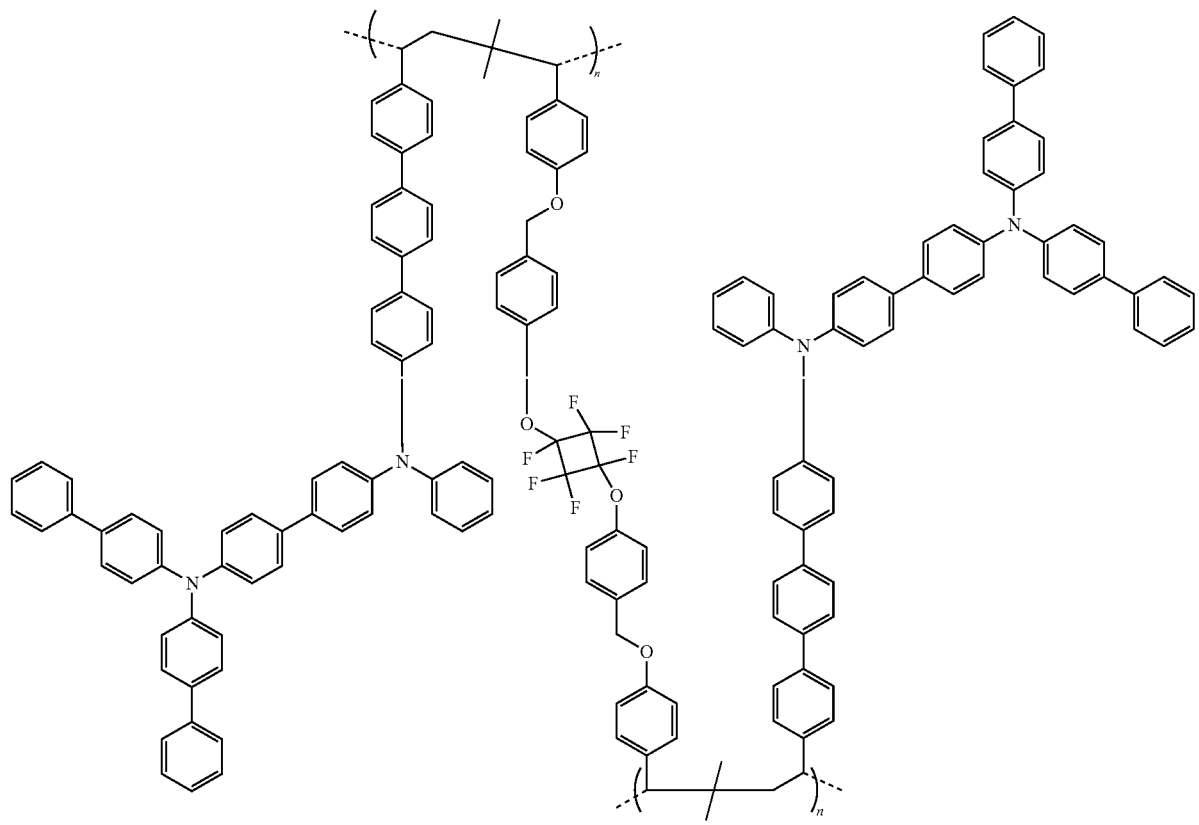

215

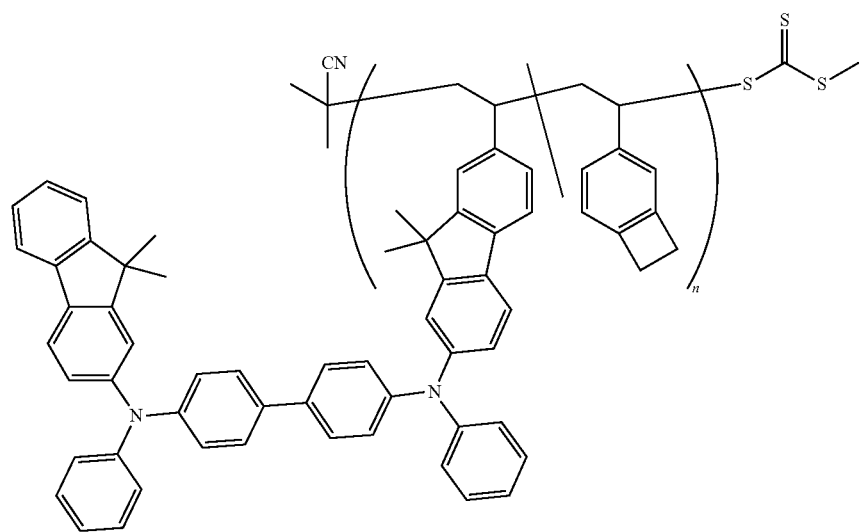

216

The polymer may be prepared by living radical polymerisation and end capped by the living radical functional group may be either retained or replaced with a functional group, including hydrogen.

The halogen content of the polymer, as an impurity, is less than about 50 ppm.

The polydispersity index of the polymer is preferably between about 1.05 to 2.0 more preferably between about 1.05 to 1.5 and most preferably between about 1.05 to 1.3.

A small molecule additive selected from the groups of fluorescent compounds or phosphorescent compounds may be added to the polymer. The small molecule additive may be either a fluorescent polymer compound additive or phosphorescent polymer compound additive.

The polymer may be cross-linked using monomers like 4-vinyl-1,2-dihydrocyclobutabenzene that won't cross-link at the polymerisation temperature between 60-120° C. The cross-linking can be conducted by simply heating the polymer films above 170° C., as known in the prior art (*Chem. Mater.* 2007, 19, 4827, *Macromolecules*, 2008, 41, 9570-9580). The cross-linked polymer prepared will have better solvent resistance compared to the non-cross-linked polymer film, and thus will allow deposition of multilayered films in the device of the invention while minimising the effect on device performance.

As described above, each layer of organic compound may comprise: the polymer and/or the polymer doped with separate dopant(s) selected from small molecule(s), oligomer(s) or another polymer(s).

During manufacture, the polymer is mixed with an organic solvent to form an ink having a viscosity of more than about $1\times10^{-3}$ Pa·s at 25° C.

In the organic luminescence device of the present invention, the organic compound layer comprising the above-mentioned compound of the formula (1) may be formed separately, or together, with the other layers (if any other layers are present) between the pair of electrodes (cathode and anode). Suitable formation techniques include vacuum deposition or solution process.

The thickness of the organic compound layer may be preferably less than at most about 10 micron, more preferably less than about 0.5 micron, even more preferably from about 0.001 micron to about 0.5 micron. In other embodiments each layer of organic compound in the device preferably has a thickness of from about 1 nm to about 1 micron more preferably from about 5 nm to about 50 nm.

Specific embodiments of the invention will now be described in further detail with reference to the accompanying figures, which illustrate a range of possible arrangements for the device of the present invention.

Figure 2:
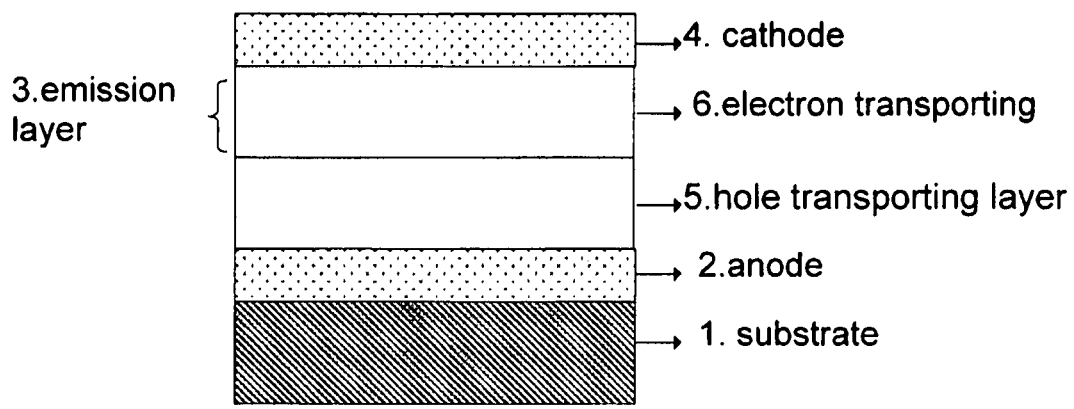
FIG. 2 is a schematic cross section of another embodiment of the organic electroluminescent device of the present invention showing multiple organic layers comprising a hole transporting layer and an emission layer.
Figure 3:
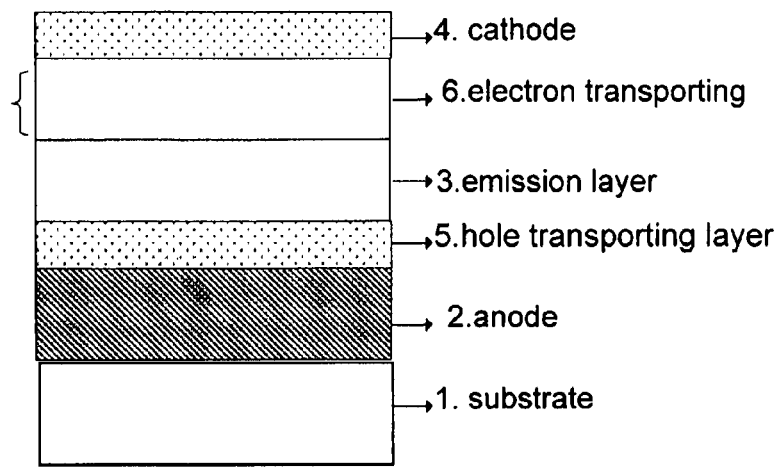
FIG. 3 is a schematic cross section of yet another embodiment of the organic electroluminescent device of the present invention showing multiple organic layers comprising a hole transporting layer, an emission layer, and an electron transporting layer.
Figure 4:
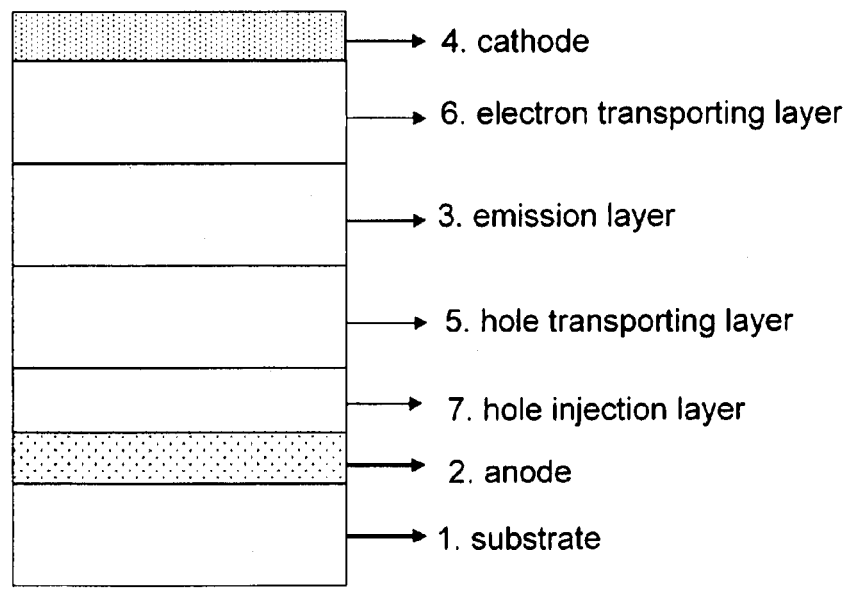
FIG. 4 is a schematic cross section of yet another embodiment of the organic electroluminescent device of the present invention showing multiple organic layers comprising a hole injection layer, a hole transporting layer, an emission layer, and an electron transporting layer.

The electroluminescent device of the present invention may have a single layer structure comprised of only polymer as defined by formula (1) as shown in FIG. 1, or be a multiply layered structure comprising two or more layers as shown in FIG. 2, 3 or 4.

More specifically, FIG. 1 is a schematic cross section of a first embodiment of the organic electroluminescent device of the present invention. In FIG. 1, the organic electroluminescent device includes a substrate 1, an anode 2 (deposited on, the substrate 1), an emission layer 3 (deposited on the anode 2) and a cathode 4 (deposited on the emission layer 3). In this embodiment, the emission layer 3 forms a single organic compound layer. This single layer may be comprised entirely of a single (co)-polymer having each of hole transporting ability, electron transporting ability and luminescence ability (associated with the re-combination of electrons and holes) based on its own properties, or through combination with a dopant that enhances the performances of the hole transporting ability, the electron transporting ability and/or luminescence ability of host compound.

In FIG. 1, the emission layer 3 may preferably have a thickness of about 5 nm to about 1 micron, more preferably about 5 nm to about 50 nm.

FIG. 2 shows another embodiment of the organic electroluminescent device of the present invention in the form of a multiple layer-type device comprised of a hole transporting layer 5 and a (co)-polymer layer 6 as an emission layer. Referring to FIG. 2, the organic luminescent device includes a substrate 1, an anode 2 (deposited on the substrate 1), the hole transporting layer 5 (deposited or coated on the anode 2), the (co)-polymer layer 6 (coated on the hole transporting layer 5) and a cathode (deposited on (co)-polymer layer 6).

In the embodiment of FIG. 2, each of the hole transporting layer 5 and the emission layer 6 may have a thickness of about 5 nm to about 1 micron, more preferably about 5 nm to about 50 nm.

FIG. 3 shows another embodiment of the organic electroluminescent device of the present invention in the form of a multiple layer device comprising a hole transporting layer 5, a (co)-polymer layer 3 as an emission layer, an electron transporting layer 6. In FIG. 3, the organic luminescent device includes a substrate 1, an anode 2 (deposited on the substrate 1), the hole transporting layer 5 (deposited or coated on the anode 2), the (co)-polymer layer 3 (coated on the hole transporting layer 5), the electron transporting layer 6 (deposited or coated on the emission layer 3) and a cathode (deposited on the electron transporting layer 6).

FIG. 4 shows another embodiment of the organic electroluminescent device of the present invention with multiple layers comprising a hole injection layer 7, a hole transporting layer 5, a (co)-polymer layer 3 as an emission layer and an electron transporting layer 6. In FIG. 4, the organic luminescent device includes a substrate 1, an anode 2 (deposited on the substrate 1), the hole injection layer 7 (deposited or coated on the anode 2), the hole transporting layer 5 (deposited or coated on the hole injection layer), the (co)-polymer 3 (coated on the hole transporting layer 5), the electron transporting layer 6 (deposited or coated on the emission layer 3) and a cathode (deposited on the electron transporting layer 6). In this embodiment, each of the hole injection layer, the hole transporting layer, the emission layer and the electron transporting layer may be formed by use of a hole injection compound, a hole transporting compound, an emissive compound and an electron transporting compound, respectively or as a mixture of these kinds of compounds. The compound of formula 1 can form the hole injection layer 7 and/or the hole transporting layer 5 (or a component thereof).

In FIGS. 1, 2, 3 and 4, each layer of 3, 5, 6, and 7 may be formed by either vacuum deposition or wet process using small molecule(s) or oligomer(s) or polymer compound or mixture of small molecule and polymer compound. Each thickness of the layer 3, 5 and 6 may preferably be ranging from 1 nm to 1 μm. Each of the thickness of the cathode and the anode may be preferably 100-200 nm.

The organic layer structures in the devices shown in FIGS. 1, 2, 3 and 4 represent the basic structure, respectively, so that the structure may be appropriately optimized depending on characteristics demanded. Examples of suitable modifications include the incorporation of one or more additional layers. For example, the hole transporting layer may be altered to comprise a hole injection layer (deposited on the anode) and hole transporting layer (deposited on the hole injection layer).

More alternative embodiments of the device structure other than those of the Figures are shown below, but are not restricted to these device structures.

1. Anode/hole transporting layer/emission layer/electron transporting layer/electron injection layer/cathode;
2. Anode/hole injection layer/emission layer/electron transporting layer/electron injection layer/cathode;
3. Anode/insulating layer/hole transporting layer/emission layer/electron transporting layer/cathode;
4. Anode/hole transporting layer/emission layer/electron transporting layer/insulating layer/cathode;
5. Anode/inorganic semiconductor/insulator/hole transporting layer/emission layer/insulator/cathode;
6. Anode/insulating layer/hole transporting layer/emission layer/electron transporting layer/insulating layer/cathode;
7. Anode/insulating layer/hole injection layer/hole transporting layer/emission layer/electron transporting layer/electron injection layer/cathode; and
8. Anode/insulating layer/hole injection layer/hole transporting layer/emission layer/electron transporting layer/electron injection layer/insulating layer/cathode.

In the embodiments described above, more preferable device structures are 1, 2, 3, 7 and 8, although this is not a restriction.

According to some embodiments, the polymer of the formula (1) may be formed as a hole injection layer or a hole generation layer. In this case, the hole injection layer or the hole generation layer has a thickness of about 1 nm to about 1 micron, more preferably about 1 nm to about 50 nm.

According to some embodiments, there is provided the use of the polymer of formula (1) as a hole injection material, or a hole generation material, as a hole injection layer or a hole generation layer, or as a dopant in a hole transporting layer.

In some embodiments, the polymer of formula (1) may be used in combination with a hole transporting material, an electron transporting compound and/or an emission compound.

The present invention will be described below in details with preparation and device examples, but the present invention is not intended to be restricted to these examples.

EXAMPLES

Example 1-7

Energy Carrier Materials

Example 1

9-(4'-(9H-carbazol-9-yl)biphenyl-4-yl)-3-(4-vinylphenyl)-9H-carbazole 162a 9-(4'-(9H-carbazol-9-yl)biphenyl-4-yl)-3-bromo-9H-carbazole (0.5 g, 0.88 mmol) and 4-vinyl boronic acid (0.14 g, 0.98 mmol) and Pd(dba)$_3$ (0.097 g, 0.01 mmol), CsCO$_3$ (0.289 g, 0.88 mmol) were dissolved in toluene (25 mL). Tri-t-butyl phosphine 10 wt % in hexane (0.053 g, 0.026 mmol) was added and the reaction mixture was stirred vigorously while refluxed at 85° C. for 24 h. The reaction mixture was cooled down to room temperature, diluted with toluene and filtered through a celite filter bed. The organic extract was evaporated to dryness and purified by silica column chromatography using dichloromethane and pet-ether (40-60° C.) to give slightly brownish colour powder as the product (0.3 g)

Example 2

3-(6-(4-vinylphenyl)naphthalene-2-yl)fluoranthene 152a 6-(fluoranthene-3-yl)naphthalene trifluoromethane sulfonate (0.16 g, 0.33 mmol), boronic acid (0.054 g, 0.36 mmol) and Pd(PPh$_3$)$_4$ (0.194 g, 0.17 mmol) were placed in a 2-neck RB flask and placed under nitrogen atmosphere. Toluene (25 mL) and Dimethoxyethane (25 mL) was then added to the reaction mixture followed by aq. Na$_2$CO$_3$ (2 M, 1.0 ml). The reaction mixture was refluxed at 85° C. for 24 h and diluted with Toluene and filtered through a celite bed. The combined organic extracts was evaporated to dryness and purified by silica column chromatography using dichloromethane and pet-ether (40-60° C.) to give slightly yellow coloured powder the product (0.05 g).

Example 3

3-(9,9-dimethyl-7-(4-vinylphenyl)-9H-fluoren-2-yl)fluoranthene 151a 3-(7-bromo-9,9-dimethyl-9H-fluoren-2-yl)fluoranthene (0.4 g, 0.843 mmol), 4-vinyl boronic acid (0.137 g, 0.92 mmol) and Pd(dba)$_3$ (0.0096 g, 0.01 mmol), CsCO$_3$ (0.275 g, 0.84 mmol) were dissolved in dioxan (25 mL) under nitrogen atmosphere. Tri-t-butyl phosphine (0.005 g, 0.024 mmol) was added and the reaction mixture stirred at room temperature for few minutes and then heated to 85° C. for 24 h. The reaction mixture was cooled down and diluted with dioxan and filtered through celite. The combined organic extracts was evaporated to dryness and purified by column chromatography using dichloromethane and pet-ether (40-60° C.) to give slightly yellow coloured powder as the product (0.145 g).

Example 5

9-(naphthalene-1-yl)-10-(4-vinylphenyl)anthracene 142a 9-bromo-10-(naphthalene-1-yl)anthracene (3.08 g, 8.03 mmol), and 4-vinyl boronic acid (1.3 g, 12.5 mmol) and Pd(dba)$_3$ (0.091 g, 0.1 mmol), CsCO$_3$ (2.61 g, 8.03 mmol) were dissolved in dioxan (25 mL). Tri-t-butyl phosphine (0.48 g, 0.24 mmol) was added and the reaction mixture was stirred while refluxed at 85° C. for 24 h. The reaction mixture was cooled down and diluted with Dioxan and filtered through celite bed. The combined organic extracts was evaporated to dryness and purified by column chromatography using dichloromethane and pet-ether (40-60° C.) to give the product 142 as a slightly yellow coloured powder (1.95 g). The product was eluted with 20% dichloromethane.

Example 6

$N^3,N^3,N^{10},N^{10},7,14$-hexaphenylacenaphtho[1,2-k]fluoranthene-3,10-diamine 85

3,10-dibromo-7,14-diphenylacenaphthol[1,2-k]fluoranthene (5.0 g, 7.85 mmol), diphenyl amine (2.65 g, 15.71 mmol), Pd (OAc)$_2$ (0.035 g, 0.157 mmol), sodium-tert-butoxide (1.05 g, 11.0 mmol) were weighed together in a 3 neck RB flask and placed under nitrogen atmosphere. Anhydrous toluene (150.0 ml) was added to the reaction mixture and stirred at RT. Tri-t-butyl phosphine 10 wt % in hexane (1.59 g, 0.78 mmol) was added then added through a syringe and reaction mixture warmed to 85° C. The reaction was left overnight at the above temperature under constant stirring. The reaction mixture was then precipitated into methanol and filtered. The dried powder was then purified by column chromatography using dichloromethane and pet-ether (40-60° C.) to give the product 152 as orange coloured powder (3.5 g).

Example 7-10

Red Dopant and RAFT Agent

Example 7

7,14-diphenyl-$N^3,N^3,N^{10}$-trip-tolyl-$N^{10}$-(4-vinylphenyl)acenaphtho[1,2-k]fluoranthene-3,10-diamine 86a 4-((10-(diphenylamino)-7,14-diphenylacenaphthol[41,2-k]fluoranthen-3-yl)(phenyl)aminophenyl trifluoromethyl sulfate (2.28 g, 2.27 mmol), vinyltrifluoroborate (0.365 g, 2.73 mmol), Pd(dppf)Cl$_2$ (0.371 g, 0.45 mmol) and Et$_3$N (0.230 g, 2.27 mmol) was dissolved in 1-propoanol) under nitrogen atmosphere. The reaction mixture was heated to 97° C. for 3 hr. The reaction mixture was poured into iced-water and extracted with dichloromethane and the organic fraction dried over MgSO$_4$ and evaporated to dryness. The crude product thus obtained was purified by column chromatography with dichloromethane and pet-ether (40-60° C.) to give the required product 86 (1.3 g)

Example 8

7,14-diphenyl-$N^3,N^{10}$-dip-tolyl-$N^3,N^{10}$-bis(4-vinylphenyl)acenaphtho[1,2-k]fluoranthene-3,10-diamine 87a 3,10-dibromo-7,14-diphenylacenaphthol{1,2-k}fluoranthene (3.35 g, 5.26 mmol), 4-methyl-N-(4-vinylphenyl)aniline (2.20 g, 10.52 mmol), $Pd(OAc)_2$ (0.023 g, 0.10 mmol) and sodium-tert-butoxide (0.70 g, 7.37 mmol) was dissolved in toluene under nitrogen atmosphere. Tri-t-butyl phosphine 10 wt % in n-hexane (1.06 g, 0.53 mmol) was added then added through a syringe and reaction mixture warmed to 85° C. The reaction was left overnight at the above temperature under constant stirring. The reaction mixture was then precipitated into methanol and filtered. The dried powder was then purified by column chromatography using dichloromethane and pet-ether (40-60° C.) to give 85 as an orange coloured powder (2.6 g).

Example 9

7,14-diphenyl-$N^3,N^3,N^{10},N^{10}$-tetrakis(4-vinylphenyl)acenaphtho[1,2-k]fluoranthene-3,10-diamine 89a 3,10-dibromo-7,14-diphenylacenaphthol[1,2-k]fluoranthene (1.43 g, 2.24 mmol), bis(4-vinylphenyl)amine (0.99 g, 4.49 mmol), $Pd(OAc)_2$ (0.010 g, 0.044 mmol) and sodium-tert-butoxide (0.30 g, 3.14 mmol) was dissolved in toluene under nitrogen atmosphere. Tri-t-butyl phosphine 10 wt % in hexane (0.45 g, 0.22 mmol) was added then added through a syringe and reaction mixture warmed to 85° C. The reaction was left overnight at the above temperature under constant stirring. The reaction mixture was then precipitated into methanol and filtered. The dried powder was then purified by silica column chromatography using dichloromethane and pet-ether (40-60° C.) to give 89 as the orange coloured powder (1.0 g).

Example 10

3-cyano-1(4-((10(dip-tolylamino)-7,14-diphenylacenaphthalol[1,2-k]fluoranthene-3-yl)(p-tolyl)amino)phenyl)-3-methylbutylmethyl carbonotrithioate 9a 7,14-pentaphenyl-N-(4-vinylphenyl)acenaphthol[1,2-k]fluoranthen-3-10-diamin (0.08 g, 1.0 mol), 2-cyanopropan-2-yl methyl carbonotrithioate (0.017 g, 0.88 mmol), AIBN (0.003 g, 0.018 mmol) was weighed into a glass vial. Toluene (0.25 ml) was added to the vial and warmed to dissolve the reaction mixture. The reaction mixture was then degassed by freeze-pump-thaw process cycles (×3), before the apparatus was sealed off. Then reaction mixture was heated for 24 hr at 80° C., then solvent was distilled off and the residue was purified by silica column chromatography using dichloromethane and pet-ether (40-60° C.) to give the above product (0.07 g)

The corresponding bis RAFT agents 1,1'-(4,4'-(7,14-diphenylacenaphtho[1,2-k]fluoranthene-3,10-diyl)bis(p-tolylazanediyl))bis(4,1-phenylene))bis(3-cyano-3-methylbutane-1,1-diyl)dimethyl dicarbonotrithioate 10 and tetra RAFT agents 1,1',1'',1'''-(4,4',4'',4'''-(7,14-diphenylacenaphtho[1,2-k]fluoranthene-3,10-diyl)bis(azanetriyl)tetrakis(benzene-4,1-diyl))tetrakis(3-cyano-3-methylbutane-1,1-diyl)tetramethyl tetracarbonotrithioate 12 were also prepared by above method under similar conditions to give corresponding yields.

Blue-Fluorescent-Dopant RAFT Agent

Example 11-13

Example 11

3-cyano-1-(4-(12-(diphenylamino)chrysen-6-yl)(phenyl)amino)phenyl)-3-methylbutyl methyl carbonotrithioate 16a $N^6,N^6,N^{12}$-triphenyl-$N^{12}$-(4-vinylphenyl)chrysene-6,12-diamine (0.5 g, 0.73 mmol), 2-cyanopropan-2-yl methyl carbonotrithioate (0.278 g, 1.46 mmol), AIBN (0.0024 g, 0.02 mol) and toluene (3.0 mL) was poured into grass tube. The reaction mixture was degassed by following three freeze-pump-thaw process, before the apparatus was sealed off. Then reaction mixture was heated for 16 hr at 80° C., then solvent was distilled off and the residue was purified by column chromatography (eluent n-hexane:ethyl acetate=3:1) to give 16 (326 mg, 0.38 mol, Yield=52%)

Example 12

1,1'-(4,4'-(chrysene-6,12-diylbis(p-tolylazanediyl))bis(4,1-phenylene))bis(3-cyano-3-methylbutane-1,1-diyl)dimethyl dicarbonotrithioate 17a $N^6,N^{12}$-dip-tolyl-$N^6,N^{12}$-bis(4-vinylphenyl)chrysene-6,12-diamine (0.3 g, 0.45 mmol), 2-cyanopropan-2-yl methyl carbonotrithioate (0.412 g, 2.16 mmol), AIBN (0.007 g, 0.05 mol) was weighed into a glass vial. Toluene (3.0 ml) was added to the vial and warmed to dissolve the reaction mixture. The reaction mixture was then degassed by three freeze-pump-thaw process before the apparatus was sealed off. Then reaction mixture was heated for 16 hr at 80° C., then solvent was distilled off and the residue was purified by column chromatography (1. n-hexane:ethyl acetate=1:1, 2. ethyl acetate) to give 17 (0.247 g, 0.24 mol, Yield=51%)

Example 13

1,1',1'',1'''-(4,4',4'',4'''-(chrysene-6,12-diylbis(azanetriyl))tetrakis(benzene-4,1-diyl))tetrakis(3-cyano-3-methylbutane-1,1-diyl)tetramethyl tetracarbonotrithioate 19a $N^6,N^6,N^{12},N^{12}$-tetrakis(4-vinylphenyl)chrysene-6,12-diamine (0.3 g, 0.45 mmol), 2-cyanopropan-2-yl methyl carbonotrithioate (0.412 g, 2.16 mmol), AIBN (0.007 g, 0.05 mol) was weighed into a glass vial. Toluene (3.0 mL) was added to the vial and warmed to dissolved the reaction mixture. The reaction mixture was then degassed by three freeze-pump-thaw process before the apparatus was sealed off. Then reaction mixture was heated for 16 hr at 80° C., then solvent was distilled off and the residue was purified by column chromatography (1. n-hexane:ethyl acetate=1:1, 2. ethyl acetate) to give 19 (0.349 g, 0.24 mol, Yield=54%)

Red-Phosphorescent-Dopant with RAFT Agent

Example 14-15

Example 14

Ir(piq-n-Bu)$_2$(pc-OCH$_2$-phenyl-(3-cyano-3-methylbutane-1,1-diyl)methyl carbonotrithioate) 24a Ir(piq-n-Bu)$_2$(pc-OCH$_2$-vinylphenyl) (100 mg, 0.1 mol), 2-cyanopropan-2-yl methyl carbonotrithioate (0.048 g, 0.24 mmol), AIBN (0.012 g, 0.06 mol) was weighed into a glass vial. Toluene (1.0 mL) was added to the vial and warmed to dissolve the reaction mixture. The reaction mixture was then degassed by three freeze-pump-thaw process before the apparatus was sealed off. Then reaction mixture was heated for 24 hr at 80° C., then solvent was distilled off and the residue was purified by column chromatography (chloroform:ethyl acetate=7:3) to give 24 (0.51 g, 0.04 mol, Yield=44%)

Example 15

Ir(btp)$_2$(pc-OCH$_2$-(3-cyano-3-methylbutane-1,1-diyl)methyl carbonotrithioate) 25a Ir(btp)$_2$(pc-OCH$_2$-vinylphenyl) (0.131 g, 0.15 mol), 2-cyanopropan-2-yl methyl carbonotrithioate (0.086 g, 0.45 mmol), AIBN (0.012 g, 0.08 mol) was weighed into a glass vial. Chloroform (1.0 ml) was added to the vial and warmed to dissolve the reaction mixture. The reaction mixture was then degassed by three freeze-pump-thaw process before the apparatus was sealed off. The reaction mixture was heated for 18 hr at 80° C., then solvent was distilled off and the residue was purified by column chromatography (chloroform:ethyl acetate=4:1) to give 25 (0.086 g, 0.08 mol, Yield=53%)

Example 16-23

Polymer Synthesis

General Experimental Conditions.

In all instances, liquid monomers were purified (to remove inhibitors) by passing through a short basic alumina column immediately prior to use. The experiments referred to as controls were experiments run without a LRP controlling agent (i.e. RAFT, NMP or ATRP agent) unless otherwise specified. For the polymerisations performed in ampoules, degassing was accomplished by repeated freeze-evacuate-thaw cycles, till constant vacuum <1×10$^{-3}$ mbar. Once degassing was complete, the ampoules were flame sealed under vacuum and completely submerged in a thermostated oil bath at the specified temperature for the specified times. The percentage conversions were calculated by $^1$H NMR unless otherwise stated.

Example 16

Poly(9-(naphthalen-1-yl)-10-(4-vinylphenyl)anthracene-co-acrylonitrile) 184a 9-(naphthalen-1-yl)-10-(4-vinylphenyl)anthracene monomer (1.92 g), acrylonitrile (0.250 g), cyanoisopropyl methyl trithiocarbonate (18 mg) and Vazo 88 initiator (2.3 mg) were transferred to an ampoule with toluene (16.6 mL). The ampoule was degassed, sealed and heated at 100° C. for 20 h. The monomer dissolved on heating to form a homogeneous solution. The ampoule was cooled to room temperature, opened and a sample taken for NMR. Conversion$_{NMR}$ styrenic=57%. After removal of the unreacted monomer, by precipitation of the polymer mixture diluted with additional chloroform into hexane:chloroform (4:1), 3 times, gave 184a (1.10 g), M$_n$ $_{GPC}$=4570, M$_w$/M$_n$=1.27.

Example 17

Poly(9-(naphthalen-1-yl)-10-(4-vinylphenyl)anthracene) 199

9-(naphthalen-1-yl)-10-(4-vinylphenyl)anthracene monomer (50 mg), 3-butyl-2,5-diethyl-1-nitroxide-2,5-dimethylimidazolidin-4-one (0.30 mg), AIBN (0.29 mg) and VR 110 initiator (0.03 mg) were transferred to an ampoule with toluene (0.3 mL). The ampoule was degassed, sealed and heated at 130° C. for 20 h 26 min. The monomer dissolved on heating to form a homogeneous solution. The ampoule was cooled to room temperature, opened and a sample taken for NMR. Conversion$_{NMR}$=80%. After removal of the unreacted monomer, by precipitation of the polymer mixture diluted with additional chloroform into hexane:chloroform (4:1), 3 times, gave 199 (1.10 g), M$_n$ $_{GPC}$=5420, M$_w$/M$_n$=1.94.

Example 18

Poly[9-(naphthalen-2-yl)-10-(4-vinylphenyl)anthracene-co-acrylonitrile)] 184'

9-(naphthalen-2-yl)-10-(4-vinylphenyl)anthracene monomer (50 mg), acrylonitrile (6.5 mg), cyanoisopropyl methyl trithiocarbonate (0.47 mg) and Vazo 88 initiator (0.06 mg) were transferred to an ampoule with toluene (0.5 mL). The ampoule was degassed, sealed and heated at 100° C. for 21 h. The monomer dissolved on heating to form a homogeneous solution. The ampoule was cooled to room temperature, opened and a sample taken for NMR. Conversion$_{NMR}$ styrenic=36%. After removal of the unreacted monomer, by precipitation of the polymer mixture diluted with additional chloroform into hexane:chloroform (4:1), 3 times, gave 184', M$_n$ $_{GPC}$=4480 Da, M$_w$/M$_n$=1.21.

Poly(9-(naphthalen-1-yl)-10-(4-vinylphenyl)anthracene) 184

9-(naphthalen-1-yl)-10-(4-vinylphenyl)anthracene monomer (100 mg), cyanoisopropyl methyl trithiocarbonate (0.71 mg) and Vazo 88 initiator (0.06 mg) were transferred to an ampoule with toluene (1.1 mL). The ampoule was degassed, sealed and heated at 100° C. for 22 h. The monomer dissolved on heating to form a homogeneous solution. The ampoule was cooled to room temperature, opened and a sample taken for NMR. Conversion$_{NMR}$=19%. After removal of the unreacted monomer, by precipitation of the polymer mixture diluted with additional chloroform into hexane:chloroform (4:1), 3 times, gave 184 (11.7 mg), M$_n$ $_{GPC}$=2390 Da, M$_w$/M$_n$=1.13.

Example 19

Poly[(9-(naphthalen-1-yl)-10-(4-vinylphenyl)anthracene-co-acrylonitrile)]-N$^6$,N$^6$,N$^{12}$-triphenyl-N$^{12}$-(4-vinylphenyl)chrysene-6,12-diamine 185

9-(naphthalen-1-yl)-10-(4-vinylphenyl)anthracene monomer (1.00 g), acrylonitrile (0.13 g), 3-cyano-1-(4-((12-(diphenylamino)chrysen-6-yl)(phenyl)amino)phenyl)-3-methylbutyl methyl carbonotrithioate (38 mg) and Vazo 88 initiator (5.6 mg) were transferred to an ampoule with toluene (4 mL). The ampoule was degassed, sealed and heated at 100° C. for 16 h 45 min. The monomer dissolved on heating to form a homogeneous solution. The ampoule was cooled to room temperature, opened and a sample taken for NMR. Conversion$_{NMR}$ styrenic=97%. After removal of the unreacted monomer, by precipitation of the polymer mixture diluted with additional chloroform into hexane:chloroform (4:1), 3 times, gave 185 (1.02 g), $M_{n\ GPC}$=12.9 kDa, $M_w/M_n$=1.84.

Example 20

Poly(9-(naphthalen-1-yl)-10-(4-vinylphenyl)anthracene-co-7,14-diphenyl-$N^3,N^3,N^{10}$-trip-tolyl-$N^{10}$-(4-vinylphenyl)acenaphtho[1,2-k]fluoranthene-3,10-diamine) 186a 9-(naphthalen-1-yl)-10-(4-vinylphenyl)anthracene monomer (50 mg), 7,14-diphenyl-$N^3,N^3,N^{10}$-trip-tolyl-$N^{10}$-(4-vinylphenyl)acenaphtho[1,2-k]fluoranthene-3,10-diamine monomer (1.9 mg), cyanoisopropyl methyl trithiocarbonate (0.24 mg) and Vazo 88 initiator (0.03 mg) were transferred to an ampoule with toluene (0.5 mL). The ampoule was degassed, sealed and heated at 100° C. for 22 h. The monomer dissolved on heating to form a homogeneous solution. The ampoule was cooled to room temperature, opened and a sample taken for NMR. Conversion$_{NMR}$ styrenic=17%. After removal of the unreacted monomer, by precipitation of the polymer mixture diluted with additional chloroform into hexane:chloroform (4:1), 3 times, gave 186a, $M_{n\ GPC}$=1470 Da, $M_w/M_n$=1.18.

Example 21

Poly[(9-(4'-(9H-carbazol-9-yl)biphenyl-4-yl)-3-(4-vinylphenyl)-9H-carbazole-co-acrylonitrile)]-Ir(piq-n-Bu)$_2$(pc-OCH$_2$-phenyl-(3-cyano-3-methylbutane-1,1-diyl) 189

9-(4'-(9H-carbazol-9-yl)biphenyl-4-yl)-3-(4-vinylphenyl)-9H-carbazole monomer (28.7 mg), acrylonitrile (2.6 mg), Ir(btp)$_2$(pc-OCH$_2$-(3-cyano-3-methylbutane-1,1-diyl) methyl carbonotrithioate) (1.13 mg) and VR 110 initiator (0.025 mg) were transferred to an ampoule with toluene (0.3 mL). The ampoule was degassed, sealed and heated at 120° C. for 20 h. The monomer dissolved on heating to form a homogeneous solution. The ampoule was cooled to room temperature, opened and a sample taken for NMR. Conversion$_{NMR}$ styrenic=61%. After removal of the unreacted monomer, by precipitation of the polymer mixture diluted with additional chloroform into hexane:chloroform (1:1), 2 times, gave 189 (9.0 mg), $M_{n\ GPC}$=10.3 kDa, $M_w/M_n$=1.57.

Example 22

Poly($N^4,N^4$-di(biphenyl-4-yl)-$N^{4'}$-phenyl-$N^{4'}$-(4'-(4-vinylphenyl)biphenyl-4-yl)biphenyl-4,4'-diamine) 197

$N^4,N^4,N^4$-di(biphenyl-4-yl)-$N^{4'}$-phenyl-$N^{4'}$-(4'-(4-vinylphenyl)biphenyl-4-yl)biphenyl-4,4'-diamine (1.50 g), cyanoisopropyl methyl trithiocarbonate (3.5 mg) and Vazo 88 initiator (0.45 mg) were transferred to an ampoule with toluene (9 mL). The ampoule was degassed, sealed and heated at 100° C. for 22 h. The monomer dissolved on heating to form a homogeneous solution. The ampoule was cooled to room temperature, opened and a sample taken for NMR. Conversion$_{NMR}$=64% After removal of the unreacted monomer, by precipitation of the polymer mixture diluted with additional chloroform into hexane:chloroform (1:1), 3 times, gave 197 (0.91 g), $M_{n\ GPC}$=16.6 kDa, $M_w/M_n$=1.19.

Example 23

RAFT Removal of Poly($N^4,N^4$-di(biphenyl-4-yl)-$N^{4'}$-phenyl-$N^{4'}$-(4'-(4-vinylphenyl)biphenyl-4-yl)biphenyl-4,4'-diamine) 198 poly($N^4,N^4$-di(biphenyl-4-yl)-$N^{4'}$-phenyl-$N^{4'}$-(4'-(4-vinylphenyl)biphenyl-4-yl)biphenyl-4,4'-diamine) methyl carbonotrithioate (0.422 g) 197, N-ethyl piperidine hypophosphite (45.5 mg) and Vazo 88 initiator (2.9 mg) were transferred to an ampoule with toluene (4.2 mL). The ampoule was degassed, sealed and heated at 100° C. for 16 h. The monomer dissolved on heating to form a homogeneous solution. The ampoule was cooled to room temperature, opened and the mixture precipitated to remove the biproducts from the polymer, the mixture was diluted with additional chloroform into methanol (MeOH). The precipitate was removed by filtration in a Buchner funnel and washed with MeOH, MeOH:water (1:1), MeOH and dried by air suction to give RAFT trithiocarbonate end-group removed poly($N^4,N^4$-di(biphenyl-4-yl)-$N^{4'}$-phenyl-$N^{4'}$-(4'-(4-vinylphenyl)biphenyl-4-yl)biphenyl-4,4'-diamine) 198 (0.399 g), $M_{n\ GPC}$=16.6 kDa, $M_w/M_n$=1.20

Example 24

Poly($N^4,N^4$-di(biphenyl-4-yl)-$N^{4'}$-phenyl-$N^{4'}$-(4'-(4-vinylphenyl)biphenyl-4-yl)biphenyl-4,4'-diamine)-co-1,2-dihydrocyclobutabenzene 212

$N^4,N^4$-di(biphenyl-4-yl)-$N^{4'}$-phenyl-$N^{4'}$-(4'-(4-vinylphenyl)biphenyl-4-yl)biphenyl-4,4'-diamine (2.05 g), 4-vinyl-1,2-dihydrocyclobutabenzene (VBCB) (17.7 mg), cyanoisopropyl methyl trithiocarbonate (5.04 mg) and Vazo 88 initiator (0.65 mg) were transferred to an ampoule with toluene (12.1 mL). The ampoule was degassed, sealed and heated at 100° C. for 20 h 35 min, the monomer dissolving on heating to form a homogeneous solution. The ampoule was cooled to room temperature, opened and a sample taken for NMR and GPC. Conversion$_{NMR}$=80% After removal of the unreacted monomer, by precipitation of the polymer mixture diluted with additional chloroform into hexane:chloroform (1:1), 3 times, gave 212 (1.075 g), $M_{n\ GPC}$=16.6 kDa, $M_w/M_n$=1.19 (see table 1 for additional results)

Hole Transport Polymer Properties (Table 1)

| Polymer | $M_{n\ GPC}$ (kDa) | $M_w/M_n$ | VBCB (Mol %) | VBCB Mol %$_{NMR}$ |
|---|---|---|---|---|
| 197 | 17.3 | 1.23 | — | — |
| Control (198) | 34.3 | 1.78 | — | — |
| 212 | 17.5 | 1.22 | 3 | 2.3 |
| 212 | 17.3 | 1.22 | 5 | 2.8 |
| 212 | 15.2 | 1.18 | 10 | 6.4 |
| 212 | 16.6 | 1.19 | 5 | |

Example 25

Poly (N⁴-(9,9-dimethyl-7-vinyl-9H-fluoren-3-yl)-N⁴'-(9,9-dimethyl-9H-fluoren-3-yl)-N⁴,N⁴'-diphenyl-biphenyl-4,4'-diamine-co-1,2-dihydrocyclobutabenzene 216

$N^4$-(9,9-dimethyl-7-vinyl-9H-fluoren-3-yl)-$N^{4'}$-(9,9-dimethyl-9H-fluoren-3-yl)-$N^4,N^{4'}$-diphenylbiphenyl-4,4'-diamine (60.0 mg), 4-vinyl-1,2-dihydrocyclobutabenzene (VBCB) (0.55 mg), cyanoisopropyl methyl trithiocarbonate (0.16 mg) and VR 110 initiator (0.02 mg) were transferred to an ampoule with toluene (0.36 mL). The ampoule was degassed, sealed and heated at 110° C. for 22 h. The monomer dissolved on heating to form a homogeneous solution. The ampoule was cooled to room temperature, opened and a sample taken for NMR. Conversion$_{NMR}$=80% After removal of the unreacted monomer, by precipitation of the polymer mixture diluted with additional chloroform into hexane:chloroform (1:1), 3 times, gave 216 (0.45 g), $M_{n\ GPC}$=10.8 kDa, $M_w/M_n$=1.19.

Example 26

Monomers and Polymer Properties (Table 2)

Figure 5:
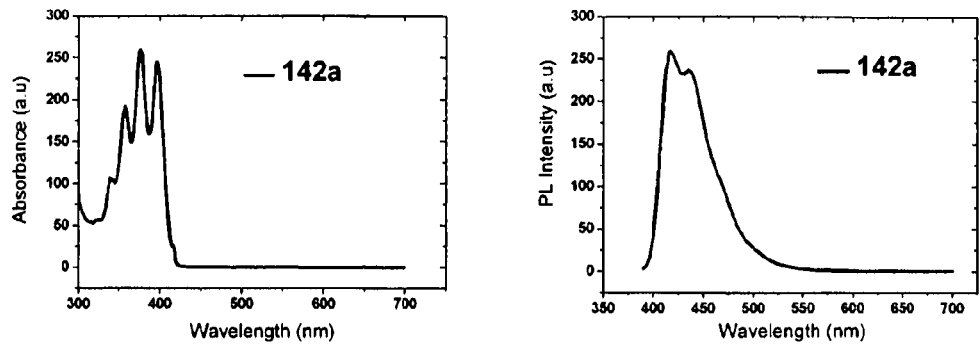
FIG. 5 is the UV-Vis absorption and PL spectra of Host monomer (142a).
Figure 6:
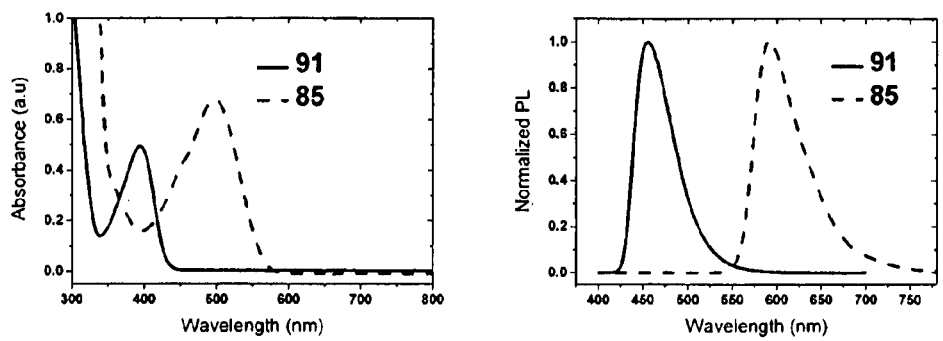
FIG. 6 is the UV-Vis absorption and PL spectra of Dopant monomer 91 and 85.
Figure 7:
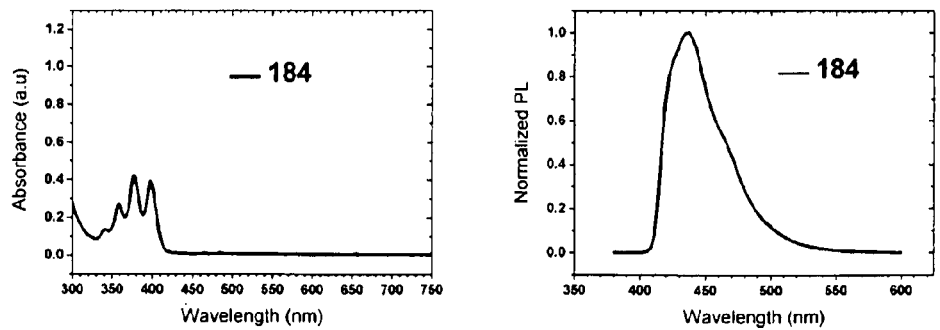
FIG. 7 is the UV-Vis absorption and PL spectra Host polymer 184.
Figure 8:
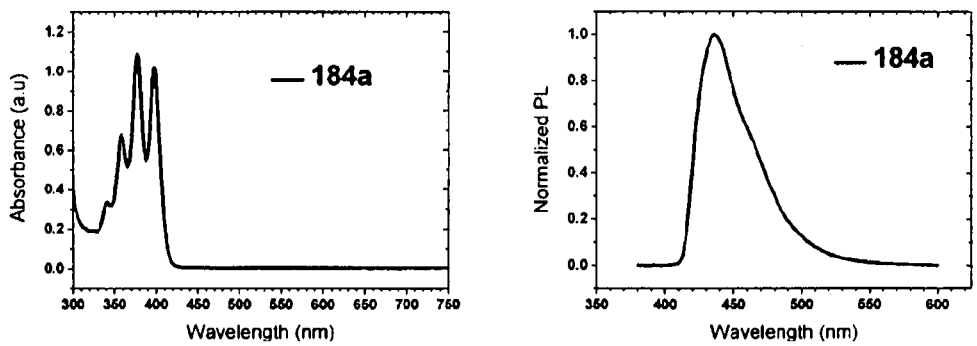
Figure 9:
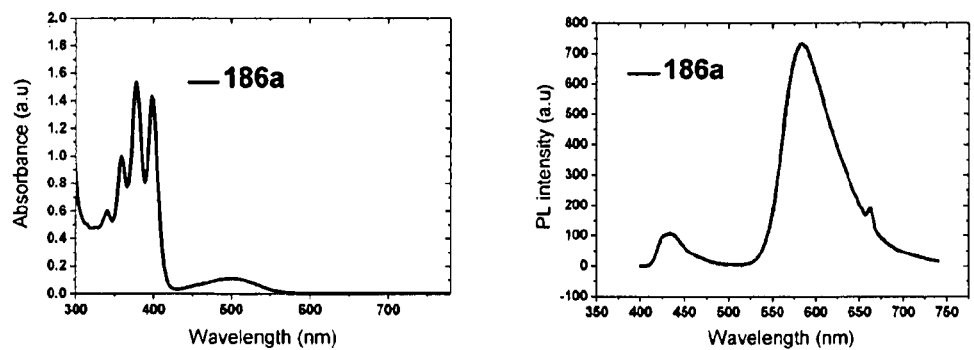
Figure 10:
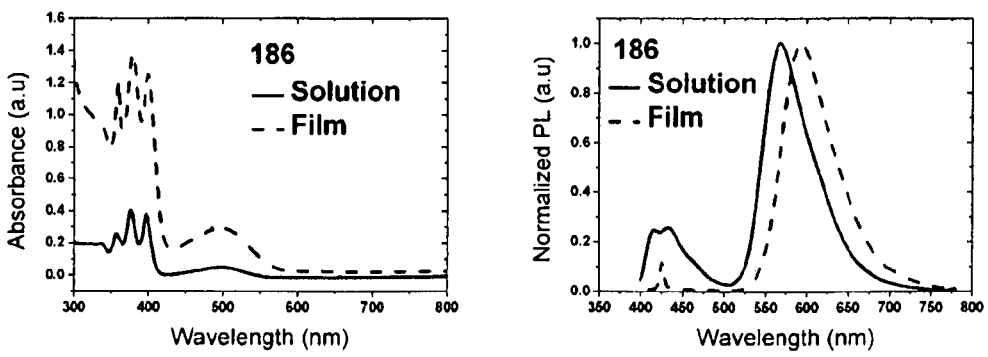
FIG. 10 is the UV-Vis absorption and PL spectra of 186.

|      | UV-VIs (nm) | PL (nm) | Q.Y. | Remarks |
|------|-------------|---------|------|---------|
| Polymer |||||
| 142a | 397 | 417 | 0.80 | FIG. 5 |
| 91   | 394 | 455 | —    | FIG. 6 |
| 85   | 500 | 591 | 0.83 | FIG. 6 |
| Host Polymer |||||
| 184  | 398 | 437 | 0.35 | FIG. 7 |
| Host Copolymer |||||
| 184a | 398 | 437 | 0.68 | FIG. 8 |
| Host-Guest Copolymer |||||
| 186a | 398 | 584 | 0.70 | FIG. 9 |
|      | 500 | 434 |      |        |
| 186  | 398 | 568 | 0.48 | FIG. 10 |
|      | 500 | 434 |      |        |

Example 27

Device Properties

Device properties based on selected materials 85, 186 and 212, A summary of the demonstrated light emitting devices (Table 3)

|        | Color | CIE | Brightness (cd/m²) | Efficiency (cd/A) | Voltage (V) | Current Density (mA/cm²) |
|--------|-------|-----|--------------------|--------------------|-------------|--------------------------|
| Type 1 ||||||||
| Device A | Orange | (0.58, 0.41) | 100 | 0.2 | 18.0 | 58 |
| Type 2 ||||||||
| Device B | Blue-White | (0.25, 0.30) | 1000 | 5.3 | 5.6 | 20.0 |
| Device C | Blue-white | (0.28, 0.32) | 1000 | 8.0 | 5.2 | 14.5 |
| Type 3 ||||||||
| Device D | Green | (0.35, 0.53) | 1000 | 1.8 | 4.0 | 64.0 |
| Device E | Green | (0.33, 0.62) | 1000 | 39.5 | 7.0 | 2.7 |

Type 1: Material Used as a Single Emission Polymer
Device A
Structure: 145 nm ITO (anode)/40 nm PEDOT: PSS (hole transport layer)/80 nm 186 (emission layer)/100 nm Ca/100 nm Al (cathode); in accordance with FIG. 2
Process:
PEDOT: PSS layer was spin coated as a hole transport layer on top of pre-cleaned ITO substrate in the air. After baking at 150° C. for 15 minutes, substrates were transferred into glove box, where the amount of oxygen and moisture were controlled less than 0.1 ppm. A layer of light emitting polymer was spin coated on top of PEDOT: PSS layer and then baked at 80° C. for 30 minutes. Calcium and Aluminium were thermally deposited under a vacuum pressure of $1\times10^{-5}$ Pa as the cathode. An encapsulation with another cover glass was employed with a desiccant inside the device and sealed by the UV cured epoxy to avoid the contact with oxygen and moisture.
Results:
Light emitting devices showed a maximum current efficiency of 0.2 cd/A at a current density of 6.0 mA/cm² and a brightness of 10 cd/m². The colour is orange and the CIE coordinate is (0.58, 0.41)
Type 2: Material Used as a Dopant in a Blended Polymer
Device B
Structure: 145 nm ITO (anode)/40 nm PEDOT:PSS (hole transport layer)/70 nm 186 (emission layer)/20 nm TPBi (electron transport layer)/1 nm LiF/120 nm Al (cathode); in accordance with FIG. 3
Process:
PEDOT: PSS layer was spin coated as a hole transport layer on top of pre-cleaned ITO substrate in the air. After baking at 150° C. for 15 minutes, substrates were transferred into glove box, where the amount of oxygen and moisture were controlled to less than 0.1 ppm. A solution of the blended polymer was prepared with a dopant ratio of 2 wt % of (186) in the host polyfluorene material. A layer of blended polymer was spin coated on top of PEDOT:PSS layer and then baked at 80° C. for 30 minutes. TPBi was thermally deposited as the electron transport layer and LiF and Aluminium were also thermally deposited under a vacuum pressure of $1\times10^{-5}$ Pa as the cathode. An encapsulation procedure with another cover glass was employed with a desiccant inside the device and sealed by the UV cured epoxy to avoid the contact with oxygen and moisture.
Results:
Light emitting devices showed a maximum current efficiency of 5.3 cd/A at a current density of 20.0 mA/cm² and a brightness of 1000 cd/m². The colour is blue-white and the CIE coordinate is (0.25, 0.30)
Device C
Structure: 145 nm ITO (anode)/40 nm PEDOT: PSS (hole transport layer)/70 nm 186 (emission layer) 120 nm TPBi (electron transport layer)/1 nm LiF/120 nm Al (cathode); in accordance with FIG. 3

Process:

PEDOT: PSS layer was spin coated as a hole transport layer on top of pre-cleaned ITO substrate in the air. After baking at 150° C. for 15 minutes, substrates were transferred into glove box, where the amount of oxygen and moisture were controlled to less than 0.1 ppm. A solution of the blended polymer was prepared with a dopant ratio of 0.2 wt % of 85 in the host polyfluorene material. A layer of blended polymer was spin coated on top of PEDOT: PSS layer and then baked at 80° C. for 30 minutes. TPBi was thermally deposited as the electron transport layer and LiF and Aluminium were also thermally deposited under a vacuum pressure of $1\times10^{-5}$ Pa as the cathode. An encapsulation procedure with another cover glass was employed with a desiccant inside the device and sealed by the UV cured epoxy to avoid the contact with oxygen and moisture.

Results:

Light emitting devices showed a maximum current efficiency of 8.8 cd/A at a current density of 14.5 mA/cm$^2$ and a brightness of 5600 cd/m$^2$. The colour is blue-white and the CIE coordinate is (0.28, 0.32)

Type 3: Material Used as a Hole Transport Layer in OLEDs

Device D

Structure: 145 nm ITO (anode)/40 nm PEDOT: PSS (hole injection layer)/30 nm polymer 198 (Hole transport layer)/30 nm Alq$_3$ (emission layer)/1 nm LiF/120 nm Al (cathode); in accordance with FIG. 3

Process:

PEDOT: PSS layer was spin coated as a hole injection layer on top of pre-cleaned ITO substrate in the air. After baking at 150° C. for 15 minutes, substrates were transferred into glove box, where the amount of oxygen and moisture were controlled to less than 0.1 ppm. A solution of the polymer 198 was prepared with the solvent of toluene. A layer of polymer 198 was spin coated on top of PEDOT:PSS layer and then baked at 80° C. for 30 minutes. LiF and Aluminium were thermally deposited under a vacuum pressure of $1\times10^{-5}$ Pa as the cathode. An encapsulation procedure with another cover glass was employed with a desiccant inside the device and sealed by the UV cured epoxy to avoid the contact with oxygen and moisture.

Results:

Light emitting devices showed a current efficiency of 1.8 cd/A at a current density of 64.0 mA/cm$^2$ and a brightness of 1000 cd/m$^2$. The colour is green and the CIE coordinate is (0.35, 0.53)

Device E

Structure: 145 nm ITO (anode)/40 nm PEDOT:PSS (hole injection layer)/15 nm polymer 212 (hole transport layer)/40 nm CBP:Ir(ppy)$_3$ (emission layer)/10 nm BCP/30 nm Alq$_3$ (electron transport layers)/1 nm LiF/120 nm Al (cathode); in accordance with FIG. 3

Process:

PEDOT: PSS layer was spin coated as a hole injection layer on top of pre-cleaned ITO substrate in the air. After baking at 150° C. for 15 minutes, substrates were transferred into glove box, where the amount of oxygen and moisture were controlled to less than 0.1 ppm. The polymer 212 was first dissolved in toluene and then spun on top of the PEDOT:PSS layer to form a hole transport layer. This film was then annealed at 170° C. for 2 hours and 200° C. for 4 hours to complete the cross linking process. The emission layer consists of two materials, CBP and Ir(ppy)$_3$, and was thermally deposited using the method of co-evaporation with the weight ratio of 94:6. After that, the electron transport layers, BCP and Alq$_3$, were deposited to help the electron transport. Finally, LiF and Aluminium were also thermally deposited under a vacuum pressure of $1\times10^{-5}$ Pa as the cathode. An encapsulation procedure with another cover glass was employed with a desiccant inside the device and sealed by the UV cured epoxy to avoid the contact with oxygen and moisture.

Results:

Light emitting devices showed a maximum current efficiency of 39.5 cd/A at a current density of 2.7 mA/cm$^2$ and a brightness of 1000 cd/m$^2$. The colour is green and the CIE coordinate is (0.33, 0.62)

It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. An organic electroluminescent device comprising a pair of electrodes comprising an anode and a cathode, and one or more layers of organic compound disposed between the electrodes, wherein at least one layer comprises a polymer of general formula (1);

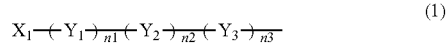

(1)

wherein the polymer comprises $X_1$, $Y_1$, $Y_2$, and $Y_3$ in which
$X_1$ is an emitting component, $Y_1$ is a first polymeric component, $Y_2$ is a second polymeric component, and $Y_3$ is a third polymeric component;
n1, n2, n3 are valency units;
$X_1$ is either univalent, bivalent, trivalent, or tetravalent, with n1 an integer from 1 to 4 and depending on the valence number of $X_1$;
n2 is an integer from 1 to 4, n3 is an integer from 0 to 4; and
n1 is equal to or greater than n2, which in turn is equal to or greater than n3;
and wherein $Y_1$, $Y_2$, and $Y_3$ are of formula (2a), (2b), and (2c), respectively:

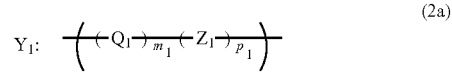

(2a)

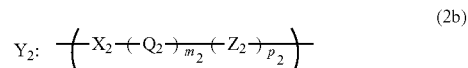

(2b)

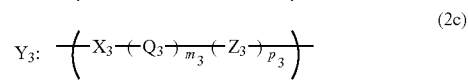

(2c)

wherein
$Y_1$ comprises spacer $Q_1$ and carrier transporting component $Z_1$, the $Q_1$ being connected with $X_1$;
$Y_2$ comprises an emitting moiety $X_2$, spacer $Q_2$ and carrier transporting component $Z_2$, $X_2$ being connected with $Z_1$;
$Y_3$ comprises an emitting moiety $X_3$, spacer $Q_3$ and carrier transporting component $Z_3$, with $X_3$ being connected with $Z_2$;
$X_2$ and $X_3$ may be the same or different; and
$m_1$, $p_1$, $m_2$, $p_2$, $m_3$, and $p_3$ each is a positive integer representing a number of monomeric repeat units of the polymer.

2. The device according to claim 1, wherein each of $m_1$, $p_1$, $m_2$, $P_2$, $m_3$, and $p_3$ is from 1 to 100.

3. The device according to claim 1, wherein each of $m_1$, $p_1$, $m_2$, $P_2$, $m_3$, and $p_3$ is from 5 to 20.

4. The device according to claim 1, wherein the polymer is a non-conjugated (co)-polymer.

5. The device according to claim 1, wherein the polymer is prepared by living radical polymerisation.

6. The device according to claim 5, wherein the living radical polymerization is Reversible Addition Fragmentation chain Transfer polymerisation, Atom Transfer Radical Polymerisation or Nitroxide Mediate Radical Polymerisation.

7. The device according to claim 1, wherein the polymer comprises either (1b) or (1c), a combination of (1a) and (1b), a combination of (1a) and (1c), or all of (1a), (1b) and (1c), wherein (1a), (1b) and (1c) are as follows:

(1a)

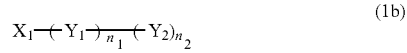
(1b)

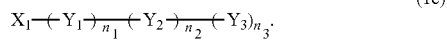
(1c)

8. The device according to claim 1, wherein $X_1$ is formed from an $X_1$ precursor which is a living radical polymerisation agent attached to an emitting component.

9. The device according to claim 8, wherein $X_1$ is selected from the group consisting of substituted or unsubstituted organic fluorescent materials, substituted or unsubstituted phosphorescent organic metal complexes, or substituted or unsubstituted phosphorescent organic complexes, wherein the phosphorescent organic metal complex is provided as a complex of organic ligand and a metal selected from a transition metal group or rare earth metal group.

10. The device according to claim 8, wherein a linker, A, connects the living radical polymerisation moiety with the emitting component, and wherein A is selected from the group consisting of unsubstituted alkyl group, substituted or unsubstituted aryl group, substituted or unsubstituted heterocycles, substituted or unsubstituted alkylamine group, substituted or unsubstituted amido group, substituted or unsubstituted alkyloxy group, substituted or unsubstituted aryloxy group, and substituted or unsubstituted thioalkyloxy group.

11. The device according to claim 1, wherein $X_2$ and $X_3$ are selected from the group consisting of substituted or unsubstituted organic fluorescent materials, substituted or unsubstituted phosphorescent organic metal complexes, and substituted or unsubstituted phosphorescent organic complexes, wherein the phosphorescent organic metal complex is provided as a complex of organic ligand and a metal selected from a transition metal group or rare earth metal group, and wherein $X_2$ and $X_3$ include a vinyl functional group.

12. The device according to claim 11, wherein a linker, A, connects the vinyl polymerisable functionality of $X_2$ and $X_3$ to the emitting component, wherein A is selected from the group consisting of unsubstituted alkyl group, substituted or unsubstituted aryl group, substituted or unsubstituted heterocycles, substituted or unsubstituted alkylamine group, substituted or unsubstituted amido group, substituted or unsubstituted alkyloxy group, substituted or unsubstituted aryloxy group and substituted or unsubstituted thioalkyloxy group.

13. The device according to claim 1, wherein each of $Q_1$, $Q_2$ and $Q_3$ is independently derived from precursor monomers having vinyl groups or a vinyl group.

14. The device according to claim 1, wherein each of $Z_1$, $Z_2$, and $Z_3$ is independently derived from precursor monomers selected from the group consisting of hole transporting materials, electron transporting materials and a host material having both hole and electron transporting characteristics, wherein the monomers have vinyl groups or a vinyl group with substituted or unsubstituted alkyl group, substituted or unsubstituted aryl group, substituted or unsubstituted heterocycles, substituted or unsubstituted alkylamine group, substituted or unsubstituted amido group, substituted or unsubstituted alkyloxy group, substituted or unsubstituted aryloxy group or substituted or unsubstituted thioalkyloxy group.

15. The device according to claim 1 that may emit white luminescence by selecting a combination of either $X_1$ and $X_2$, $X_1$ and $X_3$, or $X_1$, $X_2$ and $X_3$, wherein the emission colour temperature is in the range of 4,000 K to 10,000 K.

16. The device according to claim 15, further including a small molecule additive selected from the groups of fluorescent compounds or phosphorescent compounds.

17. The device according to claim 15, further including either a fluorescent polymer compound additive or phosphorescent polymer compound additive.

18. The device according to claim 1, wherein the polydispersity index of the polymer is between about 1.05 to 2.0.

19. The device according to claim 1, wherein the polydispersity index of the polymer is between about 1.05 to 1.5.

20. The device according to claim 1, wherein the polydispersity index of the polymer is between about 1.05 to 1.3.

21. The device according to claim 1, wherein the polymer is cross-linked.

22. The device according to claim 1, wherein the polymer is prepared by living radical polymerisation and end capped by the living radical functional group may be either retained or replaced with a functional group, including hydrogen.

23. The device according to claim 1, wherein the halogen content of the polymer, as the impurity, is less than about 50 ppm.

24. The device according to claim 1, wherein during manufacture the polymer is mixed with an organic solvent to form an ink having a viscosity of more than about $1 \times 10^{-3}$ Pa·s at 25° C.

25. The device according to claim 1, including more than one layer of organic compound of formula (1).

26. The device according to claim 1, wherein each layer of organic compound has a thickness of from about 1 nm to about 1 micron.

27. The device according to claim 26, wherein each layer of organic compound has a thickness of from about 5 nm to about 50 nm.

* * * * *